(12) United States Patent
Junge et al.

(10) Patent No.: US 11,760,931 B2
(45) Date of Patent: *Sep. 19, 2023

(54) LIQUID-CRYSTALLINE MEDIUM FOR USE IN A SWITCHING ELEMENT

(71) Applicant: Merck Patent GmbH, Darmstadt (DE)

(72) Inventors: Michael Junge, Pfungstadt (DE); Andreas Beyer, Hanau (DE); Mila Fischer, Muehltal (DE); Ewa Ptak, Weiterstadt (DE)

(73) Assignee: Merck Patent GmbH, Darmstadt (DE)

(*) Notice: Subject to any disclaimer, the term of this patent is extended or adjusted under 35 U.S.C. 154(b) by 470 days.

This patent is subject to a terminal disclaimer.

(21) Appl. No.: 16/770,181

(22) PCT Filed: Dec. 3, 2018

(86) PCT No.: PCT/EP2018/083254
§ 371 (c)(1),
(2) Date: Jun. 5, 2020

(87) PCT Pub. No.: WO2019/110458
PCT Pub. Date: Jun. 13, 2019

(65) Prior Publication Data
US 2021/0163820 A1    Jun. 3, 2021

(30) Foreign Application Priority Data

Dec. 6, 2017 (EP) .................................. 17205696

(51) Int. Cl.
*G02F 1/1333* (2006.01)
*C09K 19/04* (2006.01)

(52) U.S. Cl.
CPC ...... *C09K 19/04* (2013.01); *C09K 2019/0448* (2013.01)

(58) Field of Classification Search
CPC ........ C09K 19/04; C09K 19/30; C09K 19/34; C09K 19/58; C09K 19/586; C09K 19/12; C09K 19/14; C09K 2019/0448; C09K 2019/0466; C09K 2019/122; C09K 2019/123; C09K 2019/3004; C09K 2019/3013; C09K 2019/3016; C09K 2019/3019; C09K 2019/3021; C09K 2019/3025; C09K 2019/3063; C09K 2019/3422; C09K 2019/3009; C09K 2219/13; G02F 1/1333

See application file for complete search history.

(56) References Cited

U.S. PATENT DOCUMENTS

| 9,238,775 | B2 | 1/2016 | Junge |
| 9,617,477 | B2* | 4/2017 | Goto .................... C09K 19/542 |
| 9,752,075 | B2* | 9/2017 | Tuffin ............... G02F 1/134309 |
| 10,260,001 | B2 | 4/2019 | Junge et al. |
| 10,585,316 | B2 | 3/2020 | Junge et al. |
| 2011/0272237 | A1 | 11/2011 | Nunuparov |
| 2013/0277609 | A1 | 10/2013 | Goto et al. |
| 2021/0163820 | A1* | 6/2021 | Junge ..................... C09K 19/12 |
| 2021/0171830 | A1* | 6/2021 | Verbunt ............. C09K 19/3003 |
| 2022/0064532 | A1* | 3/2022 | Bakker ................ C09K 19/601 |
| 2022/0220383 | A1* | 7/2022 | van Raak ................ G02F 1/139 |

FOREIGN PATENT DOCUMENTS

| EP | 16185533 | * | 8/2016 | ........ C09K 19/3402 |
| WO | 2010/02289 A1 | | 1/2010 | |
| WO | 10022891 A1 | | 3/2010 | |
| WO | 12052100 A1 | | 4/2012 | |
| WO | 15154848 A1 | | 10/2015 | |
| WO | 16173693 A1 | | 11/2016 | |
| WO | 18189068 A1 | | 10/2018 | |

OTHER PUBLICATIONS

International Search Report PCT/2018EP/083254 dated Feb. 22, 2019 (pp. 1-4).

* cited by examiner

*Primary Examiner* — Geraldina Visconti
(74) *Attorney, Agent, or Firm* — MILLEN WHITE ZELANO AND BRANIGAN, PC; Csaba Henter

(57) ABSTRACT

The present invention relates to liquid-crystalline media comprising one or more mesogenic compounds of formula I as set forth hereinafter, wherein the one or more compounds of formula I are contained in the medium in an amount, based on the overall contents of the medium, of at least 15% by weight. The present invention further relates to a switching layer, a switching element and a window element containing the liquid-crystalline medium.

18 Claims, No Drawings

LIQUID-CRYSTALLINE MEDIUM FOR USE IN A SWITCHING ELEMENT

The present invention relates to liquid-crystalline media comprising one or more mesogenic compounds of formula I as set forth hereinafter, wherein the one or more compounds of formula I are contained in the medium in an amount, based on the overall contents of the medium, of at least 15% by weight. The present invention further relates to a switching layer, a switching element and a window element containing the liquid-crystalline medium.

Optical intensity modulators such as light shutters can be based on liquid crystals (LCs). In principle, such light shutters may rely on the scattering of light or the absorption of light. LC-based light shutters using light scattering include so-called polymer dispersed liquid crystal (PDLC), polymer network liquid crystal (PNLC) and cholesteric liquid crystal (CLC) devices. These scattering-type devices can be switched between transparent and translucent states.

LC-based light shutters can be used as switchable windows for automotive and architectural applications, wherein a light shutter operating in the scattering mode can in particular be used as a privacy window. Light scattering may also be useful in reducing glare or dazzling from direct sunlight irradiation.

Switching between states may e.g. be thermally controlled. However, in many cases it can be suitable and even advantageous to use electrical switching. When a device is switched from a non-scattering state to a scattering state, the transmission of light is changed such that a translucent appearance is produced, which may also be perceived as cloudy, turbid, hazy or opaque.

WO 2016/173693 A1 describes a switching layer comprising a liquid-crystalline medium for use in a switching element which has forward-scattering properties in at least one of the switching states and which facilitates switching from a transparent state into a translucent or opaque state.

There is a need in the art for liquid-crystalline media with improved chemical, physical and electro-optical properties, in particular for use in switching elements and window elements. Furthermore, there is a need in the art for switchable devices which can provide suitable scattering with a uniform appearance for privacy applications, which can be operated at suitably low voltages and low energy consumption, and which can have suitable reliability and stability, e.g. with respect to electrical breakdown and light stability.

An object of the present invention is therefore to provide improved liquid-crystalline media which in particular exhibit sufficiently high optical anisotropies together with a favourably high voltage holding ratio (VHR) and which are particularly useful in switching elements and window elements, especially switchable elements having a scattering mode. In addition, it is an object that the liquid-crystalline media have good reliability and stability, in particular light stability, and a broad liquid-crystalline phase with a suitably high clearing point. It is furthermore desired that the liquid-crystalline media have good low-temperature stability and suitable stability for storage.

It is a further object of the present invention to provide switchable devices having good stability, e.g. against electrical breakdown, and a favourably low operating voltage or low energy consumption and which can show adequately efficient and sufficiently uniform scattering. It is another object to provide an efficient and facile process for preparing such devices.

Further objects of the present invention are immediately evident to the person skilled in the art from the following detailed description.

The objects are solved by the subject-matter defined in the independent claims, while preferred embodiments are set forth in the respective dependent claims and are further described below.

The present invention in particular provides the following items including main aspects, preferred embodiments and particular features, which respectively alone and in combination contribute to solving the above objects and eventually provide additional advantages.

A first aspect of the present invention provides a liquid-crystalline medium, comprising one or more mesogenic compounds of formula I

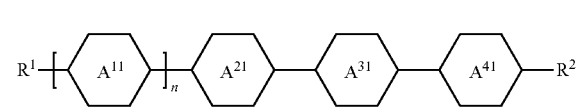

wherein
R$^1$ and R$^2$ denote, independently of one another, a group selected from F, Cl, CF$_3$, OCF$_3$, and straight-chain or branched alkyl or alkoxy having 1 to 15 carbon atoms or straight-chain or branched alkenyl having 2 to 15 carbon atoms which is unsubstituted, monosubstituted by CN or CF$_3$ or mono- or polysubstituted by halogen and wherein one or more CH$_2$ groups may be, in each case independently of one another, replaced by —O—, —S—, —CO—, —COO—, —OCO—, —OCOO— or —C≡C— in such a manner that oxygen atoms are not linked directly to one another,

denotes

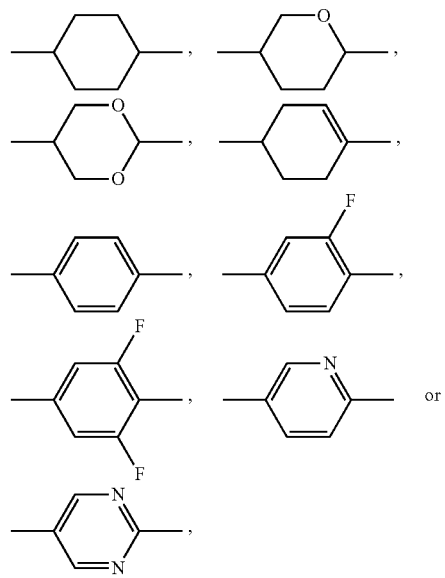

n denotes 0 or 1, and

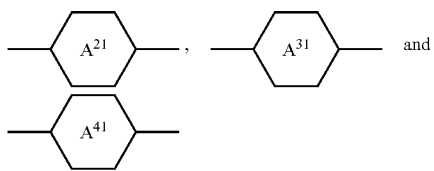

denote, independently of one another,

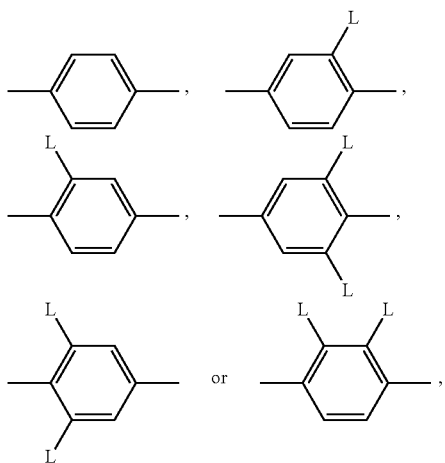

wherein L is on each occurrence, identically or differently, halogen selected from F, Cl and Br, preferably is F, and optionally one or more chiral compounds, wherein the one or more compounds of formula I are contained in the medium in an amount, based on the overall contents of the medium, of at least 15% by weight.

It has surprisingly been found that by providing the liquid-crystalline medium according to the invention a medium with improved properties can be obtained which is particularly useful in switching elements. By including one or more mesogenic compounds of the formula I in the amount specified the medium can exhibit several advantageous and useful characteristics in combination, in particular a suitably high optical anisotropy, a favourably high voltage holding ratio (VHR), good light stability and a suitably high clearing point.

The medium according to the invention can be beneficially used in switching elements, in particular in switching elements based on the scattering of light, preferably in polymer network liquid crystal (PNLC) and cholesteric liquid crystal (CLC) devices.

The medium according to the invention is preferably used in devices for regulating the passage of electromagnetic radiation, preferably light, and in particular sunlight.

It is particularly preferred that the medium according to the invention is used in CLC scattering-type devices. Accordingly, it is preferred that the medium contains one or more chiral compounds, in particular at least one chiral dopant. In case of a chiral nematic or cholesteric liquid-crystalline medium, the medium preferably is provided with a relatively long pitch, wherein the medium preferably exhibits a pitch of 0.55 µm or more.

It is further preferred that medium exhibits an optical anisotropy Δn of at least 0.13 and/or a clearing point of at least 98° C.

It has presently been recognized that additional benefits, e.g. in terms of scattering efficiency or uniformity and appearance of the scattering effect, can be provided when the medium further comprises a polymeric component, which is preferably obtainable from polymerising one or more polymerisable compounds provided in the medium, and in particular when a so-called polymer stabilized cholesteric texture (PSCT) is provided.

Another aspect of the invention relates to a switching layer which comprises the medium according to the invention.

In a further aspect there is provided a switching element which comprises the switching layer, wherein the switching layer is arranged between two susbtrates, and wherein the switching element is electrically switchable and operable in an optically transparent state and a scattering state.

It has advantageously been recognized that an improved switching element can be obtained by comprising the liquid-crystalline medium according to the invention in the switching layer. In particular, according to the present invention a switching element for privacy applications and/or for glare reduction is provided which advantageously can exhibit good reliability and stability, e.g. with respect to electrical breakdown and light stability, as well as a favourably low operating voltage or low energy consumption and which can show suitable and sufficiently uniform scattering.

Another aspect of the invention relates to a method for preparing a switching layer or a switching element, comprising the provision of the medium according to the invention which contains one or more polymerisable compounds as set forth herein as a layer, and polymerisation of the one or more polymerisable compounds.

Surprisingly, this method provides a facile and efficient process to prepare the switching layer and the switching element.

In another aspect of the invention a window element is provided which comprises the switching layer or the switching element according to the invention.

According to the invention advantageous window elements are provided which can be used in switchable windows for automotive and architectural applications, and which are particularly useful and efficient in providing a privacy mode when desired, i.e. they offer switchability from a state with viewing contact to a private state giving a visual barrier, and/or glare control. Furthermore, the switching can be fast and the switching element may be installed with minimum space requirement, which can offer significant advantages, e.g. in comparison to traditional awnings or blinds.

The window element according to the invention is useful for regulating the passage of light, in particular the passage of sunlight.

The switching element according to the invention may however not only be employed in a window of an external facade, but also in the inside of rooms, for example in dividing walls between rooms and in elements for separating individual compartments of rooms. In this case the privacy which is achieved by switching the switching element from clear to scattering can produce a visual barrier between the different parts of the room.

Without limiting the present invention thereby, in the following the invention is illustrated by the detailed description of the aspects, embodiments and particular features, and particular embodiments are described in more detail.

The term "liquid crystal" (LC) herein preferably relates to materials or media having liquid-crystalline mesophases in some temperature ranges (thermotropic LCs). They contain mesogenic compounds.

The terms "mesogenic compound" and "liquid crystal compound" mean a compound comprising one or more calamitic (rod- or board/lath-shaped) or discotic (disc-shaped) mesogenic groups, i.e. groups with the ability to induce liquid-crystalline phase or mesophase behaviour.

The LC compounds or materials and the mesogenic compounds or materials comprising mesogenic groups do not necessarily have to exhibit a liquid-crystalline phase themselves. It is also possible that they show liquid-crystalline phase behaviour only in mixtures with other compounds. This includes low-molecular-weight non-reactive liquid-crystalline compounds, reactive or polymerizable liquid-crystalline compounds, and liquid-crystalline polymers.

A calamitic mesogenic compound is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerizable groups.

For the sake of simplicity, the term "liquid crystal" or "liquid-crystalline" material or medium is used for both liquid crystal materials or media and mesogenic materials or media, and vice versa, and the term "mesogen" is used for the mesogenic groups of the material.

The term "non-mesogenic compound or material" means a compound or material that does not contain a mesogenic group as defined above.

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto.

Further, such residues and other elements, while normally removed during post-polymerisation purification processes, are typically mixed or co-mingled with the polymer such that they generally remain with the polymer when it is transferred between vessels or between solvents or dispersion media.

The term "polymerisation" means the chemical process to form a polymer by bonding together multiple polymerisable groups or polymer precursors (polymerisable compounds) containing such polymerisable groups.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive" or "non-polymerisable" compounds.

The terms "film" and "layer" include rigid or flexible, self-supporting or freestanding films or layers with more or less pronounced mechanical stability, as well as coatings or layers on a supporting substrate or between two substrates.

The term "chiral" in general is used to describe an object that is non-superimposable on its mirror image. By contrast, "achiral" (non-chiral) objects are objects that are identical to their mirror image. The medium according to the invention optionally exhibits chirality. This can be achieved by providing cholesteric liquid crystals, which are also known as chiral nematic liquid crystals. The terms chiral nematic and cholesteric are used synonymously herein, unless explicitly stated otherwise.

Herein

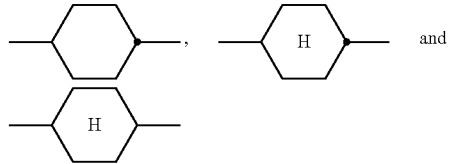

denote trans-1,4-cyclohexylene.

Herein, unless explicitly stated otherwise, all concentrations are given in weight percent and relate to the respective complete mixture.

All temperatures are given in degrees centigrade (Celsius, ° C.) and all differences of temperatures in degrees centigrade. All physical properties and physicochemical or electro-optical parameters are determined by generally known methods, in particular according to "Merck Liquid Crystals, Physical Properties of Liquid Crystals", Status November 1997, Merck KGaA, Germany and are given for a temperature of 20° C., unless explicitly stated otherwise.

Transmission and scattering of light preferably refers to the transmission and scattering of electromagnetic radiation in the spectral range from 380 nm to 780 nm.

Switching preferably refers to the switching between binary states, wherein preferably one state is non-scattering and appears substantially transparent or clear to the human eye and another state is scattering or has diffusive transmission and appears translucent or opaque to the human eye.

However, it is also possible for the switching layer according to the invention to have further switching states, in particular intermediate states.

Therefore, according to the invention preferably and favourably switching between a completely private state and a state with viewing contact to the exterior or a neighbouring space is obtainable.

Switching according to the invention preferably means electrical switching. Electrical switching can typically be achieved by providing substrates, e.g. glass substrates, with electrodes. In an embodiment electrically conductive layers are provided on the substrates, wherein the conductive layers comprise or are formed of a transparent conductive material, e.g. a transparent conductive oxide, preferably indium tin oxide (ITO) or $SnO_2$:F, in particular ITO, or a conductive polymer, or a thin transparent metal and/or metal oxide layer, for example silver. The electrically conductive layers are preferably provided with electrical connections. The voltage is preferably supplied by a battery, a rechargeable battery, a supercapacitor or an external current source.

In an embodiment there are provided orientation layers, e.g. made of polyimide (PI), on the substrate. It is particularly preferred that electrically conductive layers and orientation layers are provided together on the substrates. In this case the orientation layer is provided on top of the conductive layer such that the orientation layer is contacting the LC medium. The orientation layers, preferably polyimide layers, may be arranged such that they provide, in particular at the interface, homogeneous or planar orientation or alternatively homeotropic orientation of the molecules of the liquid-crystalline medium.

Alternatively and according to another preferred embodiment, substrates without orientation layers are used. It has surprisingly been found that the provision of orientation layers, e.g. polyimide layers, as additional layers may beneficially be avoided, while effective and efficient switching behaviour may still be realized.

It is also possible to provide passivation layers on the substrates, alternatively but also in addition to orientation layers, e.g. passivation layers comprising silicon oxide or silicon nitride, preferably consisting of silicon oxide or silicon nitride.

In a first aspect the invention relates to a liquid-crystalline medium, comprising one or more mesogenic compounds of formula I as set forth above and below and optionally one or more chiral compounds, wherein the one or more compounds of formula I are contained in the medium in an amount, based on the overall contents of the medium, of at least 15% by weight.

The medium according to the invention can advantageously exhibit a suitably high optical anisotropy and a favourably high voltage holding ratio (VHR) in combination with good light stability and a suitably high clearing point.

The medium is generally useful and applicable in switching elements and window elements. It is particularly useful in scattering-type switching elements including PNLC devices.

In a preferred embodiment the LC medium has a positive dielectric anisotropy. In this case preference is given to liquid-crystalline mixtures having a dielectric anisotropy $\Delta\varepsilon$ in the range from 3 to 45, more preferably in the range from 5 to 30.

In another embodiment the LC medium has a negative dielectric anisotropy. In this case preference is given to liquid-crystalline mixtures having a dielectric anisotropy $\Delta\varepsilon$ in the range from −6 to −3.

It is however preferred that the medium is a cholesteric or chiral nematic medium.

Cholesteric liquid crystals (CLCs) usually contain a medium which has, for example, in the initial state a planar structure which reflects light having a certain wavelength, and which can be switched into a focal conic, light-scattering structure by application of an electrical alternating-voltage pulse, or vice versa. On application of a stronger voltage, in particular a stronger voltage pulse, the CLC medium can be switched into a homeotropic, transparent state, from which it relaxes into the planar state after rapid switching-off of the voltage or into the focal conic state after slow switching-off.

In the planar texture Bragg reflection occurs, where the reflected light has the same handedness as the cholesteric helix.

In the focal conic state, the helical axes are randomly arranged and the texture shows light scattering because of the discontinuous spatial variations of the refractive indices at the domain boundaries.

Both planar and focal conic configurations are typically stable in the absence of an external electric field. The effect of electric-field-driven textural transitions between planar and focal conic states forms the basis of operation of CLC displays, wherein when the texture of the CLC is switched from the planar to the focal conic texture, the Bragg reflection disappears and the CLC scatters the incident light due to the helical axes being randomly distributed.

However, the switching between the states is typically achieved only through the homeotropic state, where the cholesteric helix is completely unwound by a dielectric coupling between LC molecules with positive dielectric anisotropy ($\Delta\varepsilon>0$) and a vertical electric field.

In an embodiment according to the invention the scattering state of the switching layer can be the focal conic state described above.

Alternatively, and according to a preferred embodiment, in the present invention the scattering state is formed by a polydomain structure.

Preferably this polydomain structure can produce sufficiently strong scattering, while at the same time Bragg-type reflection behaviour still remains observable, at least to some extent. In this phase which comprises, preferably consists of, polydomains the orientation of the helical axis typically varies from domain to domain, and domain boundaries typically occur. Macroscopically however the phase can appear homogeneous, in particular homogeneously opaque or hazy to the human eye, and be free from visible defects over the entire layer area.

The polydomain structure is obtainable, for example, using conventional orientation layers oriented in a planar or homeotropic manner and advantageously switching to the polydomain state may be achievable at a comparatively low voltage. The polydomain structure is however also obtainable when orientation layers are not present.

In a preferred embodiment the non-scattering or clear state can be formed by the homeotropic state described above. Using this clear state may for example be favourable when an element with a large area is used. In this respect the advantageously high VHR that is presently obtainable can be useful in stabilizing the element in this state against self-discharging behaviour and thus allowing to sustain the state even with significantly lower refresh rates and/or lower power consumption.

Alternatively, the non-scattering or clear state can be formed by the planar texture described above.

Using a chiral nematic or cholesteric medium can be beneficial in that relatively stable states, and even bistability, can be provided such that devices comprising the medium may consume less energy. In particular, a respective state may be retained, at least for a considerable time, after the electric field has been switched off, and less frequent addressing or refreshing of voltage may be possible.

In case a cholesteric or chiral nematic medium is presently provided, it is preferred that the medium has a relatively long pitch, and in particular a pitch which gives Bragg-type reflection of greater than 780 nm. In this case also the planar texture may give favourable transmission over the visible light spectrum.

The pitch herein means the pitch p of the cholesteric helix, wherein the pitch p is the distance for the orientational axis (director) of the CLC to undergo a $2\pi$ rotation. In a preferred embodiment the medium exhibits a pitch of 0.55 µm or more, more preferably of 0.75 µm or more, even more preferably of 1.00 µm or more and in particular of 1.50 µm or more.

According to the invention the pitch is determined from NIR spectroscopic measurement, in particular at 20° C., of the wavelength of the selective reflection maximum $\lambda_{max}$. The pitch p is determined from the measured value of $\lambda_{max}$ using the equation $\lambda_{max}=n(\lambda_{max})*p$, wherein $n(\lambda_{max})$ is the refractive index at $\lambda_{max}$.

It is also possible to use the wedge cell method which is known in the art to measure, in particular at 20° C., the helical twisting power HTP and to confirm the determined the pitch.

The inventive LC medium optionally contains one or more chiral compounds, and according to a preferred embodiment it is required that one or more chiral compounds are contained in the medium.

As described above, the medium preferably exhibits a selective reflection with a wavelength of greater than 780 nm. Accordingly the medium preferably reflects in the near infrared (NIR) spectral region.

Chiral dopants and their concentrations can be provided such that the cholesteric pitch of the medium is suitably set or adjusted. A CLC medium can be prepared, for example, by doping a nematic LC medium with a chiral dopant having a high twisting power. The pitch p of the induced cholesteric helix is then given by the concentration c and the helical twisting power HTP of the chiral dopant in accordance with equation (1):

$$p = (HTPc)^{-1} \quad (1)$$

It is also possible to use two or more dopants, for example in order to compensate for the temperature dependence of the HTP of the individual dopants and thus to achieve small temperature dependence of the helix pitch and the reflection wavelength of the CLC medium. For the total HTP ($HTP_{total}$) then approximately equation (2) holds:

$$HTP_{total} = \Sigma_i c_i HTP i \quad (2)$$

wherein $c_i$ is the concentration of each individual dopant and $HTP_i$ is the helical twisting power of each individual dopant.

In a preferred embodiment, the liquid-crystalline medium contains one or more chiral dopants. The chiral dopants preferably have a high absolute value of the HTP and can generally be added in relatively low concentrations to mesogenic base mixtures and have good solubility in the achiral component. If two or more chiral compounds are employed, they may have the same or opposite direction of rotation and the same or opposite temperature dependence of the twist.

Preferably, the one or more chiral compounds according to the invention have an absolute value of the helical twisting power of 5 μm$^{-1}$ or more, more preferably of 10 μm$^{-1}$ or more and even more preferably of 15 μm$^{-1}$ or more, preferably in the commercial liquid-crystal mixture MLC-6828 from Merck KGaA. Particular preference is given to chiral compounds having an absolute value of the helical twisting power (HTP) of 20 μm$^{-1}$ or more, more preferably of 40 μm$^{-1}$ or more, even more preferably of 60 μm$^{-1}$ or more, and most preferably in the range of 80 μm$^{-1}$ or more to 260 μm$^{-1}$ or less, preferably in the commercial liquid-crystal mixture MLC-6828 from Merck KGaA.

In a preferred embodiment of the present invention, the chiral component consists of two or more chiral compounds which all have the same sign of the HTP. The temperature dependence of the HTP of the individual compounds may be high or low. The temperature dependence of the pitch of the medium can be compensated by mixing compounds having different temperature dependence of the HTP in corresponding ratios.

Suitable chiral dopants are known in the art, some of which are commercially available, such as, for example, cholesteryl nonanoate, R/S-811, R/S-1011, R/S-2011, R/S-3011, R/S-4011, B(OC)2C*H—C-3 or CB15 (all Merck KGaA, Darmstadt, Germany).

Particularly suitable chiral dopants are compounds which contain one or more chiral radicals and one or more mesogenic groups, or one or more aromatic or alicyclic groups which form a mesogenic group with the chiral radical.

Suitable chiral radicals are, for example, chiral branched hydrocarbon radicals, chiral ethanediols, binaphthols or dioxolanes, furthermore mono- or polyvalent chiral radicals selected from the group consisting of sugar derivatives, sugar alcohols, sugar acids, lactic acids, chiral substituted glycols, steroid derivatives, terpene derivatives, amino acids or sequences of a few, preferably 1-5, amino acids.

Preferred chiral radicals are sugar derivatives, such as glucose, mannose, galactose, fructose, arabinose and dextrose; sugar alcohols, such as, for example, sorbitol, mannitol, iditol, galactitol or anhydro derivatives thereof, in particular dianhydrohexitols, such as dianhydrosorbide (1,4: 3,6-dianhydro-D-sorbide, isosorbide), dianhydromannitol (isosorbitol) or dianhydroiditol (isoiditol); sugar acids, such as, for example, gluconic acid, gulonic acid and ketogulonic acid; chiral substituted glycol radicals, such as, for example, mono- or oligoethylene or propylene glycols, wherein one or more CH$_2$ groups are substituted by alkyl or alkoxy; amino acids, such as, for example, alanine, valine, phenylglycine or phenylalanine, or sequences of from 2 to 5 of these amino acids; steroid derivatives, such as, for example, cholesteryl or cholic acid radicals; terpene derivatives, such as, for example, menthyl, neomenthyl, campheyl, pineyl, terpineyl, isolongifolyl, fenchyl, carreyl, myrthenyl, nopyl, geraniyl, linaloyl, neryl, citronellyl or dihydrocitronellyl.

Suitable chiral radicals and mesogenic chiral compounds are described, for example, in DE 34 25 503, DE 35 34 777, DE 35 34 778, DE 35 34 779 and DE 35 34 780, DE 43 42 280, EP 01 038 941 and DE 195 41 820.

Preferable chiral compounds used according to the present invention are selected from the following groups of compounds.

In an embodiment preference is given to dopants selected from the group consisting of compounds of the following formulae A-I to A-III:

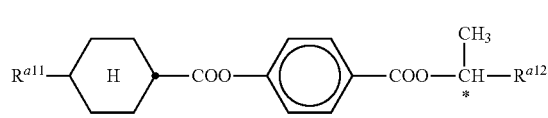

A-I

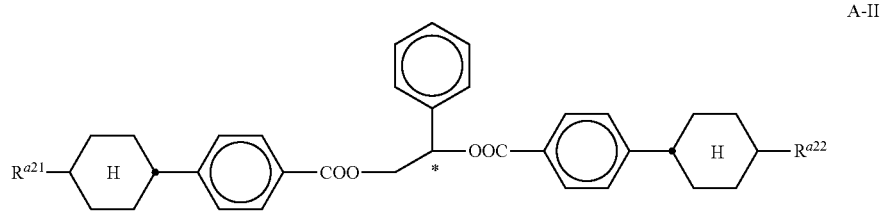

A-II

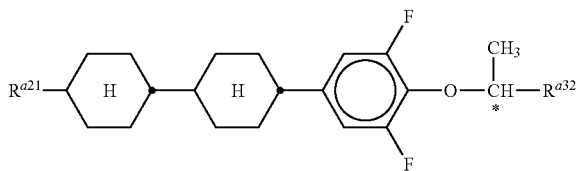

A-III in which

R$^{a11}$ and R$^{a12}$, independently of one another, are alkyl, oxaalkyl or alkenyl having from 2 to 9, preferably up to 7, carbon atoms, and R$^{a11}$ is alternatively methyl or alkoxy having from 1 to 9 carbon atoms, preferably both are alkyl, preferably n-alkyl, R$^{a21}$ and R$^{a22}$, independently of one another, are alkyl or alkoxy having from 1 to 9, preferably up to 7, carbon atoms, oxaalkyl, alkenyl or alkenyloxy having from 2 to 9, preferably up to 7, carbon atoms, preferably both are alkyl, preferably n-alkyl, R$^{a31}$ and R$^{a32}$, independently of one another, are alkyl, oxaalkyl or alkenyl having from 2 to 9, preferably up to 7, carbon atoms, and R$^{a11}$ is alternatively methyl or alkoxy having from 1 to 9 carbon atoms, preferably both are alkyl, preferably n-alkyl.

Particular preference is given to chiral dopants selected from the group consisting of the compounds of the following formulae:

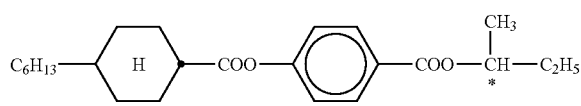

A-I-1

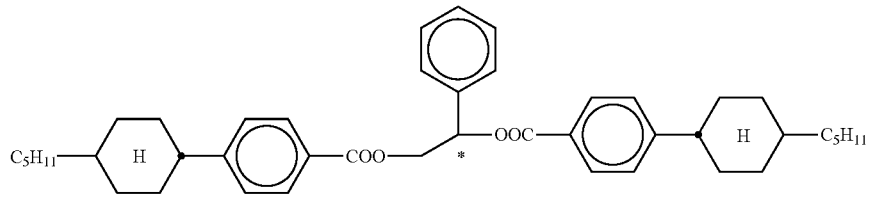

A-II-1

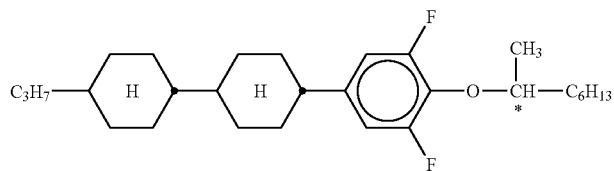

A-III-1

Further preferred dopants are derivatives of isosorbide, isomannitol or isoiditol of the following formula A-IV

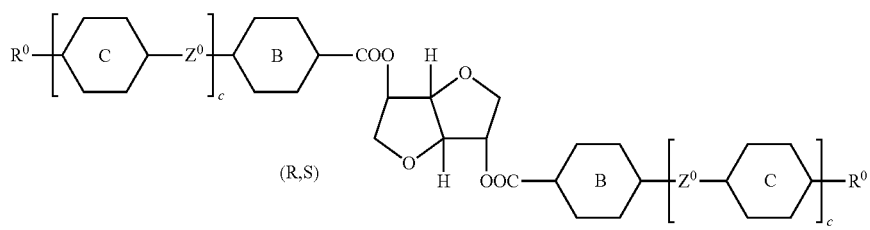

A-IV in which the group

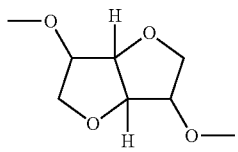

is

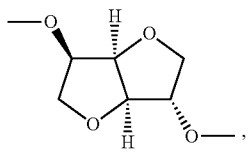

(dianhydrosorbitol)

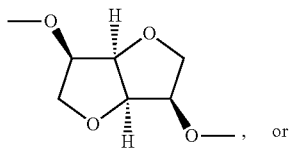

(dianhydromannitol)   or

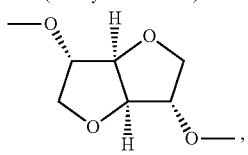

(dianhydroiditol)

preferably dianhydrosorbitol,
and chiral ethanediols, such as, for example, diphenylethanediol (hydrobenzoin), in particular mesogenic hydrobenzoin derivatives of the following formula A-V are each, independently of one another, 1,4-phenylene, which may also be mono-, di- or trisubstituted by L, or 1,4-cyclohexylene, L is H, F, Cl, CN or optionally halogenated alkyl, alkoxy, alkylcarbonyl, alkoxycarbonyl or alkoxycarbonyloxy having 1-7 carbon atoms, c is 0 or 1, $Z^0$ is —COO—, —OCO—, —CH$_2$CH$_2$— or a single bond, and $R^0$ is alkyl, alkoxy, alkylcarbonyl, alkoxycarbonyl or alkylcarbonyloxy having 1-12 carbon atoms.

Compounds of formula A-IV are described in WO 98/00428. Compounds of the formula A-V are described in GB-A-2,328,207.

In another embodiment particularly preferred chiral dopants are chiral binaphthyl derivatives, as described in WO 02/94805, chiral binaphthol acetal derivatives, as described in WO 02/34739, chiral TADDOL derivatives, as described in WO 02/06265, and chiral dopants having at least one fluorinated bridging group and a terminal or central chiral group, as described in WO 02/06196 and WO 02/06195.

Particular preference is given to chiral compounds of formula A-VI

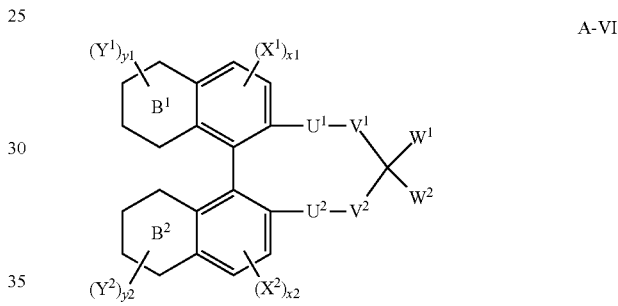

A-VI in which $X^1$, $X^2$, $Y^1$ and $Y^2$ are each, independently of one another, F, Cl, Br, I, CN, SCN, SF$_5$, straight-chain or branched

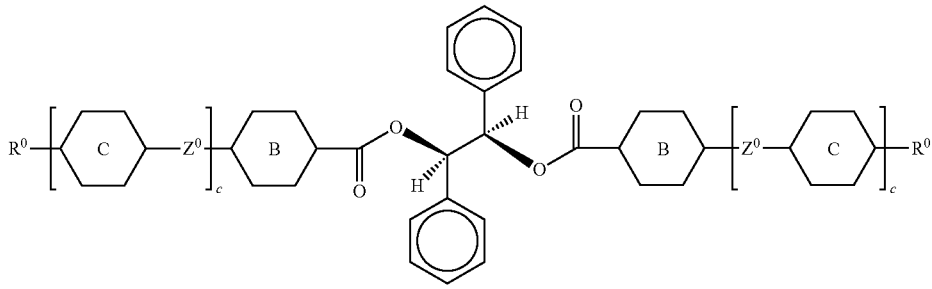

A-V including the (R,S), (S,R), (R,R) and (S,S) enantiomers, which are not shown,
in which

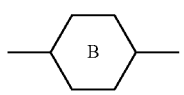 and 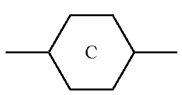

alkyl having from 1 to 25 carbon atoms, which may be monosubstituted or polysubstituted by F, Cl, Br, I or CN and in which, in addition, one or more non-adjacent CH$_2$ groups may each, independently of one another, be replaced by —O—, —S—, —NH—, NR$^0$—, —CO—, —COO—, —OCO—, —OCOO—, —S—CO—, —CO—S—, —CH=CH— or —C≡C— in such a way that O and/or S atoms are not bonded directly to one another, a polymerisable group or cycloalkyl or aryl having up to 20 carbon atoms, which may optionally be monosubstituted or polysubstituted by halogen, preferably F, or by a polymerisable group, $x^1$ and $x^2$ are each, independently of one another, 0, 1 or 2, $y^1$ and $y^2$ are each, independently of one another, 0, 1, 2, 3 or 4, $B^1$ and $B^2$ are each, independently of one another, an aromatic or partially or fully saturated aliphatic six-membered ring in which one or more CH groups may be replaced by N atoms and one or more non-adjacent $CH_2$ groups may be replaced by O and/or S, $W^1$ and $W^2$ are each, independently of one another, $-Z^1-A^1-(Z^2-A^2)_m-R$, and one of the two is alternatively $R^1$ or $A^3$, but both are not simultaneously H, or

is

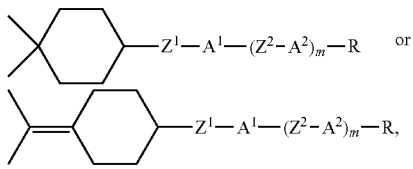

$U^1$ and $U^2$ are each, independently of one another, $CH_2$, O, S, CO or CS, $V^1$ and $V^2$ are each, independently of one another, $(CH_2)_n$, in which from one to four non-adjacent $CH_2$ groups may be replaced by O and/or S, and one of $V^1$ and $V^2$ and, in the case where

is

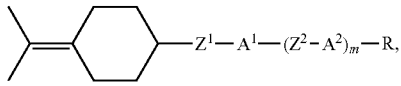

both are a single bond, $Z^1$ and $Z^2$ are each, independently of one another, —O—, —S—, —CO—, —COO—, —OCO—, —O—COO—, —CO—$NR^0$—, —$NR^0$—CO—, —O—$CH_2$—, —$CH_2$—O—, —S—$CH_2$—, —$CH_2$—S—, —$CF_2$—O—, —O—$CF_2$—, —$CF_2$—S—, —S—$CF_2$—, —$CH_2$—$CH_2$—, —$CF_2$—$CH_2$—, —$CH_2$—$CF_2$—, —$CF_2$—$CF_2$—, —CH=N—, —N=CH—, —N=N—, —CH=CH—, —CF=CH—, —CH=CF—, —CF=CF—, —C≡C—, a combination of two of these groups, where no two O and/or S and/or N atoms are bonded directly to one another, preferably —CH=CH—COO—, or —COO—CH=CH—, or a single bond, $A^1$, $A^2$ and $A^3$ are each, independently of one another, 1,4-phenylene, in which one or two non-adjacent CH groups may be replaced by N, 1,4-cyclohexylene, in which one or two non-adjacent $CH_2$ groups may be replaced by O and/or S, 1,3-dioxolane-4,5-diyl, 1,4-cyclohexenylene, 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where each of these groups may be monosubstituted or polysubstituted by L, and in addition $A^1$ is a single bond, L is a halogen atom, preferably F, CN, $NO_2$, alkyl, alkoxy, alkylcarbonyl, alkoxycarbonyl or alkoxycarbonyloxy having 1-7 carbon atoms, in which one or more H atoms may be replaced by F or Cl, m is in each case, independently, 0, 1, 2 or 3, and R and $R^1$ are each, independently of one another, H, F, Cl, Br, I, CN, SCN, $SF_5$, straight-chain or branched alkyl having from 1 or 3 to 25 carbon atoms respectively, which may optionally be monosubstituted or polysubstituted by F, Cl, Br, I or CN, and in which one or more non-adjacent $CH_2$ groups may be replaced by —O—, —S—, —NH—, —$NR^0$—, —CO—, —COO—, —OCO—, —O—COO—, —S—CO—, —CO—S—, —CH=CH— or —C≡C—, where no two O and/or S atoms are bonded directly to one another, or a polymerisable group.

Particular preference is given to chiral binaphthyl derivatives of the formula A-VI-1

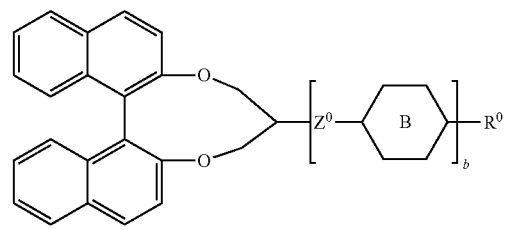

in particular those selected from the following formulae A-VI-1a to A-VI-1c:

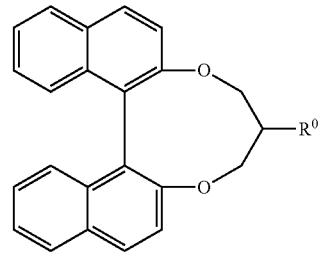

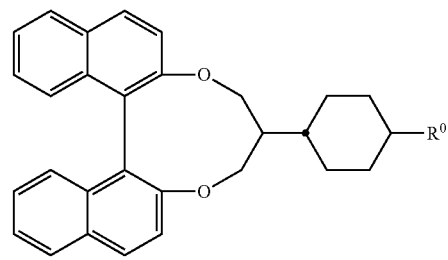

-continued

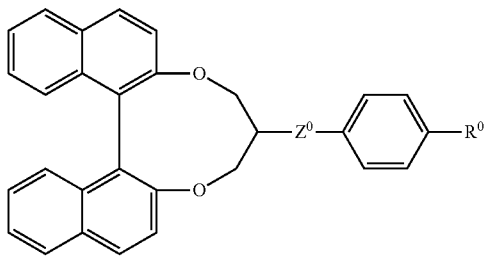
A-VI-1c

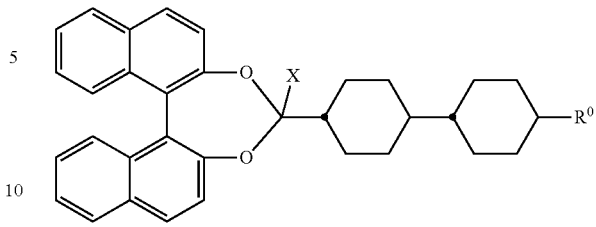
A-VI-2d

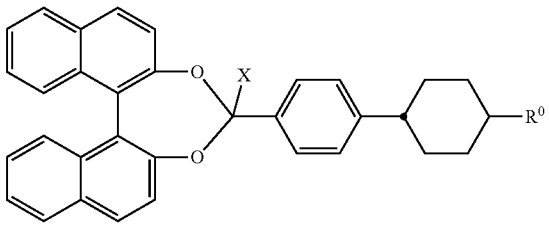
A-VI-2e

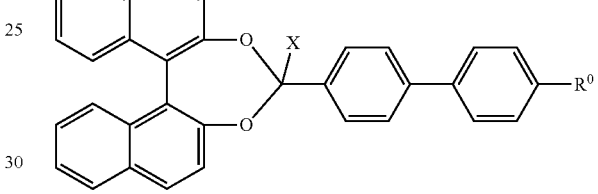
A-VI-2f in which B and $Z^0$ are as defined for formula A-IV, and $Z^0$ more preferably is —OCO— or a single bond, $R^0$ is as defined for formula A-IV or H or alkyl having from 1 to 4 carbon atoms, and b is 0, 1 or 2.

Particular preference is furthermore given to chiral binaphthyl derivatives of the formula A-VI-2

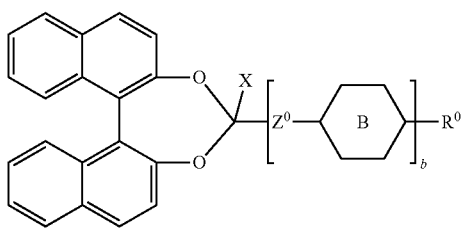
A-VI-2 in particular to those selected from the following formulae A-VI-2a to A-VI-2f:

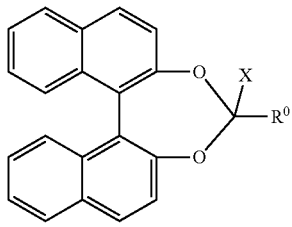
A-VI-2a

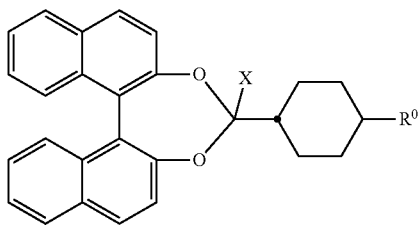
A-VI-2b

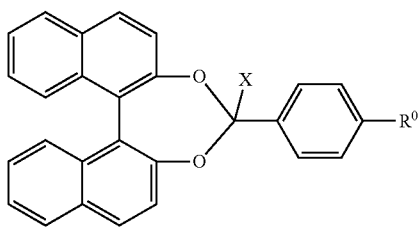
A-VI-2c in which $R^0$ is as defined for formula A-VI, and X is H, F, Cl, CN or $R^0$, preferably F.

In a particularly preferred embodiment, the chiral medium according to the invention comprises one or more compounds of formula R-5011 and S-5011 which are shown in Table F below. In an embodiment the medium contains R-5011. In another embodiment the medium contains S-5011.

Favourably the medium according to the invention can have a suitably high optical anisotropy Δn, which is also known as the birefringence. Preferably, the medium exhibits an optical anisotropy Δn, determined at 20° C. and 589 nm, of 0.13 or more, more preferably of 0.16 or more and even more preferably of 0.20 or more.

Above and below, Δn denotes the optical anisotropy, wherein $Δn=n_e-n_o$, and Δε denotes the dielectric anisotropy, wherein $Δε=ε_∥-ε_⊥$. The dielectric anisotropy Δε is determined at 20° C. and 1 kHz. The optical anisotropy Δn is determined at 20° C. and a wavelength of 589.3 nm.

Additionally or alternatively, the medium according to the invention can have a suitably high a clearing point, preferably a clearing point of 98° C. or more, more preferably a clearing point of 105° C. or more, and even more preferably of 115° C. or more. It is preferred that the medium has a clearing point in the range from 98° C. to 160° C. and more preferably from 105° C. to 150° C.

The LC medium according to the present invention preferably and favourably exhibits a high reliability and a high electric resistivity. The LC medium according to the present invention also preferably and favourably exhibits a high voltage holding ratio (VHR), see S. Matsumoto et al., Liquid Crystals 5, 1320 (1989); K. Niwa et al., Proc. SID Conference, San Francisco, June 1984, p. 304 (1984); T. Jacob and U. Finkenzeller in "Merck Liquid Crystals—Physical Properties of Liquid Crystals", 1997. The VHR of an LC medium according to the invention is preferably ≥85%, more preferably ≥90%, even more preferably ≥95% and particularly preferably ≥98%. Unless described otherwise, the measurement of the VHR is carried out as described in T. Jacob, U. Finkenzeller in "Merck Liquid Crystals—Physical Properties of Liquid Crystals", 1997.

In a preferred embodiment the medium according to the invention further comprises one or more polymerisable compounds.

Preferably, the one or more polymerisable compounds are contained in the medium in an amount, based on the overall contents of the medium, of 10% by weight or less, more preferably in an amount of 5% by weight or less, even more preferably in an amount of 2.5% by weight or less and particularly preferably in an amount of 1.25% by weight or less.

Preferably, the one or more polymerisable compounds are contained in the medium in an amount, based on the overall contents of the medium, in the range from 0.1% by weight to 10% by weight.

In the medium according to the invention preferably one or more polymerisable, curable or hardenable compounds are provided, preferably one or more photocurable monomers, which can favourably serve as the precursors for a polymeric component in the medium.

The polymerisable compounds have at least one polymerisable group. The polymerisable group is preferably selected from $CH_2=CW^1-COO-$,

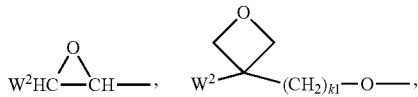

$CH_2=CW^2-(O)_{k1}-$, $CH_3-CH=CH-O-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $HO-CW^2W^3-$, $HS-CW^2W^3-$, $HW^2N-$, $HO-CW^2W^3-NH-$, $CH_2=CW^1-CO-NH-$, $CH_2=CH-(COO)_{k1}$-Phe-$(O)_{k2}-$, Phe-CH=CH—, HOOC—, OCN—, with $W^1$ being H, Cl, CN, phenyl or alkyl with 1 to 5 C atoms, in particular H, Cl or $CH_3$, $W^2$ and $W^3$ being independently of each other H or alkyl with 1 to 5 C atoms, in particular H, methyl, ethyl or n-propyl, Phe being 1,4-phenylene and $k_1$ and $k_2$ being independently of each other 0 or 1.

In an embodiment one or more of the one or more polymerisable compounds comprise one, two or more acrylate and/or methacrylate groups.

The polymerisable or reactive group is preferably selected from a vinyl group, an acrylate group, a methacrylate group, a fluoroacrylate group, an oxetane group or an epoxy group, especially preferably an acrylate group or a methacrylate group.

Preferably, one or more polymerisable compounds are selected from acrylates, methacrylates, fluoroacrylates and vinyl acetate, wherein the composition more preferably further comprises one or more direactive and/or trireactive polymerisable compounds, preferably selected from diacrylates, dimethacrylates, triacrylates and trimethacrylates.

In an embodiment the one or more polymerisable compounds comprise polymerisable groups selected from one, two or more acrylate, methacrylate and vinyl acetate groups, more preferably one, two or more acrylate and/or methacrylate groups, wherein the compounds in an embodiment preferably are non-mesogenic compounds.

In a preferred embodiment the medium according to the invention comprises one or more monoacrylates. Particularly preferred monoreactive compounds are selected from methyl acrylate, ethyl acrylate, propyl acrylate, isopropyl acrylate, butyl acrylate, t-butyl acrylate, pentyl acrylate, hexyl acrylate, nonyl acrylate, 2-ethylhexyl acrylate, 2-hydroxyethyl acrylate, 2-hydroxy-butyl acrylate and isobornyl acrylate.

Additionally or alternatively the medium according to the invention preferably comprises one or more monomethacrylates. Particularly preferred monoreactive compounds are selected from methyl methacrylate, ethyl methacrylate, propyl methacrylate, ispropyl methacrylate, butyl methacrylate, t-butyl methacrylate, pentyl methacrylate, hexyl methacrylate, nonyl methacrylate, dodecyl methacrylate, 2-ethylhexyl methacrylate, 2-hydroxy-ethyl methacrylate, 2-hydroxy-butyl methacrylate, isobornyl methacrylate and 1-adamantyl methacrylate.

Alternatively or additionally reactive mesogens (RMs) or mesogenic monomers may be used. These compounds contain a mesogenic group and one or more polymerisable groups, i.e. functional groups which are suitable for polymerization.

In a particularly preferred embodiment the polymerisabe compound(s) according to the invention include(s) only reactive mesogen(s), i.e. all the reactive monomers are mesogens. Alternatively, RMs can be provided in combination with one or more non-mesogenic polymerisable compounds. The RMs can be monoreactive and/or di- or multireactive.

It is particularly preferred that at least one crosslinking agent is added to the medium, i.e. a polymerisable compound containing two or more polymerisable groups. In this respect direactive and multireactive compounds can serve to form polymer networks of their own and/or to crosslink polymer chains formed substantially from polymerising monoreactive compounds.

Conventional crosslinkers known in the art can be used. It is particularly preferred to additionally provide direactive or multireactive acrylates and/or methacrylates. Particularly preferred compounds are selected from ethylene diacrylate, propylene diacrylate, butylene diacrylate, pentylene diacrylate, hexylene diacrylate, glycol diacrylate, glycerol diacrylate, pentaerythritol tetraacrylate, ethylene dimethacrylate, also known as ethyleneglycol dimethacrylate, propylene diamethcrylate, butylene dimethacrylate, pentylene dimethacrylate, hexylene dimethacrylate, tripropylene glycol diacrylate, glycol dimethacrylate, glycerol dimethacrylate, trimethylpropane trimethacrylate and pentaerythritol triacrylate.

Alternatively or additionally di- or multireactive RMs can be used.

The ratio of monoreactive monomers and di- or multireactive monomers can be favourably set and adjusted to influence the properties of the polymeric component to be formed.

In an embodiment one or more of the one or more polymerisable compounds are polymerisable mesogenic compounds. Accordingly, in a preferred embodiment of the invention the polymerisable compounds are selected from the compounds of the formula M $$R^{Ma}-A^{M1}-(Z^{M1}-A^{M2})_{m1}-R^{Mb} \qquad M$$

in which the individual radicals are defined as follows:

$R^{Ma}$ and $R^{Mb}$ are each independently P, P-Sp-, H, F, Cl, Br, I, —CN, —NO$_2$, —NCO, —NCS, —OCN, —SCN, SF$_5$ or straight-chain or branched alkyl having 1 to 25 carbon atoms, in which one or more non-adjacent CH$_2$ groups may each independently also be replaced by —C(R$^0$)=C(R$^{00}$)—, —C≡C—, —N(R$^{00}$)—, —O—, —S—, —CO—, —CO—O—, —O—CO—, —O—CO—O—, in such a way that no oxygen and/or sulphur atoms are joined directly to one another, and in which one or more hydrogen atoms may also be replaced by F, Cl, Br, I, CN, P or P-Sp-, where preferably at least one of the $R^{Ma}$ and $R^{Mb}$ radicals is or contains a P or P-Sp- group, preferably $R^{Ma}$ and $R^{Mb}$ are each independently P, P-Sp-, H, halogen, SF$_5$, NO$_2$, an alkyl, alkenyl or alkynyl group, where preferably at least one of the $R^{Ma}$ and $R^{Mb}$ radicals is or contains a P or P-Sp- group, P is a polymerisable group, Sp is a spacer group or a single bond, $A^{M1}$ and $A^{M2}$ are each independently an aromatic, heteroaromatic, alicyclic or heterocyclic group, preferably having 4 to 25 ring atoms, preferably carbon atoms, which also comprises or may contain fused rings, and which may optionally be mono- or polysubstituted by L, L is P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 carbon atoms, or straight-chain or branched alkyl, alkoxy, alkylcarbonyl, alkoxycarbonyl, alkylcarbonyloxy or alkoxycarbonyloxy having 1 to 25 carbon atoms or alkenyl or alkynyl having 2 to 25 carbon atoms, in which one or more hydrogen atoms may also be replaced by F, Cl, P or P-Sp-, preferably P, P-Sp-, H, OH, CH$_2$OH, halogen, SF$_5$, NO$_2$, an alkyl, alkenyl or alkynyl group, Y$^1$ is halogen, preferably F, $Z^{M1}$ is —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—, —COO—, —OCO—CH=CH—, CR$^0$R$^{00}$ or a single bond, R$^0$ and R$^{00}$ are each independently H or alkyl having 1 to 12 carbon atoms, R$^x$ is P, P-Sp-, H, halogen, straight-chain, branched or cyclic alkyl having 1 to 25 carbon atoms, in which one or more non-adjacent CH$_2$ groups may also be replaced by —O—, —S—, —CO—, —CO—O—, —O—CO—, —O—CO—O—, in such a way that no oxygen and/or sulphur atoms are joined directly to one another, and in which one or more hydrogen atoms may also be replaced by F, Cl, P or P-Sp-, an optionally substituted aryl or aryloxy group having 6 to 40 carbon atoms, or an optionally substituted heteroaryl or heteroaryloxy group having 2 to 40 carbon atoms, m1 is 0, 1, 2, 3 or 4, and n1 is 1, 2, 3 or 4, where at least one substituent, preferably one, two or three substituents and more preferably one or two substituents from the group of $R^{Ma}$, $R^{Mb}$ and the substituent L present is a P or P-Sp- group or contains at least one P or P-Sp- group.

Particular preference is given to compounds of the formula M in which one of $R^{ma}$ and $R^{mb}$ or both are P or P-Sp-.

Suitable and preferred RMs for use in the liquid crystalline media according to the invention are, for example, selected from the following formulae:

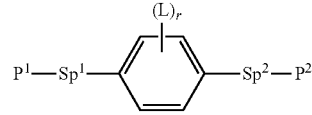

M1

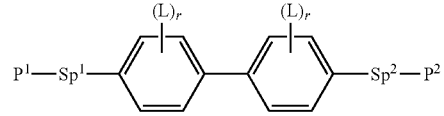

M2

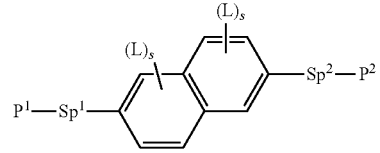

M3

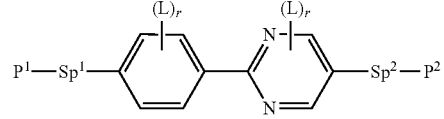

M4

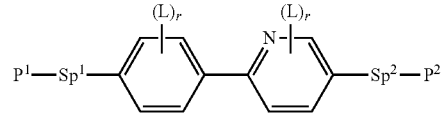

M5

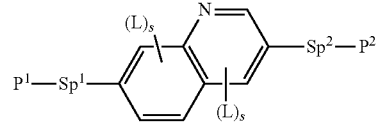

M6

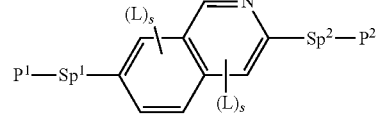

M7

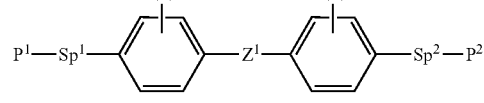

M8

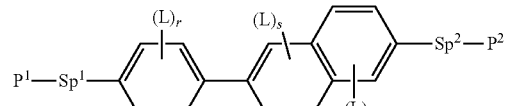

M9

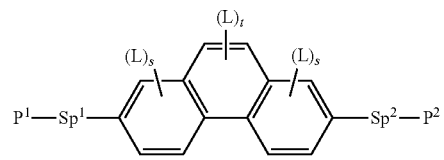

M10

M11
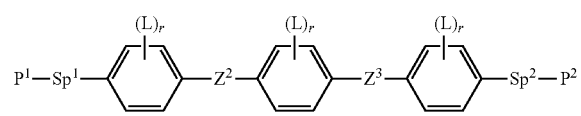
M12
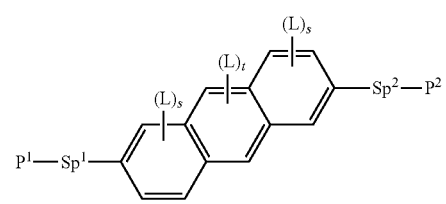
M13
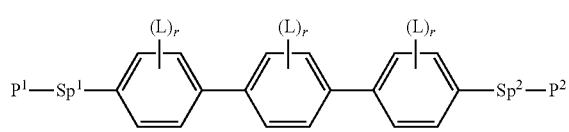
M14
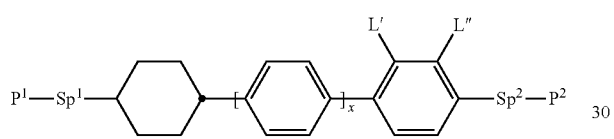
M15
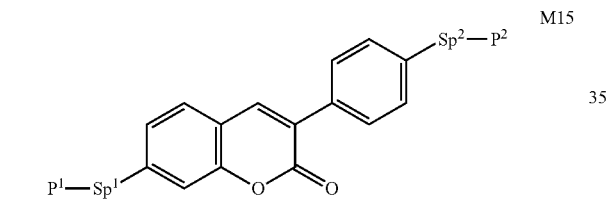
M16
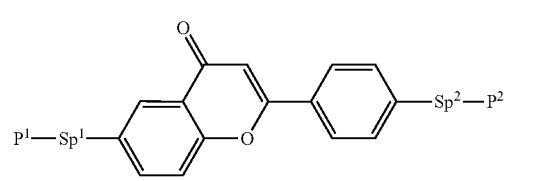
M17
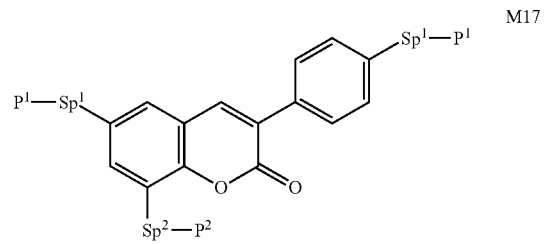
M18
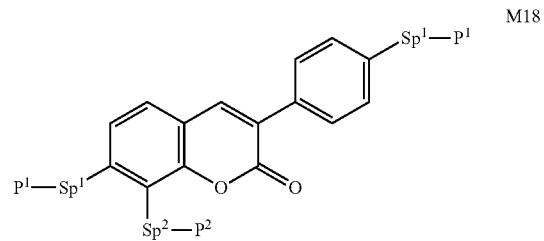
M19
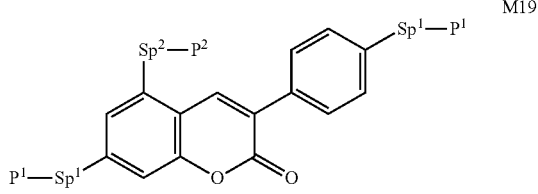
M20
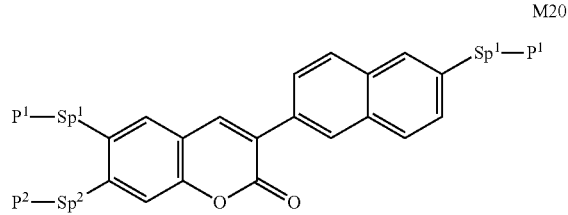
M21
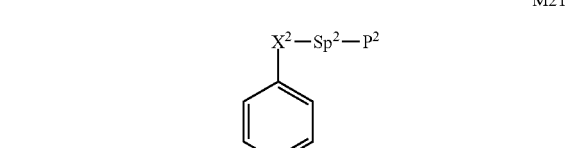
M22
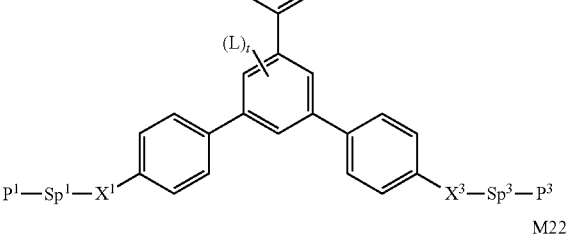
M23
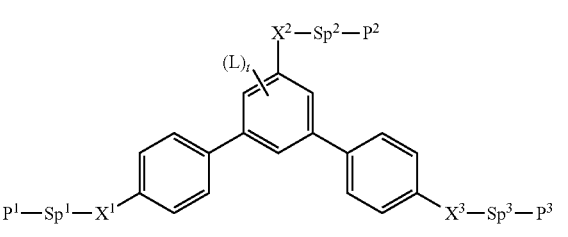
M24
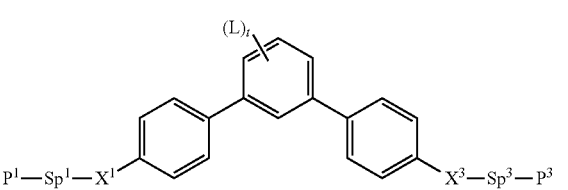
M25
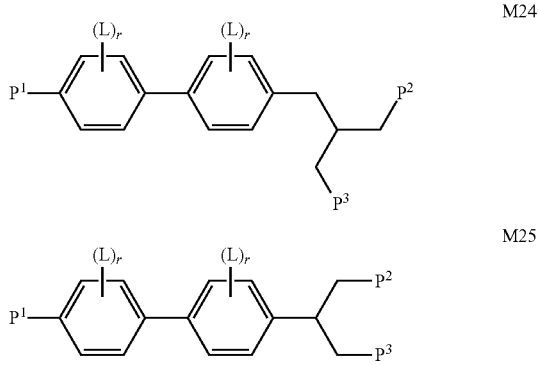

-continued

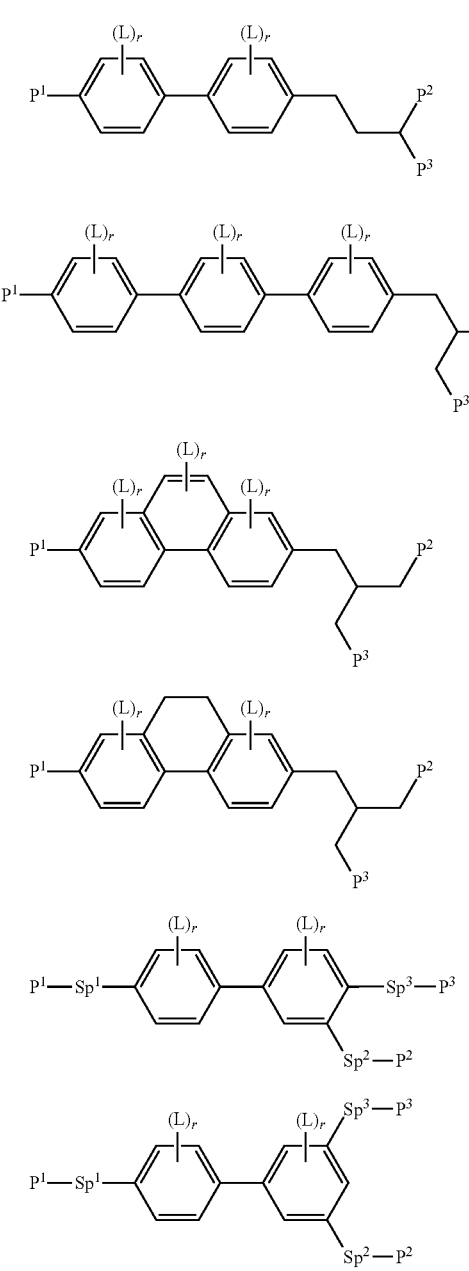

in which the individual radicals are defined as follows:
$P^1$ to $P^3$ are each independently a polymerisable group, preferably having one of the definitions specified above and below for P, more preferably an acrylate, methacrylate, fluoroacrylate, oxetane, vinyloxy or epoxy group,
$Sp^1$ to $Sp^3$ are each independently a single bond or a spacer group, preferably having one of the definitions of Sp given above and below, and more preferably —$(CH_2)_{p1}$—, —$(CH_2)_{p1}$—O—, —$(CH_2)_{p1}$—CO—O— or —$(CH_2)_{p1}$—O—CO—O—, in which p1 is an integer from 1 to 12, and where the bond to the adjacent ring in the latter groups is via the oxygen atom, where one of the $P^1$-$Sp^1$-, $P^2$-$Sp^2$- and $P^3$-$Sp^3$- radicals may also be $R^{aa}$,
$R^{aa}$ is H, F, Cl, CN or straight-chain or branched alkyl having 1 to 25 carbon atoms, in which one or more non-adjacent $CH_2$ groups may each independently also be replaced by $C(R^0)=C(R^{00})$—, —C≡C—, —$N(R^0)$—, —O—, —S—, —CO—, —CO—O—, —O—CO—, —O—CO—O—, in such a way that no oxygen and/or sulphur atoms are joined directly to one another, and in which one or more hydrogen atoms may also be replaced by F, Cl, CN or $P^1$-$Sp^1$-, more preferably straight-chain or branched, optionally mono- or polyfluorinated alkyl, alkoxy, alkenyl, alkynyl, alkylcarbonyl, alkoxycarbonyl, or alkylcarbonyloxy having 1 to 12 carbon atoms (where the alkenyl and alkynyl radicals have at least two and the branched radicals at least three carbon atoms),
$R^0$ and $R^{00}$ are the same or different at each instance and are each independently H or alkyl having 1 to 12 carbon atoms,
$R^y$ and $R^z$ are each independently H, F, $CH_3$ or $CF_3$,
$Z^1$ is —O—, —CO—, —$C(R^y R^z)$— or —$CF_2 CF_2$—,
$Z^2$ and $Z^3$ are each independently —CO—O—, —O—CO—, —$CH_2 O$—, —$OCH_2$—, —$CF_2 O$—, —$OCF_2$— or —$(CH_2)_n$—, where n is 2, 3 or 4,
L is the same or different at each instance and has the meaning given under formula M above, preferably is F, Cl, CN, or straight-chain or branched, optionally mono- or polyfluorinated alkyl, alkoxy, alkenyl, alkynyl, alkylcarbonyl, alkoxycarbonyl or alkylcarbonyloxy having 1 to 12 carbon atoms, preferably F,
L' and L" are each independently H, F or Cl,
$X^1$ to $X^3$ are independently of one another —CO—O—, —O—CO— or a single bond,
r is 0, 1, 2, 3 or 4,
s is 0, 1, 2 or 3,
t is 0, 1 or 2, and
x is 0 or 1.

Suitable polymerisable compounds are listed, for example, in Table G. Particularly preferred reactive mesogens are compounds of formulae RM-A RM-B, RM-C, RM-D, RM-E and RM-F as shown respectively in Examples 15, 16 and 22.

Suitable and conventionally used thermal initiators or photoinitiators can be added to the medium to facilitate the reaction, for example azo compounds or organic peroxides such as Luperox type initiators. Moreover, suitable conditions for the polymerisation and suitable types and amounts of initiators are known in the art and are described in the literature.

For example, when polymerising by means of UV light, a photoinitiator can be used that decomposes under UV irradiation to produce free radicals or ions that start the polymerisation reaction. For polymerising acrylate or methacrylate groups preferably a radical photoinitiator is used. For polymerising vinyl, epoxide or oxetane groups preferably a cationic photoinitiator is used. It is also possible to use a thermal polymerisation initiator that decomposes when heated to produce free radicals or ions that start the polymerisation. Typical radical photoinitiators are for example the commercially available Irgacure®, e.g. Irgacure 651 (available from BASF, containing 2,2-dimethoxy-1,2-diphenyl ethan-1-one), or Darocure® (Ciba Geigy AG, Basel, Switzerland). A typical cationic photoinitiator is for example UVI 6974 (Union Carbide). Further useful photoiniators include α-aminoketones, e.g. Irgacure 907, coumarins, phosphine oxides, e.g. Irgacure 2100, acyl phosphines, e.g. Irgacure 819.

In a particular embodiment the added polymerisation initiator, preferably photoinitiator, comprises, preferably consists of, one or more mesogenic polymerisation initiators, preferably one or more mesogenic photoinitiators, i.e. one or more reactive compounds which can initiate polymerisation and which themselves have anisotropic and mesogenic properties.

However, according to a particularly preferred embodiment no polymerisation initiator, in particular no photoinitiator, is used. In certain cases this may improve the VHR and reduce the tendency to produce ions in the switching layer.

In order to maintain and achieve a good VHR, preferably impurities in the reaction products of the polymerisation are kept at a minimum or are substantially avoided. In particular, residual reactive species and charged contaminants are suitably and preferably kept at a minimum. For example, in case UV polymerisation is carried out, in a preferred embodiment light with a comparatively long wavelength which is approaching the visible spectrum is used, preferably UV light in the range from 340 nm to 380 nm, and even more preferably from 360 nm to 380 nm is advantageously used. This way unwanted photodegradation or decomposition of components of the LC medium may be avoided or at least minimized. In case a photoinitiator is used, the irradiation wavelength and the photoinitiator can be suitably matched or adjusted. In an alternative case where no photoinitiator is used, which in some embodiments is preferable, the wavelength range may be set such that at least some of the polymerisable compounds can undergo a photoreaction and initiate the polymerisation reaction by themselves, while furthermore degradation or decomposition of non-reactive components of the LC medium may be avoided or at least minimized. Obtaining and setting of the desired wavelength range can be achieved by conventional methods known in the art, e.g. by using optical filters, in particular edge filters.

It has surprisingly been found that the medium according to the invention can be favourably used to produce polymeric structures in situ by providing the one or more polymerisable compounds as set forth above and below in the medium.

The polymerisable compounds in the medium may be chosen such that after the polymerisation a stable system is obtained, which e.g. can be stable in further processing steps such as thermal heating steps, wherein a good VHR may be maintained.

In an embodiment the medium according to the invention further comprises a polymeric component, in particular a polymeric network, wherein preferably the polymeric component is obtained by or respectively obtainable from polymerising the one or more polymerisable compounds as set forth above and below.

The provision of the polymeric component may be useful in stabilizing one or more states or phases of the LC medium.

Preferably, the polymeric component is contained in the medium in an amount, based on the overall contents of the medium, of 10% by weight or less, more preferably in an amount of 5% by weight or less, even more preferably in an amount of 2.5% by weight or less and particularly preferably in an amount of 1.25% by weight or less.

Preferably, the polymeric component is contained in the medium in an amount, based on the overall contents of the medium, in the range from 0.1% by weight to 10% by weight.

In the medium, in particular in the CLC medium according to the invention, the polymeric component can contribute to the advantageous properties. For example, the polymeric component may contribute to a significantly more stable scattering state, in particular the polydomain state, such that this scattering state may be maintained for more extended periods of time, in particular up to days, without refreshing or reapplying voltage. Furthermore, in the CLC medium the polymeric component as preferably provided according to the invention can favourably influence the scattering efficiency and appearance, e.g. in terms of uniformity and viewing angle dependence. Thereby colour effects which may arise under oblique viewing angles can be significantly reduced.

In a particularly preferred embodiment the liquid-crystalline medium comprises a polymeric component, where the polymeric component comprises a polymer network which is obtained by polymerisation of reactive mesogens, and where the reactive mesogens preferably contain at least one group selected from acrylate groups, particularly preferably from monoacrylate groups, diacrylate groups or triacrylate groups, vinyl ether groups and epoxide groups. Compounds containing acrylate group(s) as used herein comprise acrylic monomers, methacrylic monomers, and a mixtures of such monomers.

Polymerisation can be carried out using conventional methods. The polymerisation can be carried out in one or more steps. In particular, polymerisation of the polymerisable compound(s) is preferably achieved by exposure to heat or to actinic radiation, wherein exposure to actinic radiation means irradiation with light, like UV light, visible light or IR light, irradiation with X-rays or gamma rays, or irradiation with high-energy particles, such as ions or electrons. In a preferred embodiment free radical polymerisation is carried out.

Polymerisation can be carried out at a suitable temperature. In an embodiment polymerisation is performed at a temperature below the clearing point of the mesogenic mixture. In an alternative embodiment it is however also possible to carry out the polymerisation at or above the clearing point.

In an embodiment, polymerisation is carried out by photoirradiation, i.e. with light, preferably UV light. As a source for actinic radiation, for example a single UV lamp or a set of UV lamps can be used. When using a high lamp power the curing time can be reduced. Another possible source for photoradiation is a laser, like e.g. a UV laser, a visible laser or an IR laser.

In a preferred embodiment, polymerisation is carried out by adding to the chiral liquid crystalline host mixture one or more polymerisable compounds, preferably a mixture comprising mono-reactive and di-reactive compounds plus a suitable photoinitiator, and polymerising the polymerisable compounds, for example by exposure to UV irradiation.

Preferably the polymerisation is carried out in electro-optical cells maintained in a pre-determined state of the chiral liquid crystalline host mixture. In a preferred embodiment polymerisation, preferably polymerisation using UV light, is carried out when the medium is in the homeotropic state, wherein typically and preferably an electric field is applied.

The medium may contain additional compounds such as one or more pleochroic dyes, in particular one or more dichroic dyes, and/or other customary and suitable additives, preferably in an amount from 0.01% by weight to 25% by weight, more preferably from 0.1% by weight to 5% by weight.

Pleochroic dyes preferably are dichroic dyes and can be selected from for example azo dyes, anthraquinones, methine compounds, azomethine compounds, merocyanine compounds, naphthoquinones, tetrazines, pyrromethene dyes, malononitrile dyes, rylenes, in particular perylenes and terylenes, thiadiazole dyes, thienothiadiazole dyes, benzothiadiazoles, pyrromethenes and diketopyrrolopyrroles. Particular preference is given to azo compounds, anthraquinones, benzothiadiazoles, in particular as described in WO 2014/187529, diketopyrrolopyrroles, in particular as described in WO 2015/090497, and rylenes, in particular as described in WO 2014/090373.

However, preferably the switching layer does not comprise any dyes, which can provide higher transmission in the clear state and give an uncoloured or respectively white appearance.

Furthermore, in a particular embodiment the switching layer according to the invention is combined with another switching layer which comprises a guest-host LC medium in a window element to control and regulate the passage of light. The respective switching layers may be suitably separated by using for example one or more interjacent substrates or sheets, panes or panels.

According to the invention the present liquid-crystalline medium contains the one or more compounds of formula I as set forth above and below in an amount, based on the overall contents of the medium, of at least 15% by weight, preferably at least 20% by weight, more preferably at least 25% by weight, even more preferably at least 30% by weight and in particular at least 35% by weight.

In an embodiment the one or more compounds of formula I are contained in the medium in an amount, based on the overall contents of the medium, in the range from 15% by weight to 75% by weight, more preferably from 20% by weight to 65% by weight, even more preferably from 20% by weight to 55% by weight and in particular from 25% by weight to 50% by weight.

The medium according to the invention thus comprises at least one compound of formula I. In many cases it can however be beneficial and preferred that two, three or more compounds of formula I are contained in the medium.

Preferably the group

as defined in formula I denotes

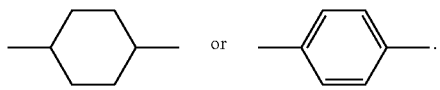

In another embodiment n as defined in formula I denotes 0.

In a preferred embodiment the one or more compounds of formula I are selected from compounds of formulae Ia, Ib and Ic, more preferably from compounds of formulae Ia and Ib

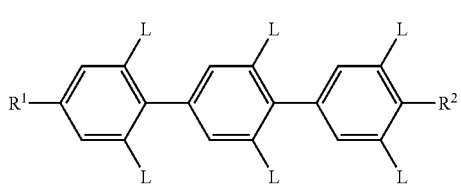

Ia

-continued

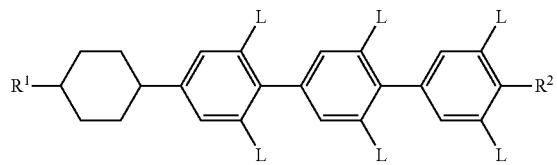

Ib

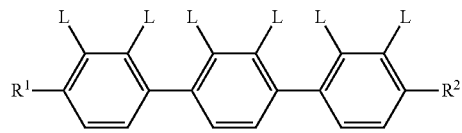

Ic wherein $R^1$ and $R^2$ denote, independently of one another, a group selected from F, Cl, CF$_3$, OCF$_3$, and straight-chain or branched alkyl or alkoxy having 1 to 15 carbon atoms or straight-chain or branched alkenyl having 2 to 15 carbon atoms which is unsubstituted, monosubstituted by CN or CF$_3$ or mono- or polysubstituted by halogen and wherein one or more CH$_2$ groups may be, in each case independently of one another, replaced by —O—, —S—, —CO—, —COO—, —OCO—, —OCOO— or —C≡C— in such a manner that oxygen atoms are not linked directly to one another, preferably from F, CF$_3$, OCF$_3$, straight-chain alkyl or alkoxy having 1 to 9 carbon atoms or alkenyl having 2 to 9 carbon atoms, and L is on each occurrence, identically or differently, H or halogen selected from F, Cl and Br, preferably from F and Cl, and more preferably is on each occurrence, identically or differently, H or F.

It is particularly preferred that in case the phenylene rings of the compounds of formula I are substituted that the substituent(s) is (are) F, and furthermore that the terminal groups $R^1$ and $R^2$ do not contain Cl.

In a preferred embodiment the amount of Cl-containing compounds included in the medium is limited, preferably is limited to 55% by weight or less, based on the overall contents of the medium, more preferably to 40% by weight or less, and even more preferably to 25% by weight or less. In a particularly preferred embodiment the liquid-crystalline medium contains no Cl-containing compounds.

Accordingly it is also preferred to limit the amount of Cl-containing compounds in the component of the LC medium which consists of the compounds of formula I as set forth above and below, preferably to 55% by weight or less, based on the overall contents of compounds of formula I which are comprised in the medium, more preferably to 40% by weight or less, and even more preferably to 25% by weight or less. In a particularly preferred embodiment the one or more compounds of formula I are selected from compounds which do not contain Cl.

Furthermore, in a preferred embodiment the amount of —C≡C— containing compounds, in particular tolane compounds, included in the medium is limited, preferably is limited to 50% by weight or less, based on the overall contents of the medium, more preferably to 25% by weight or less, and even more preferably to 10% by weight or less.

It is furthermore particularly preferred that at least one of the rings $A^{21}$, $A^{31}$ and $A^{41}$ according to formula I has at least one F substituent. It is furthermore particularly preferred that the rings $A^{21}$, $A^{31}$ and $A^{41}$ according to formula I together have at least two F substituents.

In the medium according to the invention the use of compounds containing CN is preferably and favourably limited, preferably to 75% by weight or below, more preferably to 50% by weight or below, even more preferably to 25% by weight or below and in particular to 5% by weight or below, and in a particularly preferred embodiment is completely avoided.

In addition to the one or more compounds of formula I the liquid-crystalline medium according to the invention preferably contains one or more further mesogenic compounds. It is preferred that these additional compounds are also added in view of contributing to or maintaining the favourable properties of the medium, e.g. a good VHR and a favourable stability.

In an embodiment the liquid-crystalline medium according to the invention further comprises one or more compounds of formula II

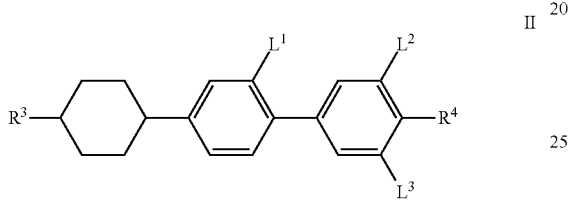

wherein $R^3$ and $R^4$ denote, independently of one another, a group selected from F, $CF_3$, $OCF_3$, CN, and straight-chain or branched alkyl or alkoxy having 1 to 15 carbon atoms or straight-chain or branched alkenyl having 2 to 15 carbon atoms which is unsubstituted, monosubstituted by CN or $CF_3$ or mono- or polysubstituted by halogen and wherein one or more $CH_2$ groups may be, in each case independently of one another, replaced by —O—, —S—, —CO—, —COO—, —OCO—, —OCOO— or —C≡C— in such a manner that oxygen atoms are not linked directly to one another, preferably from F, $CF_3$, $OCF_3$, CN, straight-chain alkyl or alkoxy having 1 to 9 carbon atoms or alkenyl having 2 to 9 carbon atoms, and $L^1$, $L^2$ and $L^3$ denote, independently of one another, H or F.

In a further embodiment the liquid-crystalline medium according to the invention further comprises one or more compounds of formula III

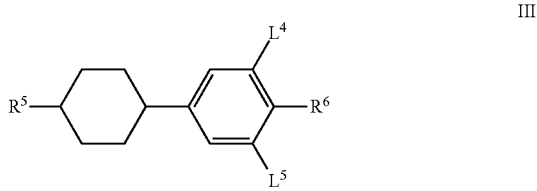

wherein $R^5$ and $R^6$ are defined as $R^3$ and $L^4$ and $L^5$ are defined as $L^1$ for formula II above.

It is particularly preferred that the medium further comprises one or more compounds of formula II and one or more compounds of formula III as set forth above.

Preferably the liquid-crystalline medium according to the invention further comprises one or more compounds of formula IV

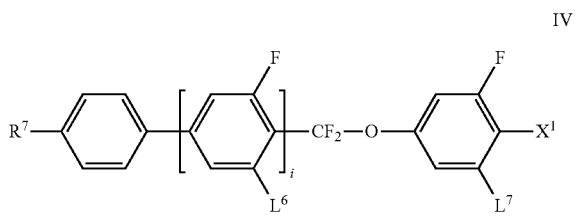

wherein $R^7$ denotes straight-chain or branched alkyl or alkoxy having 1 to 15 carbon atoms, preferably 1 to 7 carbon atoms, or straight-chain or branched alkenyl having 2 to 15 carbon atoms which is unsubstituted, monosubstituted by CN or $CF_3$ or mono- or polysubstituted by halogen and wherein one or more $CH_2$ groups may be, in each case independently of one another, replaced by —O—, —S—, —CO—, —COO—, —OCO—, —OCOO— or —C≡C— in such a manner that oxygen atoms are not linked directly to one another, i is 0, 1 or 2, $L^6$ and $L^7$ are, independently of one another, H or F, and $X^1$ denotes F, $CF_3$, $OCF_3$ or CN.

Compounds of formula II preferably are used in the medium in a total concentration from 1% by weight to 45% by weight, more preferably from 5% by weight to 25% by weight.

Compounds of formula III preferably are used in the medium in a total concentration from 1% by weight to 45% by weight, more preferably from 5% by weight to 25% by weight.

Compounds of formula IV preferably are used in the medium in a total concentration from 1% by weight to 45% by weight, more preferably from 5% by weight to 25% by weight.

It is particularly preferred that the medium comprises one or more compounds of formula I as set forth above and below, one or more compounds of formula II, one or more compounds of formula III and one or more compounds of formula IV.

In a particularly preferred embodiment one or more of the one or more compounds of formula I are selected from compounds of formulae I-1 and I-2

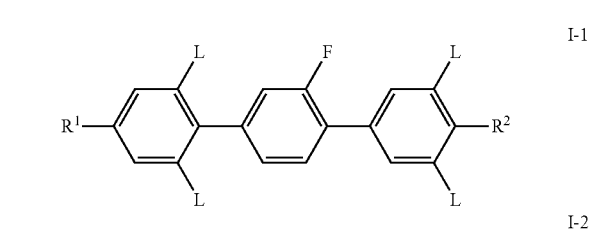

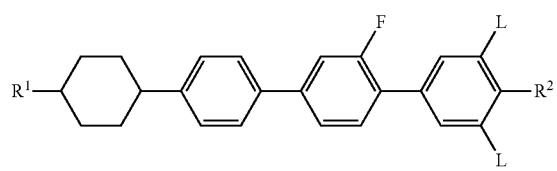

wherein

R¹ and R² are as defined for formula Ia above, and

L is on each occurrence, identically or differently, H or F.

Optionally the media according to the present invention may comprise further liquid crystal compounds in order to adjust the physical properties. Such compounds are known in the field. The concentration of these optionally further included liquid crystal compounds in the media according to the present invention is preferably from 0% by weight to 30% by weight, more preferably from 0.1% by weight to 20% by weight and most preferably from 1% by weight to 15% by weight.

Preferably the medium according to the present invention comprises one or more compounds of PGP-n-m, PGP-n-mV, PGU-n-F, PGIGI-n-F, GGP-n-F, GGP-n-Cl, in particular GGP-5-Cl, CPGP-n-m, CPGP-n-OT, CPGU-n-OT, DPGU-n-F, and/or CPP-n-m, CPG-n-F, CGU-n-F, BCH.n.F.F.F., in particular BCH.7.F.F.F, and/or CP-n-m, CP-n-N, and/or a compound of formula R-5011 or S-5011, and/or one or more reactive polymerisable compounds, and/or one or more polymerisation initiators, wherein the meanings and structures of the respective abbreviations or acronyms are explained and illustrated in the Tables below.

The liquid-crystalline media according to the present invention may contain further additives in usual concentrations. The total concentration of these further constituents is in the range of 0% to 10%, preferably 0.1% to 6%, based on the total mixture. The concentrations of the individual compounds used each are preferably in the range of 0.1% to 3%. The concentration of these and of similar additives is herein not taken into consideration for the values and ranges of the concentrations of the liquid crystal components and compounds of the liquid crystal media. This also holds for the concentration of dichroic dyes optionally used in the mixtures, which are not counted when the concentrations of the compounds respectively the components of the host mixture are specified. The concentration of the respective additives is always given relative to the final doped mixture.

The liquid-crystalline media according to the present invention consist of several compounds, preferably of 3 to 30, more preferably of 4 to 20, and most preferably of 4 to 16 compounds. These compounds are mixed in a conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e.g. homologous or eutectic mixtures of compounds or using so called multi-bottle systems, the constituents of which are ready to use mixtures themselves.

Many of the mesogenic compounds or mixtures thereof described above and below are commercially available. These compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here in greater detail. The media according to the invention are prepared in a manner conventional per se. In general, the components are dissolved in one another, preferably at elevated temperature. Suitable additives or substances can be added to modify the dielectric anisotropy, the viscosity and/or the alignment of the liquid-crystalline phases.

The medium may further comprise customary additives such as stabilizers, antioxidants, free radical scavengers, chain transfer agents, e.g. thioethers, and/or plasticizers.

In order to further enhance the homogeneous appearance of the obtained product or device, especially in the state of the material after the polymerisation or respectively polymer stabilisation and in particular for use in devices having a comparatively larger size such as large windows, it can be beneficial to add to the liquid-crystalline medium additives which contribute to a homogeneous polymerisation on a macroscopic scale, i.e. a scale which is visible to the eye. Therefore, in a preferred embodiment one or more stabilizers shown in Table E below and/or one or more surfactants, and in particular one or more surface-active compounds shown in Table H below, are added to the liquid-crystalline medium, preferably in concentrations in the range from 5 ppm to 10000 ppm.

In this respect, surfactants known in the art can be used, including anionic surfactants, for example sulfate, e.g. sodium lauryl sulfate, sulfonate, phosphate and carboxylate surfactants, cationic surfactants, for example secondary or tertiary amine and quaternary ammonium salt surfactants, zwitterionic surfactants, for example betaine, sultaine and phospholipid surfactants, and nonionic surfactants, for example long chain alcohol and phenol, ether, ester or amide nonionic surfactants, in particular alkyl polyethers and polyethoxy alcohols. It is preferred to use nonionic surfactant. Particularly preferred surfactants are selected from polyethoxylated nonionic surfactant, organosilicones such as polyethersiloxanes and polyether siloxane copolymers, modified polydimethylsiloxanes such a BYK-310 (BYK), silicone acrylates such as TEGO Rad 2500 (Evonik), poloxamer copolymers, preferably copolymers comprising units of polyethylene oxide and polypropylene oxide, and fluorosurfactant(s).

The term "alkyl" according to the present invention preferably encompasses straight-chain and branched alkyl groups having 1-7 carbon atoms, particularly the straight-chain groups methyl, ethyl, propyl, butyl, pentyl, hexyl and heptyl. Groups having 2-5 carbon atoms are generally preferred.

An alkoxy can be straight-chain or branched, and it preferably is straight-chain and has 1, 2, 3, 4, 5, 6 or 7 carbon atoms, and accordingly is preferably methoxy, ethoxy, propoxy, butoxy, pentoxy, hexoxy or heptoxy.

The term "alkenyl" according to the present invention preferably encompasses straight-chain and branched alkenyl groups having 2-7 carbon atoms, in particular the straight-chain groups. Particularly preferred alkenyl groups are $C_2$-$C_7$-1E-alkenyl, $C_4$-$C_7$-3E-alkenyl, $C_5$-$C_7$-4E-alkenyl, $C_6$-$C_7$-5E-alkenyl and $C_7$-6E-alkenyl, in particular $C_2$-$C_7$-1E-alkenyl, $C_4$-$C_7$-3E-alkenyl and $C_5$-$C_7$-4E-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. Groups having up to 5 carbon atoms are generally preferred.

Fluorinated alkyl or alkoxy preferably comprises $CF_3$, $OCF_3$, $CFH_2$, $OCFH_2$, $CF_2H$, $OCF_2H$, $C_2F_5$, $OC_2F_5$, $CFHCF_3$, $CFHCF_2H$, $CFHCFH_2$, $CH_2CF_3$, $CH_2CF_2H$, $CH_2CFH_2$, $CF_2CF_2H$, $CF_2CFH_2$, $OCFHCF_3$, $OCFHCF_2H$, OCFHCFH$_2$, OCH$_2$CF$_3$, OCH$_2$CF$_2$H, OCH$_2$CFH$_2$, OCF$_2$CF$_2$H, OCF$_2$CFH$_2$, C$_3$F$_7$ or OC$_3$F$_7$, in particular CF$_3$, OCF$_3$, CF$_2$H, OCF$_2$H, C$_2$F$_5$, OC$_2$F$_5$, CFHCF$_3$, CFHCF$_2$H, CFHCFH$_2$, CF$_2$CF$_2$H, CF$_2$CFH$_2$, OCFHCF$_3$, OCFHCF$_2$H, OCFHCFH$_2$, OCF$_2$CF$_2$H, OCF$_2$CFH$_2$, C$_3$F$_7$ or OC$_3$F$_7$, particularly preferably OCF$_3$ or OCF$_2$H. Fluoroalkyl in a preferred embodiment encompasses straight-chain groups with terminal fluorine, i.e. fluoromethyl, 2-fluoroethyl, 3-fluoropropyl, 4-fluorobutyl, 5-fluoropentyl, 6-fluorohexyl and 7-fluoroheptyl. Other positions of fluorine are not precluded, however.

Oxaalkyl preferably encompasses straight-chain groups of the formula C$_n$H$_{2n+1}$—O—(CH$_2$)$_m$, where n and m are each, independently of one another, from 1 to 6. Preferably, n=1 and m is 1 to 6.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

Halogen is preferably F or Cl, in particular F.

If one of the above mentioned groups is an alkyl group in which one CH$_2$ group has been replaced by —CH=CH—, this can be straight-chain or branched. It is preferably straight-chain and has 2 to 10 carbon atoms. Accordingly, it is in particular vinyl, prop-1- or prop-2-enyl, but-1-, -2- or but-3-enyl, pent-1-, -2-, -3- or pent-4-enyl, hex-1-, -2-, -3-, -4- or hex-5-enyl, hept-1-, -2-, -3-, -4-, -5- or hept-6-enyl, oct-1-, -2-, -3-, -4-, -5-, -6- or oct-7-enyl, non-1-, -2-, -3-, -4-, -5-, -6-, -7- or non-8-enyl, dec-1-, -2-, -3-, -4-, -5-, -6-, -7-, -8- or dec-9-enyl.

If one of the above mentioned groups is an alkyl group in which one CH$_2$ group has been replaced by —O— and one has been replaced by —CO—, these are preferably adjacent. These thus contain an acyloxy group —CO—O— or an oxycarbonyl group —O—CO—. These are preferably straight-chain and have 2 to 6 carbon atoms.

They are accordingly in particular acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxy-ethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonyl-methyl, propoxycarbonylmethyl, butoxycarbonylmethyl, 2-(meth-oxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxy-carbonyl)butyl.

If one of the above mentioned groups is an alkyl group in which one CH$_2$ group has been replaced by unsubstituted or substituted —CH=CH— and an adjacent CH$_2$ group has been replaced by CO, CO—O or O—CO, this can be straight-chain or branched. It is preferably straight-chain and has 4 to 13 carbon atoms. Accordingly, it is in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxy-octyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If one of the above mentioned groups is an alkyl or alkenyl group which is monosubstituted by CN or CF$_3$, this group is preferably straight-chain. The substitution by CN or CF$_3$ is in any position.

If one of the above mentioned groups is an alkyl or alkenyl group which is at least monosubstituted by halogen, this group is preferably straight-chain and halogen is preferably F or Cl, more preferably F. In the case of polysubstitution, halogen is preferably F. The resulting groups also include perfluorinated groups. In the case of monosubstitution, the fluoro or chloro substituent can be in any desired position, but is preferably in the ω-position.

Compounds containing branched groups may occasionally be of importance owing to better solubility in some conventional liquid-crystalline base materials. However, they are particularly suitable as chiral dopants if they are optically active.

Branched groups of this type generally contain not more than one chain branch. Preferred branched groups are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy or 1-methylheptoxy.

If one of the above mentioned groups is an alkyl group in which two or more CH$_2$ groups have been replaced by —O— and/or —CO—O—, this can be straight-chain or branched. It is preferably branched and has 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-bis-carboxynonyl, 10,10-biscarboxydecyl, bis(methoxycarbonyl)methyl, 2,2-bis-(methoxycarbonyl)ethyl, 3,3-bis(methoxycarbonyl)propyl, 4,4-bis(methoxy-carbonyl)butyl, 5,5-bis(methoxycarbonyl)pentyl, 6,6-bis(methoxycarbonyl)-hexyl, 7,7-bis(methoxycarbonyl)heptyl, 8,8-bis(methoxycarbonyl)octyl, bis-(ethoxycarbonyl)methyl, 2,2-bis(ethoxycarbonyl)ethyl, 3,3-bis(ethoxy-carbonyl)propyl, 4,4-bis(ethoxycarbonyl)butyl or 5,5-bis(ethoxycarbonyl)-pentyl.

In another aspect of the invention a switching layer is provided which comprises the medium according to the invention.

The switching layer according to the invention preferably has a thickness in the range from 0.5 μm to 100 μm, more preferably from 1 μm to 50 μm, even more preferably from 2 μm to 25 μm and in particular from 4 μm to 15 μm.

It is also possible to provide two or more layers in combination, for example in a window element, where the layers are separated by substrates or suitable sheets, panes or panels.

According to the invention furthermore a switching element is provided which comprises the switching layer according to the invention. In particular, the switching layer is arranged between two susbtrates.

The substrates may comprise, preferably consist of, glass or a polymer, in particular glass, polyethylene terephthalate (PET), polyethylene naphthalate (PEN), polyvinylbutyral (PVB), polymethyl methacrylate (PMMA), polycarbonate (PC), polyimide (PI), COP (cyclic olefin polymers) or TAC (triacetylcellulose).

The switching element can influence the passage of light, in particular by electrically switching the switching layer between an optically transparent or clear state and a scattering state.

In the optically transparent state according to the invention the switching element preferably has a haze, determined according to ASTM D 1003, of less than 20%, more preferably less than 15%, even more preferably less than 10% and in particular less than 5%.

In the scattering state according to the invention the switching element preferably has a haze, determined according to ASTM D 1003, of more than 75%, more preferably more than 85%, even more preferably more than 90%. It is particularly preferred that in the scattering state the switching element according to the invention has a haze, determined according to ASTM D 1003, of 95% or more.

For the measurement of haze hazemeters made by BYK-Gardner may be used. It is also possible to use spectrophotometers.

The switching element according to the invention preferably comprises one or more layers which block UV light. In particular, it preferably comprises one or more layers which do not allow, or only do so to a very small proportion, the passage of light having a wavelength of less than 350 nm, preferably extending to less than 360 nm, particularly preferably even extending to less than 380 nm.

Furthermore, the invention relates to a window element which comprises the switching layer or the switching element according to the invention. The window element can be useful in several window applications, e.g. for providing privacy or anti-glare. The window element may for example be arranged as a switchable glazing unit. It may be incorporated in an insulated glazing unit.

In the present invention and especially in the following Examples, the structures of the mesogenic compounds are indicated by means of abbreviations, also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1-E-alkenyl, each having n, m and l C atoms respectively. Table A lists the codes used for the ring elements of the core structures of the compounds, while Table B shows the linking groups. Table C gives the meanings of the codes for the left-hand or right-hand end groups. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

Ring elements

| | | | | |
|---|---|---|---|---|
| C | (cyclohexane) | | | |
| P | (phenyl) | | | |
| D | (dioxane) | DI | (dioxane isomer) | |
| A | (tetrahydropyran) | AI | (tetrahydropyran isomer) | |
| G | (fluorophenyl) | GI | (fluorophenyl isomer) | |
| U | (difluorophenyl) | UI | (difluorophenyl isomer) | |
| Y | (difluorophenyl) | | | |
| M | (pyrimidine) | MI | (pyrimidine isomer) | |

TABLE A-continued
| | Ring elements | | |
|---|---|---|---|
| N | 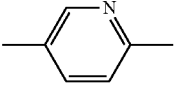 | NI | 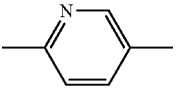 |
| Np | 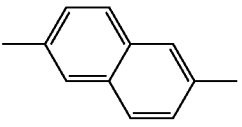 | dH | 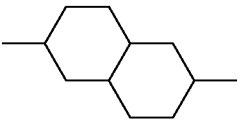 |
| N3f | 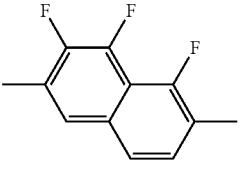 | N3fI | 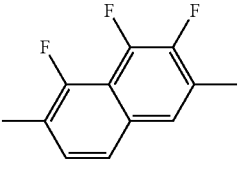 |
| tH | 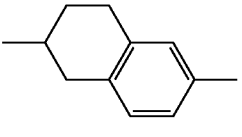 | tHI | 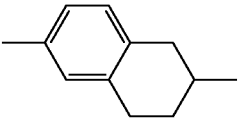 |
| tH2f | 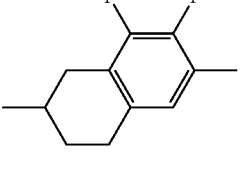 | tH2fI | 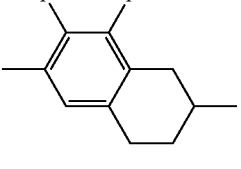 |
| K | 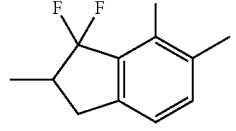 | KI | 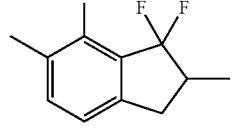 |
| L | 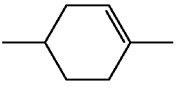 | LI |  |
| F | 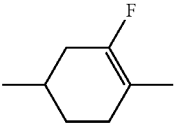 | FI | 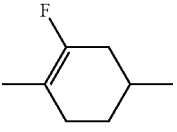 |
| Nf | 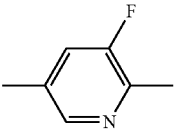 | NfI | 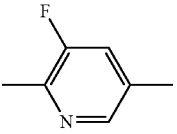 |

TABLE B

| Linking groups | | | |
|---|---|---|---|
| E | —$CH_2CH_2$— | Z | —CO—O— |
| V | —CH=CH— | ZI | —O—CO— |
| X | —CF=CH— | O | —$CH_2$—O— |
| XI | —CH=CF— | OI | —O—$CH_2$— |
| B | —CF=CF— | Q | —$CF_2$—O— |
| T | —C≡C— | QI | —O—$CF_2$— |
| W | —$CF_2CF_2$— | | |

TABLE C

| End groups | | | |
|---|---|---|---|
| Left-hand side | | Right-hand side | |
| Used alone | | | |
| -n- | $C_nH_{2n+1}$— | -n | —$C_nH_{2n+1}$ |
| -nO- | $C_nH_{2n+1}$—O— | -nO | —O—$C_nH_{2n+1}$ |
| —V— | $CH_2$=CH— | —V | —CH=$CH_2$ |
| -nV- | $C_nH_{2n+1}$—CH=CH— | -nV | —$C_nH_{2n}$—CH=$CH_2$ |
| -Vn- | $CH_2$=CH—$C_nH_{2n+1}$— | -Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| —N— | N≡C— | —N | —C≡N |
| —S— | S=C=N— | —S | —N=C=S |
| —F— | F— | —F | —F |
| —Cl— | Cl— | —Cl | —Cl |
| -M- | $CFH_2$— | -M | —$CFH_2$ |
| -D- | $CF_2H$— | -D | —$CF_2H$ |
| -T- | $CF_3$— | -T | —$CF_3$ |
| -MO- | $CFH_2O$— | -OM | —$OCFH_2$ |
| -DO- | $CF_2HO$— | -OD | —$OCF_2H$ |
| -TO- | $CF_3O$— | -OT | —$OCF_3$ |
| -FXO- | $CF_2$=CH—O— | -OXF | —O—CH=$CF_2$ |
| -A- | H—C≡C— | -A | —C≡C—H |
| -nA- | $C_nH_{2n+1}$—C≡C— | -An | —C≡C—$C_nH_{2n+1}$ |
| -NA- | N≡C—C≡C— | -AN | —C≡C—C≡N |
| Used together with one another and with others | | | |
| -...A...- | —C≡C— | -...A... | —C≡C— |
| -...V...- | CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | wherein n and m each denote integers, and the three dots " . . . " are place-holders for other abbreviations from this table.

The following table shows illustrative structures together with their respective abbreviations. These are shown in order to illustrate the meaning of the rules for the abbreviations. They furthermore represent compounds which may be preferably used.

TABLE D

Illustrative structures $C_nH_{2n+1}$—⬡—⬡—$C_mH_{2m+1}$

CC-n-m $C_nH_{2n+1}$—⬡—⬡—O—$C_mH_{2m+1}$

CC-n-Om

TABLE D-continued
Illustrative structures
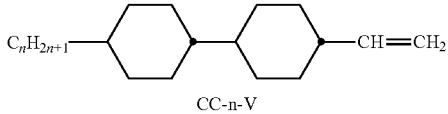
CC-n-V
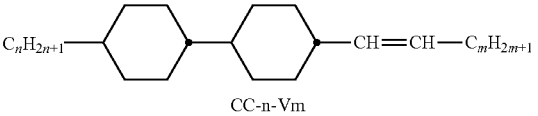
CC-n-Vm
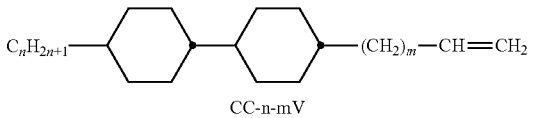
CC-n-mV
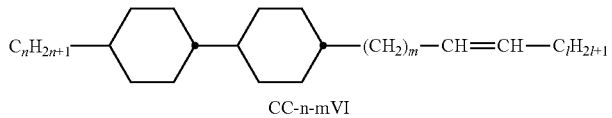
CC-n-mVl
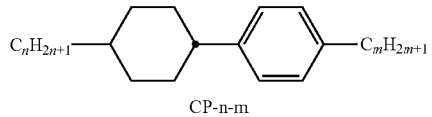
CP-n-m
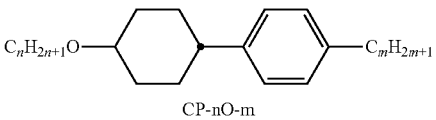
CP-nO-m
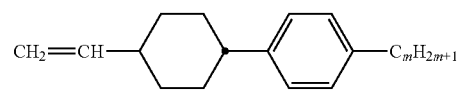
CP-V-m
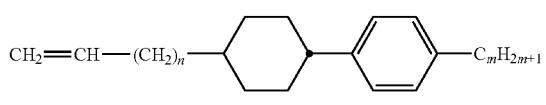
CP-Vn-m
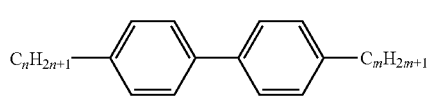
PP-n-m
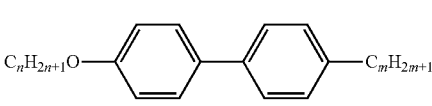
PP-nO-m
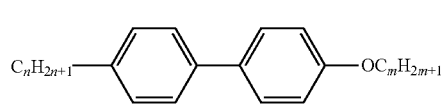
PP-n-Om TABLE D-continued
Illustrative structures
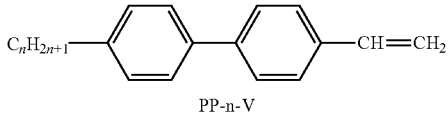
PP-n-V
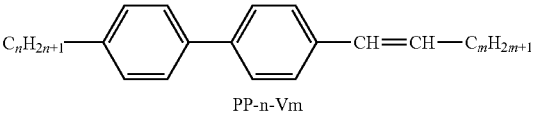
PP-n-Vm
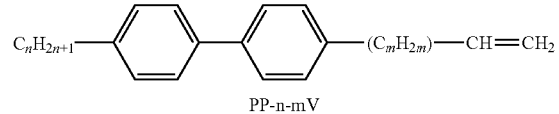
PP-n-mV
CCP-n-m
CCP-nO-m
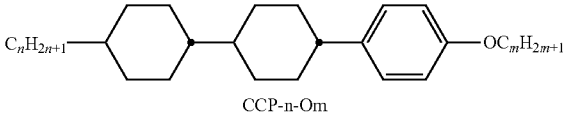
CCP-n-Om
CCP-n-V
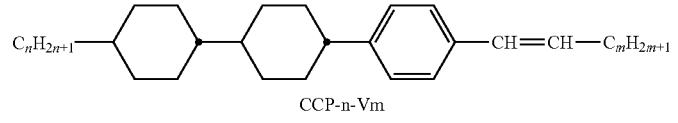
CCP-n-Vm
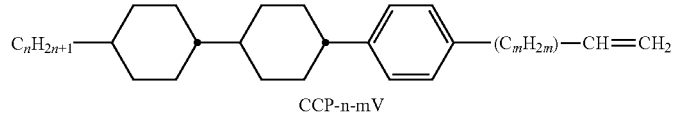
CCP-n-mV
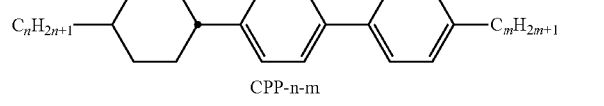
CPP-n-m
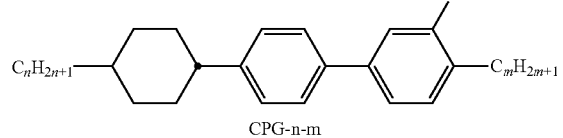
CPG-n-m TABLE D-continued
Illustrative structures
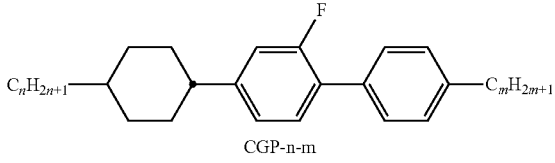
CGP-n-m
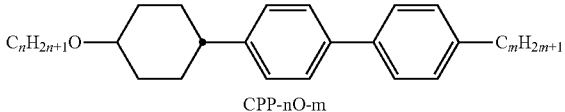
CPP-nO-m
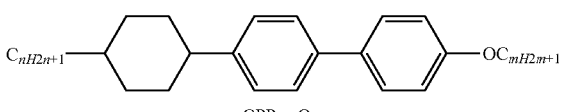
CPP-n-Om
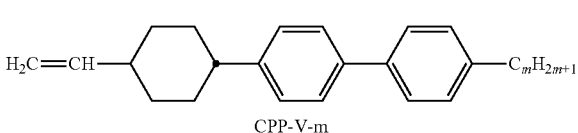
CPP-V-m
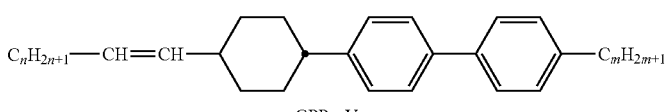
CPP-nV-m
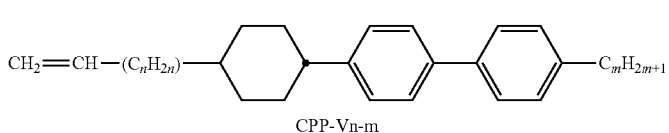
CPP-Vn-m
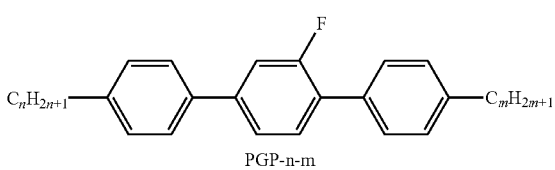
PGP-n-m
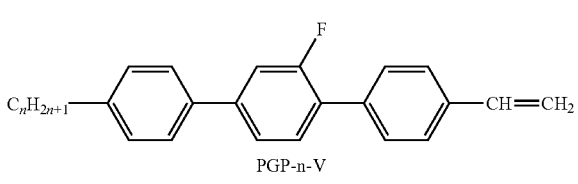
PGP-n-V
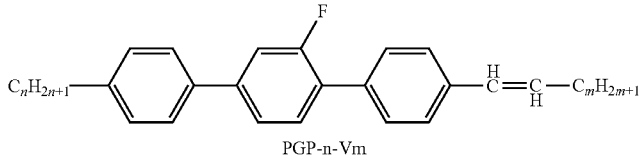
PGP-n-Vm
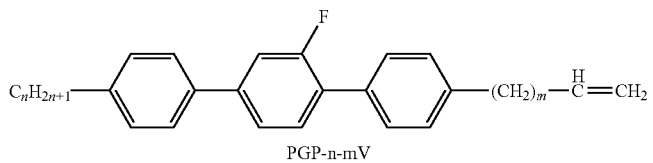
PGP-n-mV TABLE D-continued Illustrative structures PGP-n-mVI CCEC-n-Om CPPC-n-m CGPC-n-m CCPC-n-m CCZPC-n-m CPGP-n-m CPGP-n-mV CPGP-n-mVI PGIGP-n-m TABLE D-continued
Illustrative structures
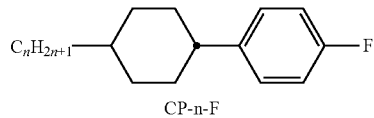
CP-n-F
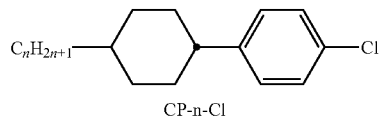
CP-n-Cl
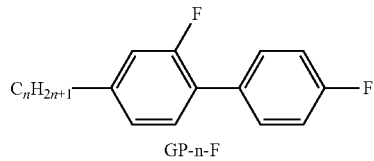
GP-n-F
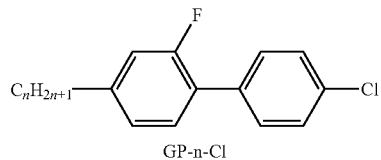
GP-n-Cl
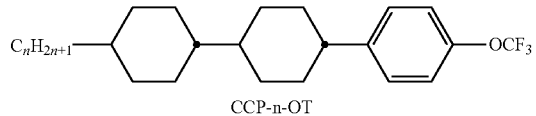
CCP-n-OT
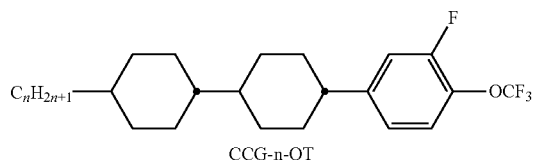
CCG-n-OT
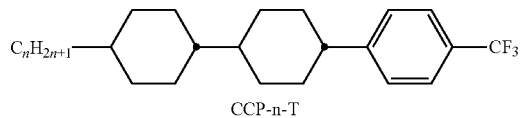
CCP-n-T
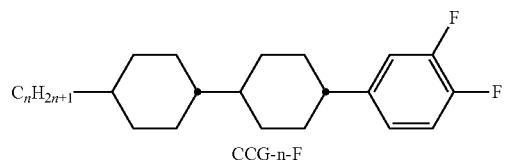
CCG-n-F
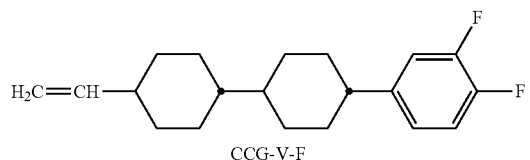
CCG-V-F TABLE D-continued
| Illustrative structures |
|---|
| 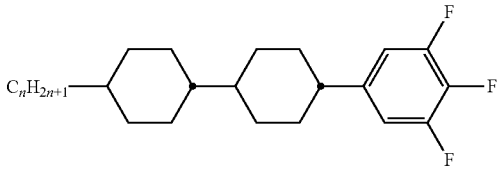<br>CCU-n-F |
| 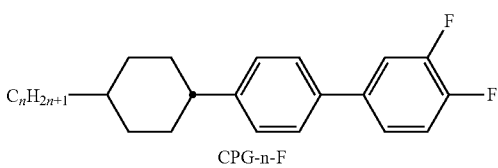<br>CPG-n-F |
| 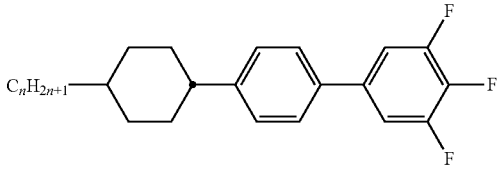<br>CPU-n-F |
| 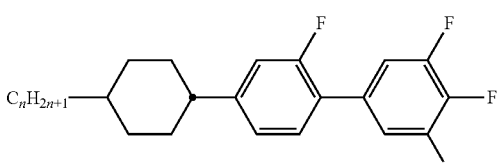<br>CGU-n-F |
| 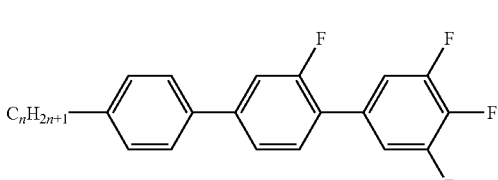<br>PGU-n-F |
| 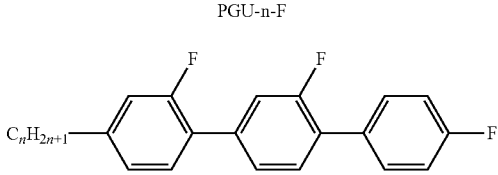<br>GGP-n-F |
| 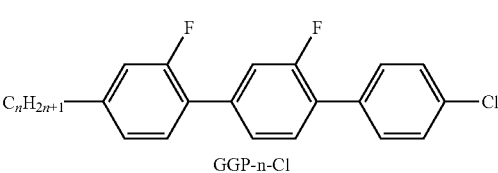<br>GGP-n-Cl |
| 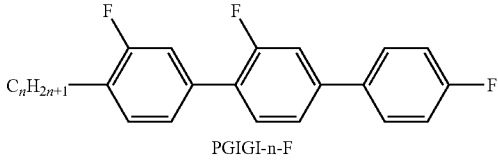<br>PGIGI-n-F |

TABLE D-continued
Illustrative structures
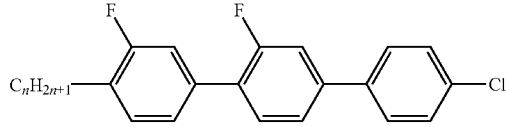
PGIGI-n-Cl
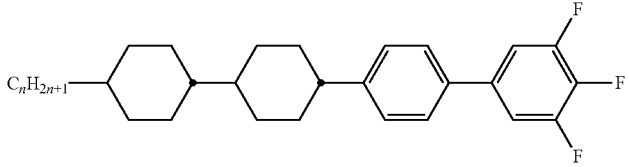
CCPU-n-F
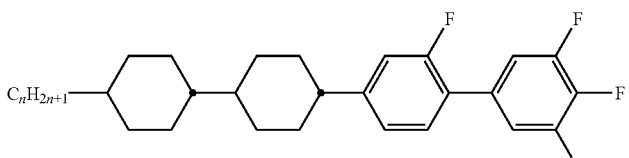
CCGU-n-F
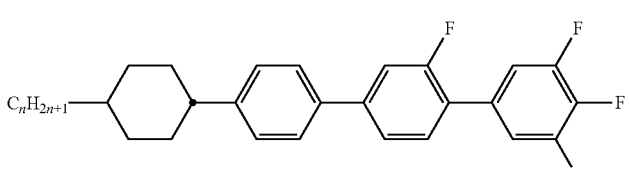
CPGU-n-F
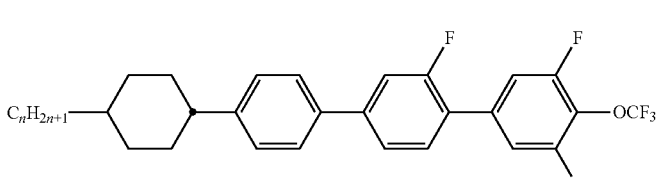
CPGU-n-OT
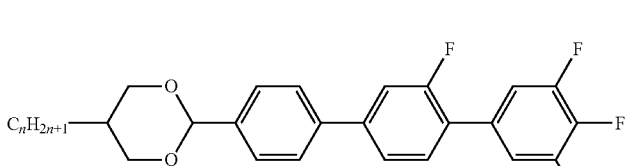
DPGU-n-F
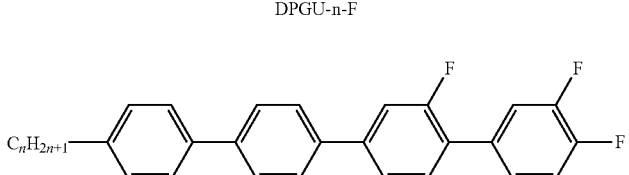
PPGU-n-F TABLE D-continued
Illustrative structures
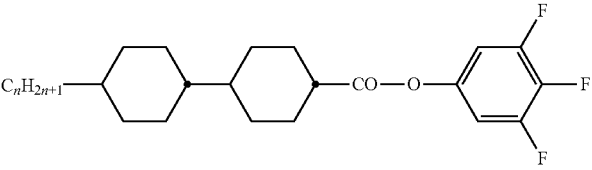
CCZU-n-F
CCQP-n-F
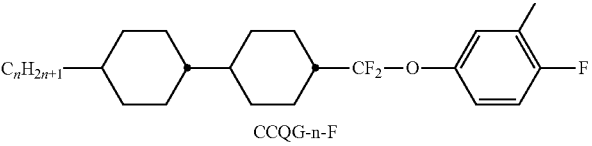
CCQG-n-F
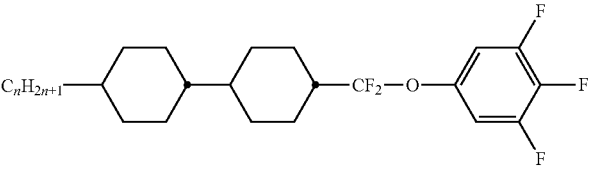
CCQU-n-F
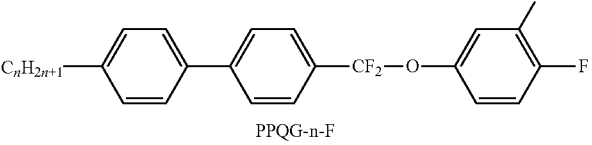
PPQG-n-F
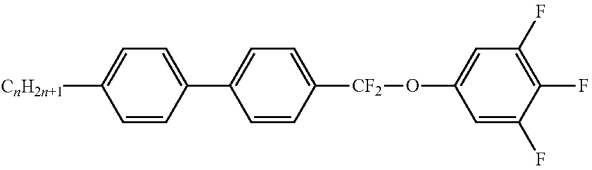
PPQU-n-F
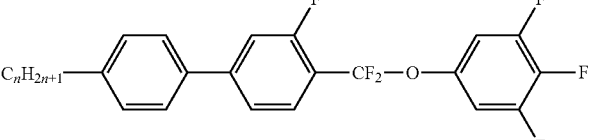
PGQU-n-F
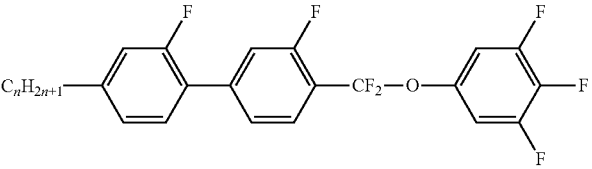
GGQU-n-F TABLE D-continued
Illustrative structures
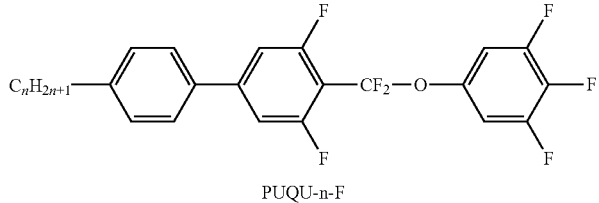
PUQU-n-F
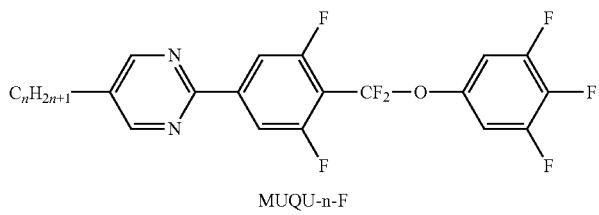
MUQU-n-F
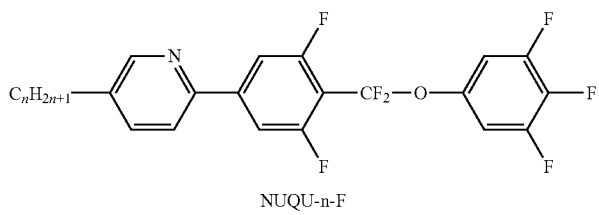
NUQU-n-F
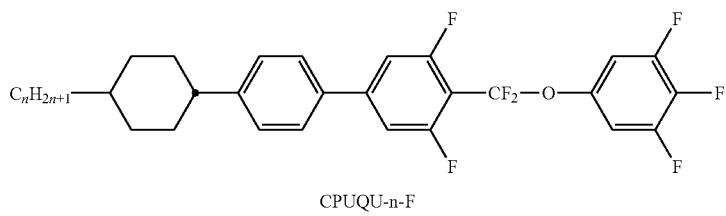
CPUQU-n-F
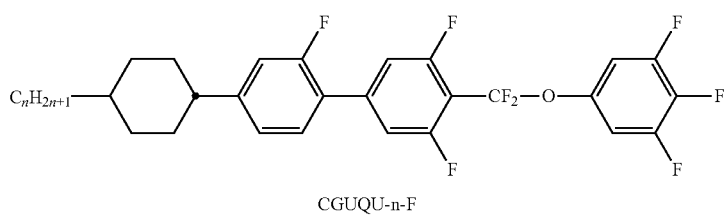
CGUQU-n-F
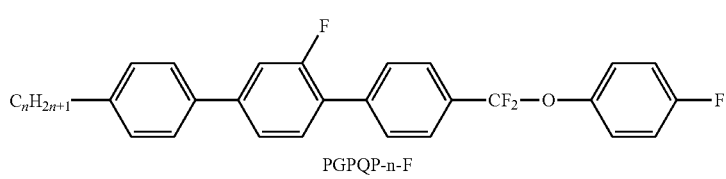
PGPQP-n-F
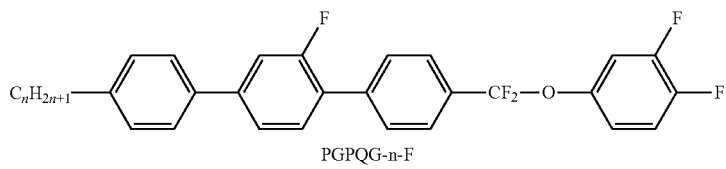
PGPQG-n-F TABLE D-continued
| Illustrative structures |
|---|
| 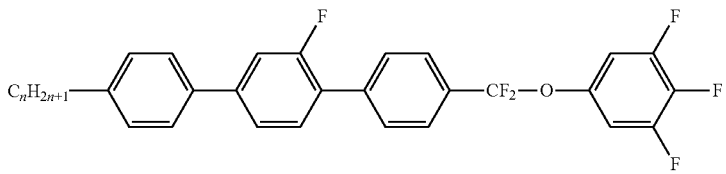 PGPQU-n-F |
| 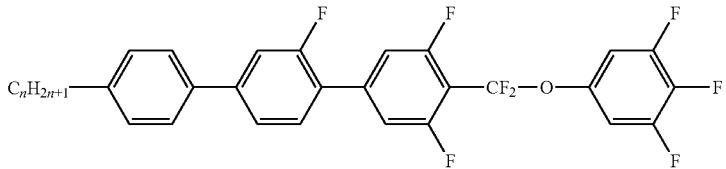 PGUQU-n-F |
| 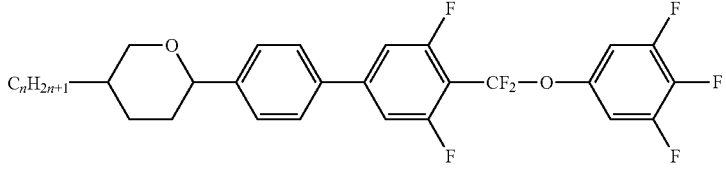 APUQU-n-F |
| 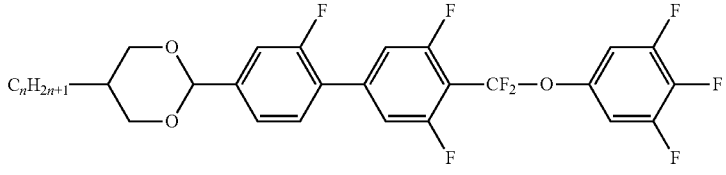 DGUQU-n-F |
| 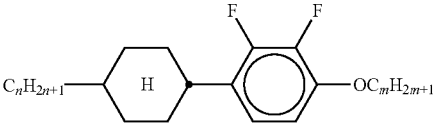 CY-n-Om |
| 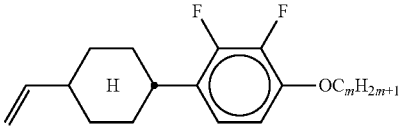 CY-V-Om |
| 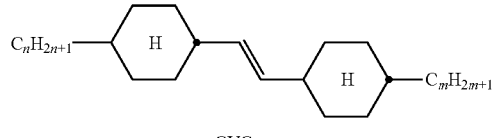 CVC-n-m |
| 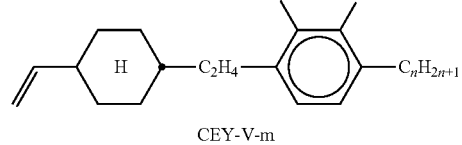 CEY-V-m |

TABLE D-continued
Illustrative structures
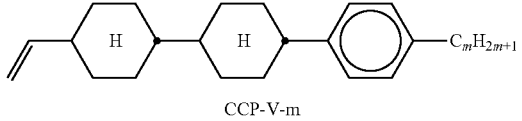
CCP-V-m
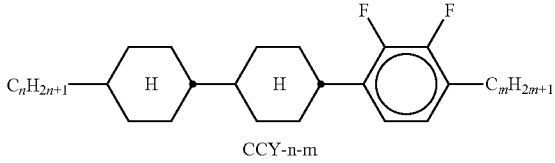
CCY-n-m
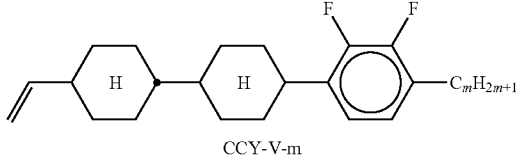
CCY-V-m
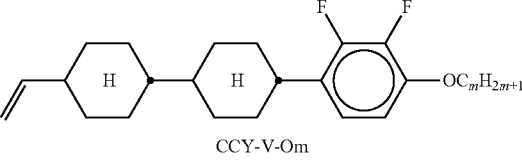
CCY-V-Om
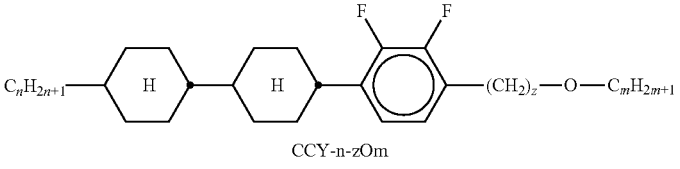
CCY-n-zOm
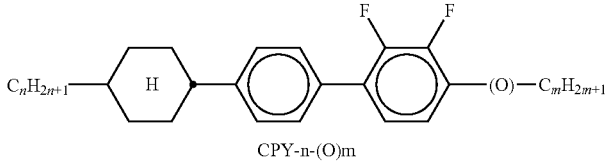
CPY-n-(O)m
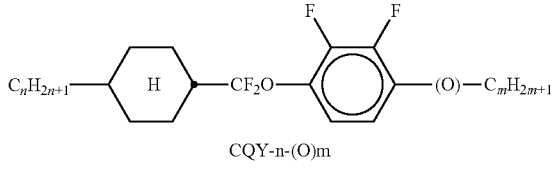
CQY-n-(O)m
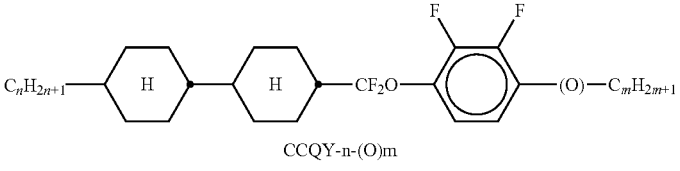
CCQY-n-(O)m
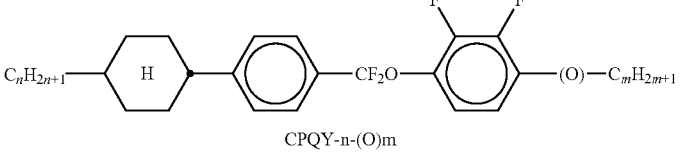
CPQY-n-(O)m TABLE D-continued
Illustrative structures
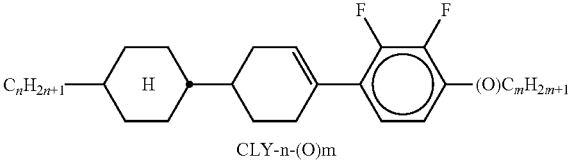
CLY-n-(O)m
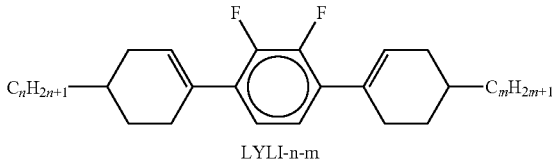
LYLI-n-m
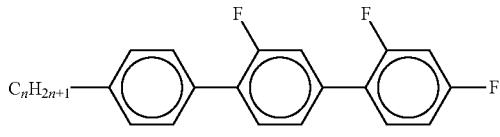
PGIGI-n-F
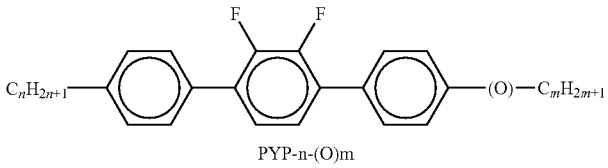
PYP-n-(O)m
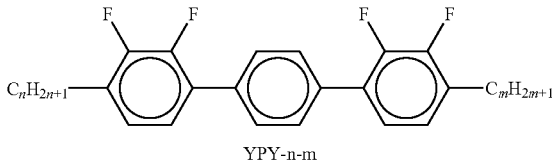
YPY-n-m
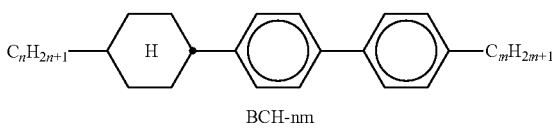
BCH-nm
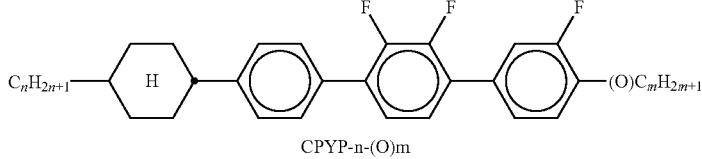
CPYP-n-(O)m
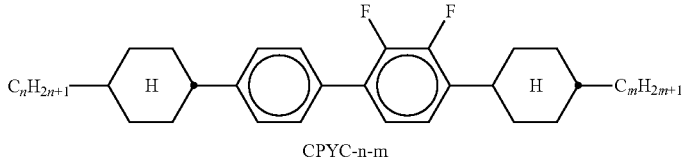
CPYC-n-m
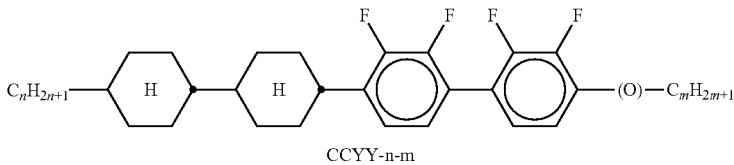
CCYY-n-m TABLE D-continued
Illustrative structures
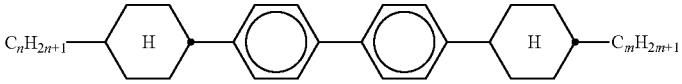
CBC-nm
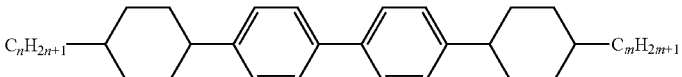
CBC-nmF
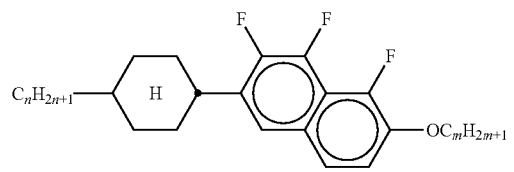
CNap-n-Om
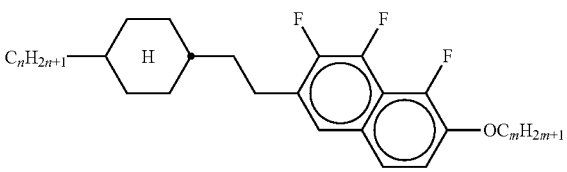
CENap-n-Om
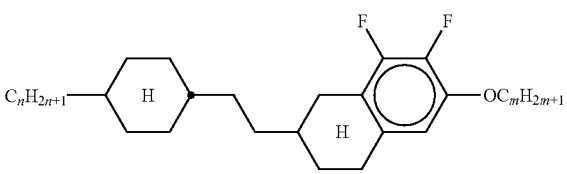
CETNap-n-Om
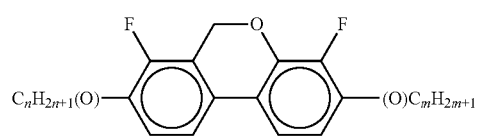
DFDBC-n(O)-(O)m
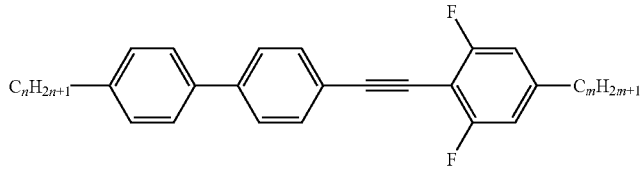
PPTUI-n-m
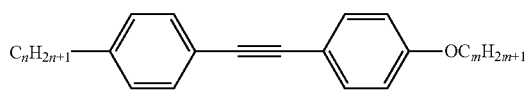
PTP-nOm TABLE D-continued Illustrative structures $C_nH_{2n+1}$—⟨cyclohexyl⟩—⟨phenyl⟩—CN PCH-n $C_nH_{2n+1}$—⟨cyclohexyl⟩—⟨phenyl⟩—$OC_mH_{2m+1}$ PCH-nOm $C_nH_{2n+1}$—⟨cyclohexyl⟩—⟨phenyl⟩—⟨phenyl(3,4,5-triF)⟩

BCH-nF•F•F $C_7H_{15}$—⟨cyclohexyl⟩—⟨phenyl⟩—⟨phenyl(3,4,5-triF)⟩

BCH-7F•F•F $C_nH_{2n+1}$—⟨cyclohexyl⟩—⟨phenyl⟩—⟨phenyl(3,4-diF)⟩

BCH-nF•F wherein n, m and l preferably, independently of one another, denote 1 to 7.

The following table shows illustrative compounds which can be used as stabilizers in the media according to the present invention.

Table E shows possible stabilizers which can be added to the LC media according to the invention, wherein n denotes an integer from 1 to 12, preferably 1, 2, 3, 4, 5, 6, 7 or 8, terminal methyl groups are not shown.

TABLE E

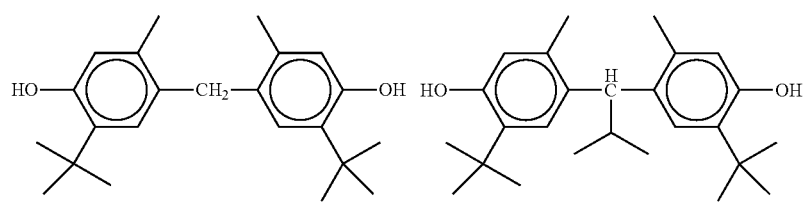

TABLE E-continued
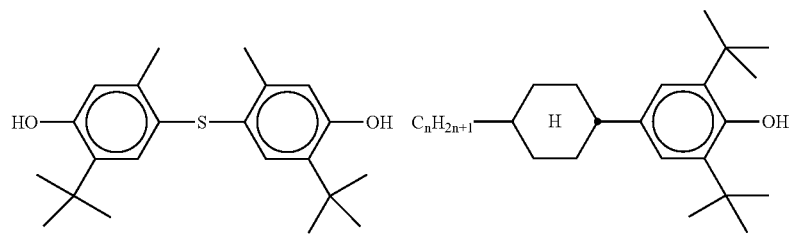
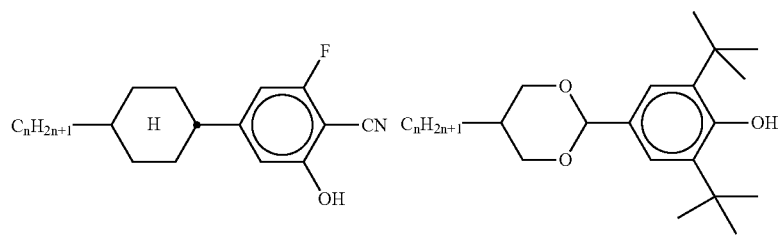
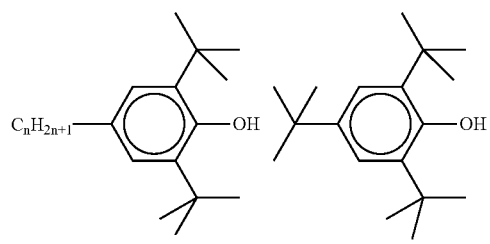
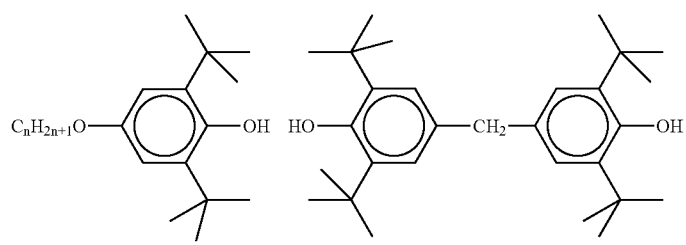
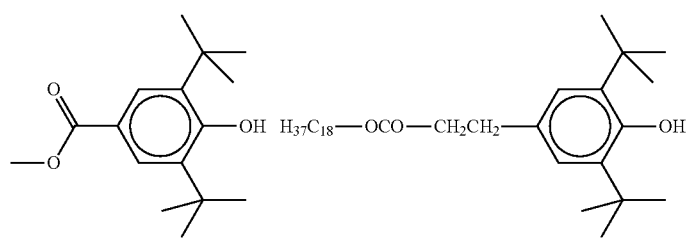
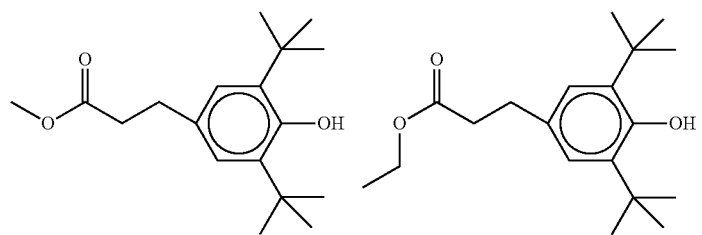

TABLE E-continued
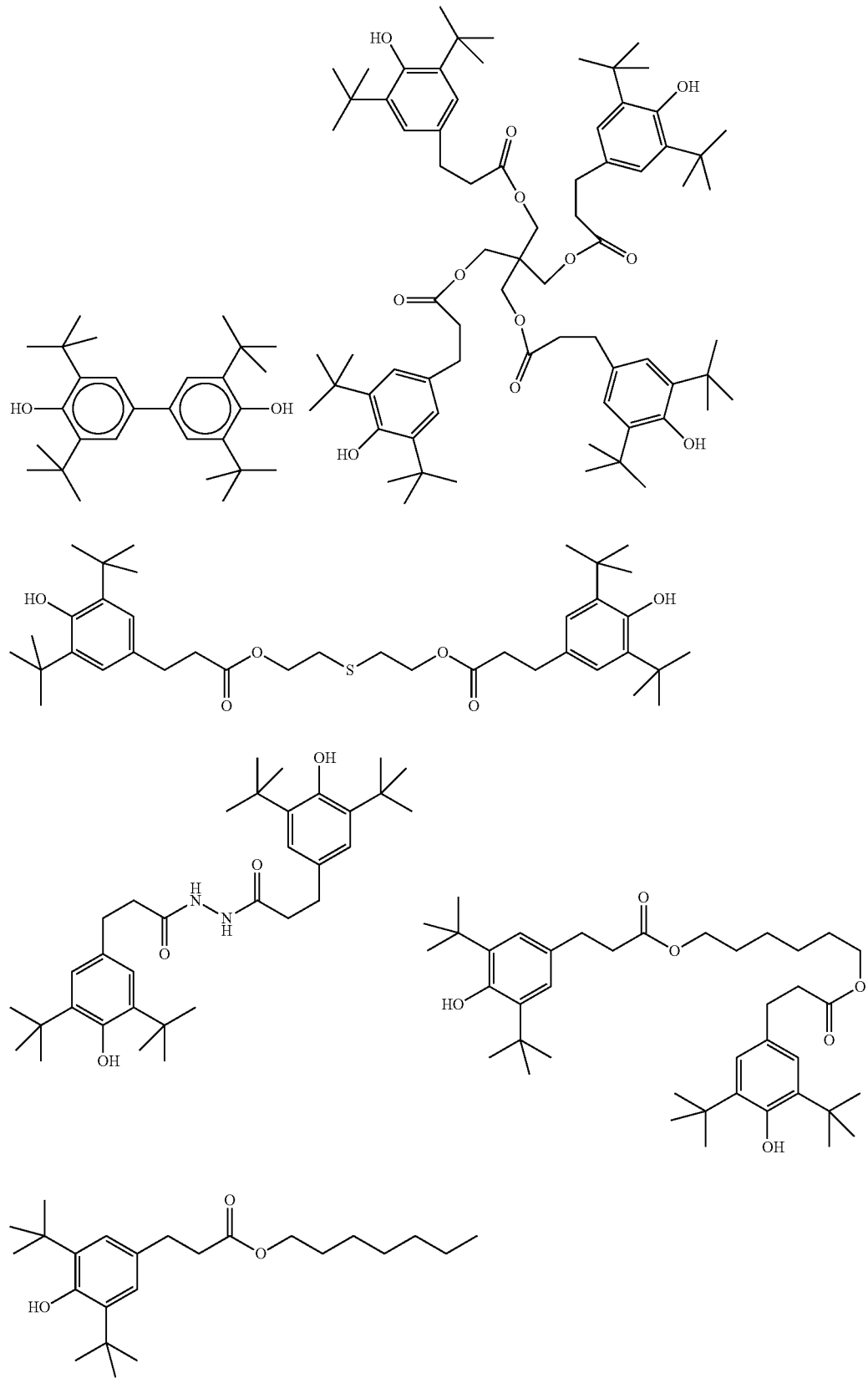

TABLE E-continued
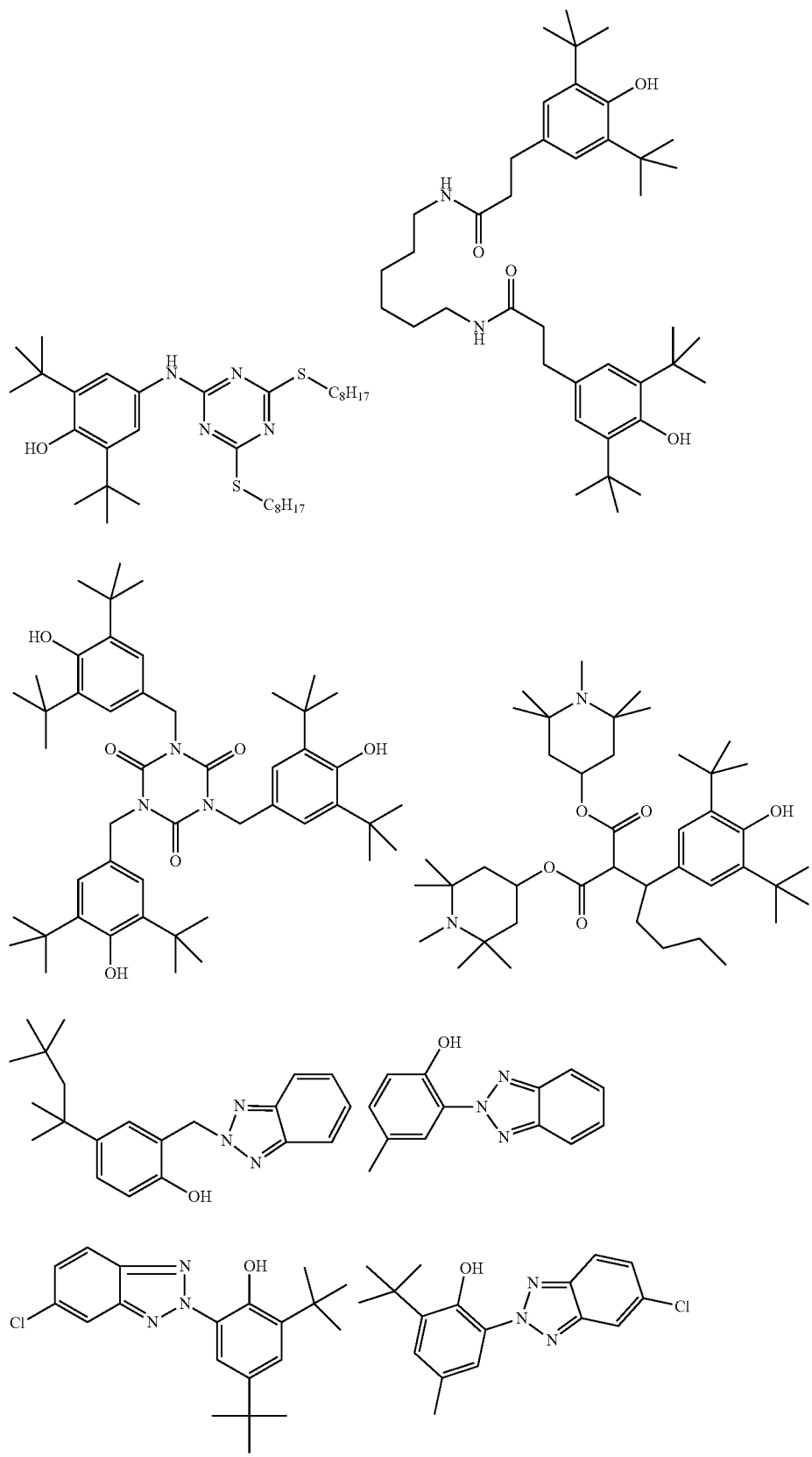

TABLE E-continued
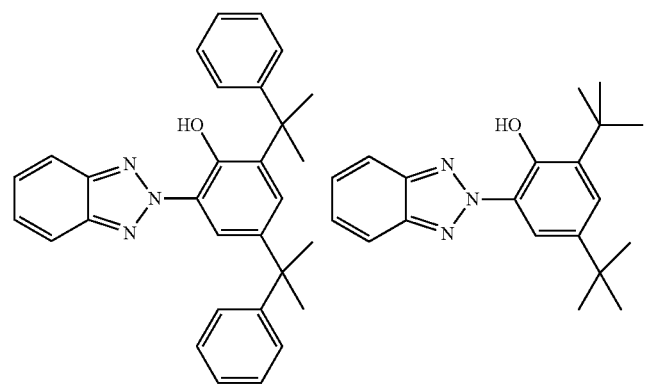
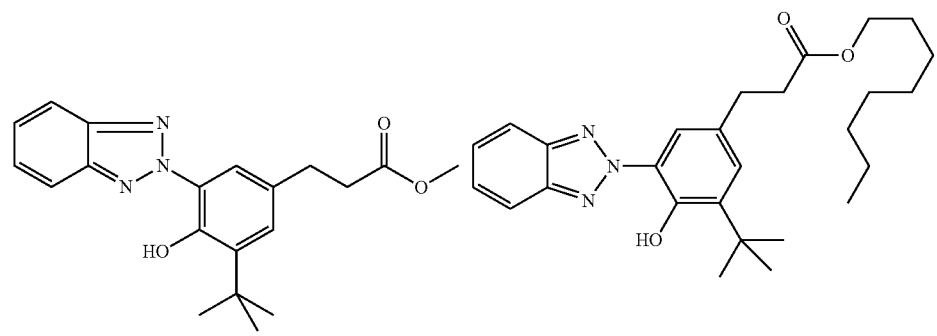
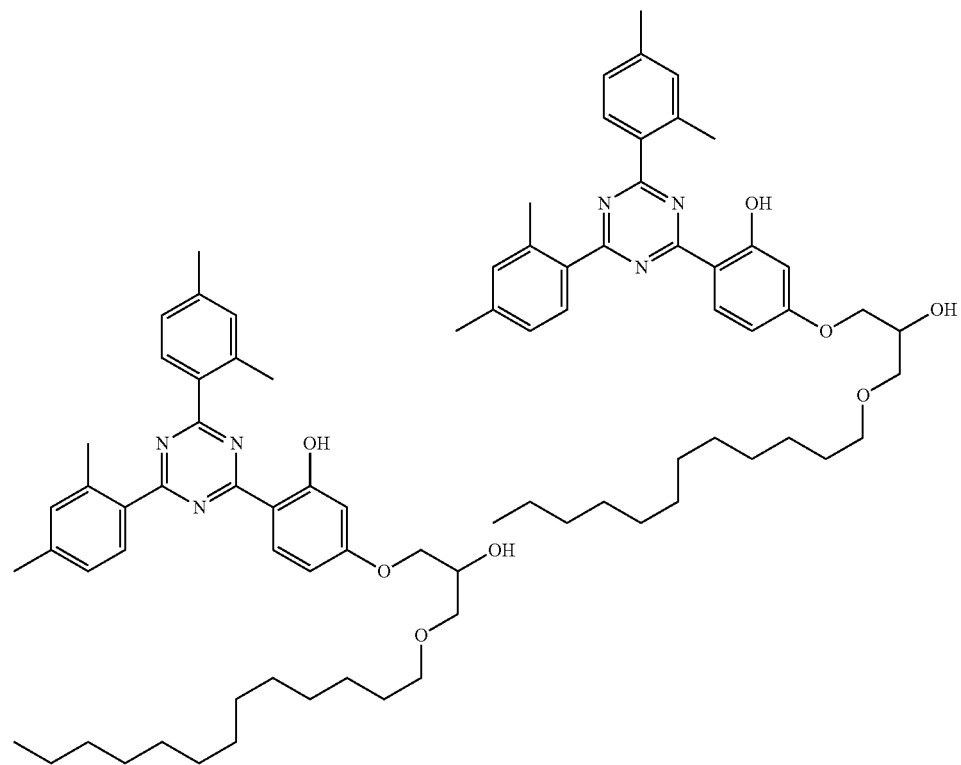

TABLE E-continued
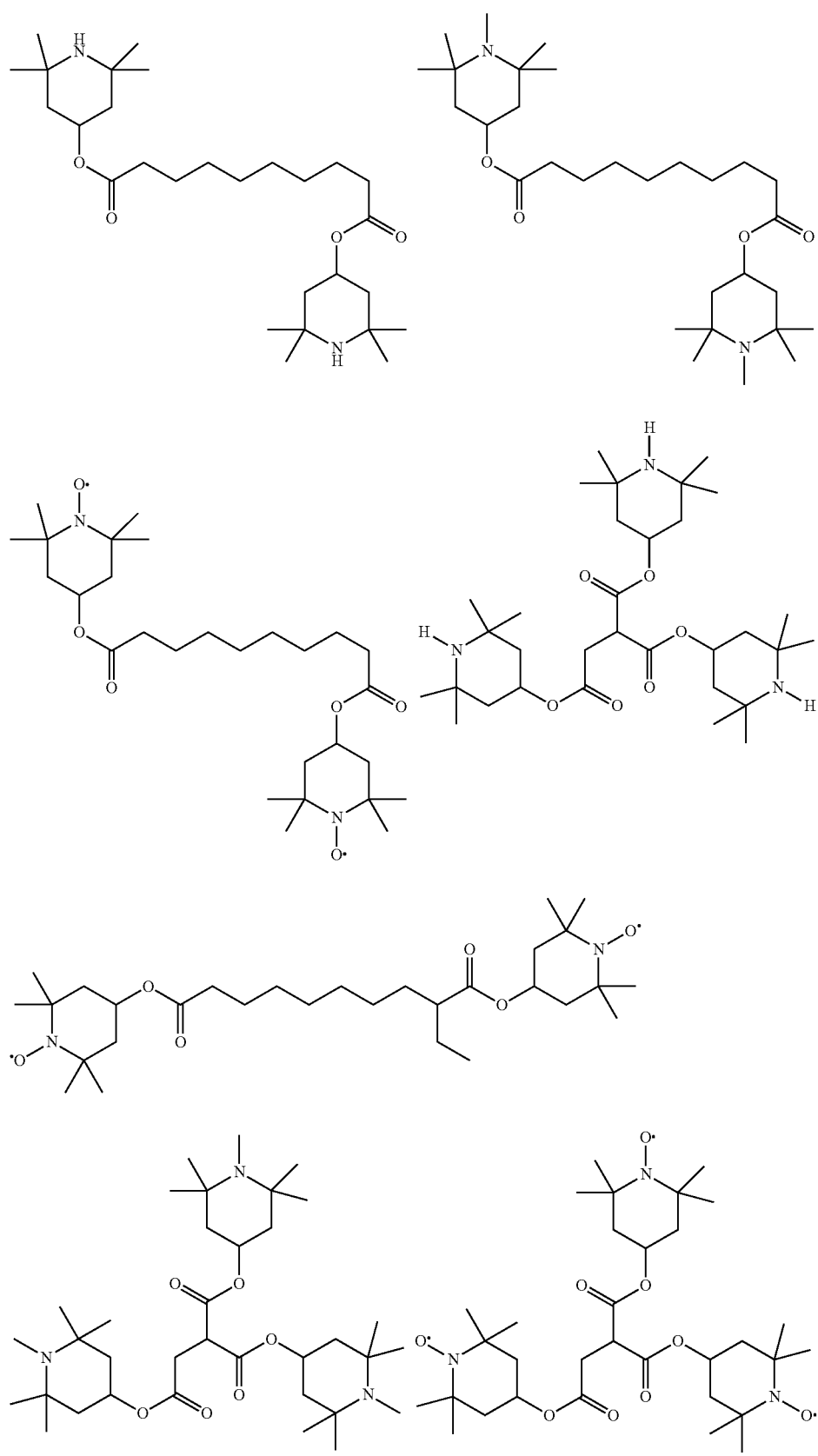

TABLE E-continued
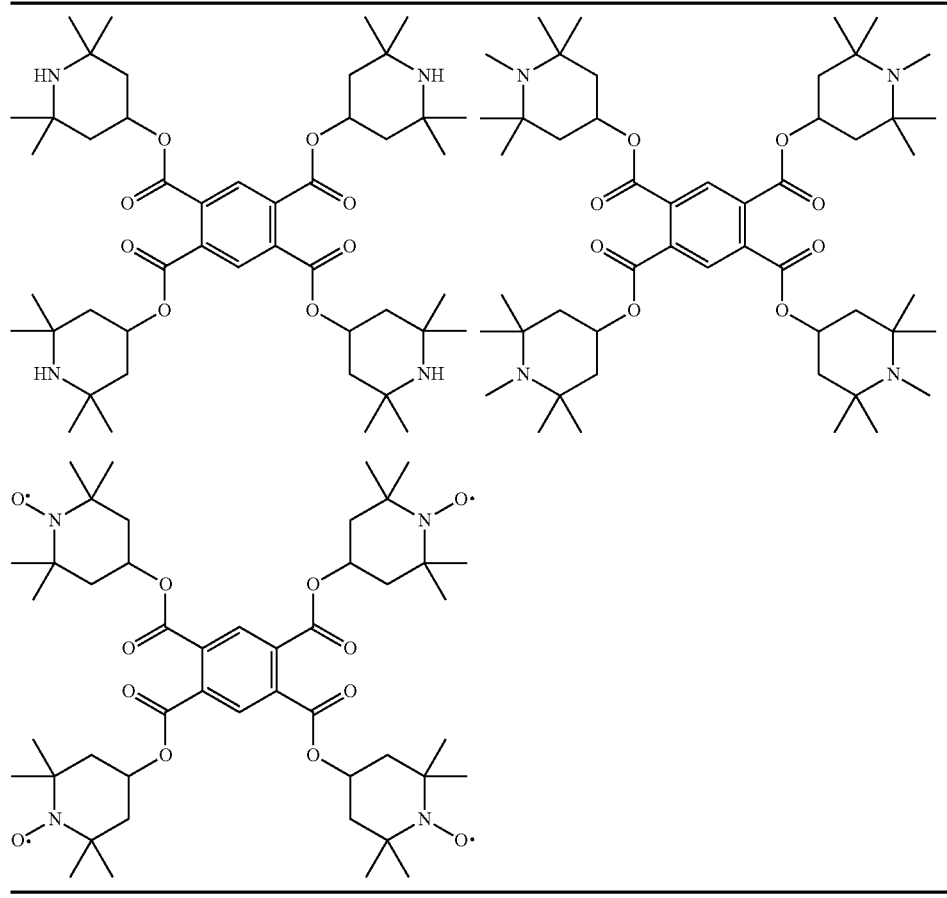
The LC media preferably comprise 0 to 10% by weight, in particular 1 ppm to 5% by weight, particularly preferably 1 ppm to 1% by weight, of stabilizers.
Table F below shows illustrative compounds which can preferably be used as chiral dopants in the mesogenic media according to the present invention.
TABLE F
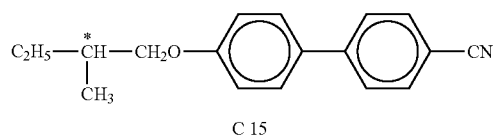
C 15
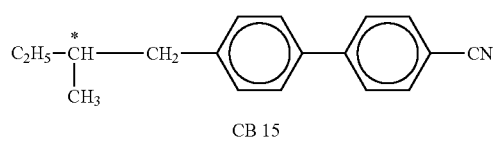
CB 15
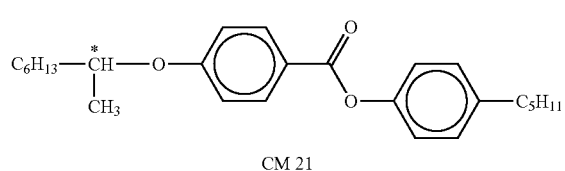
CM 21

TABLE F-continued
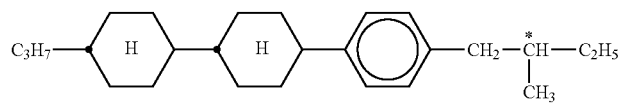
CM 44
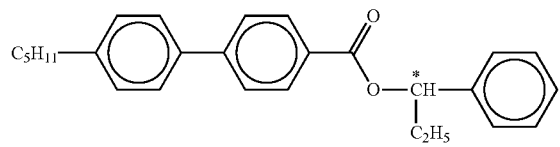
CM 45
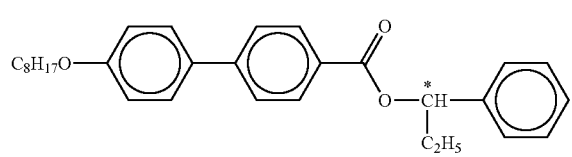
CM 47
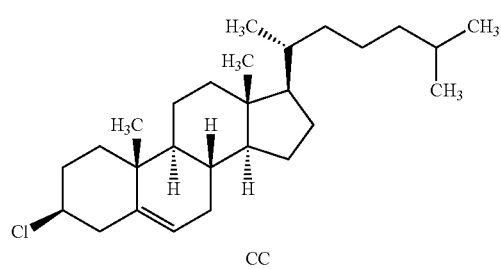
CC
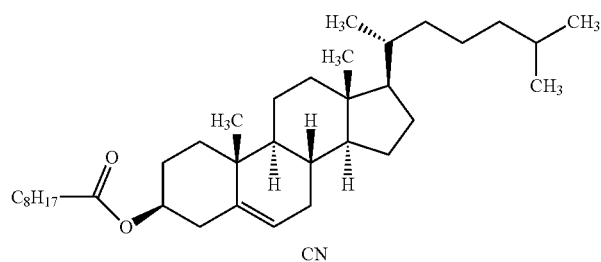
CN
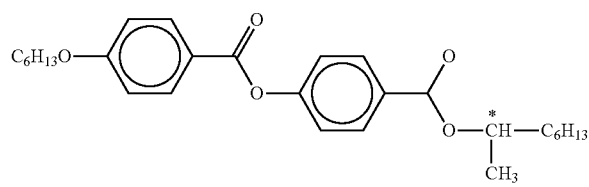
R/S-811
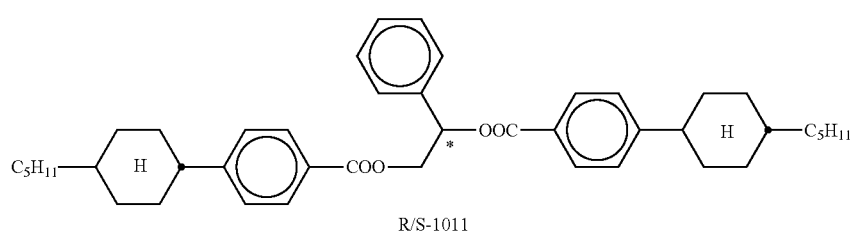
R/S-1011

TABLE F-continued

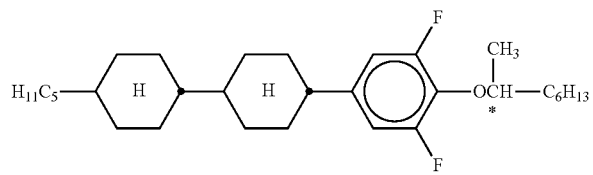
R/S-2011

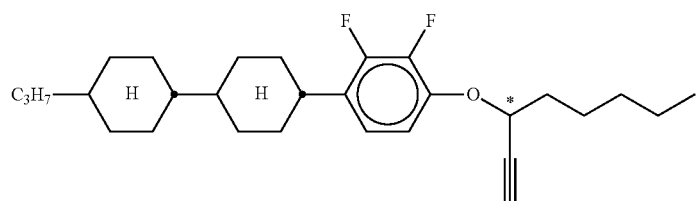
R/S-3011

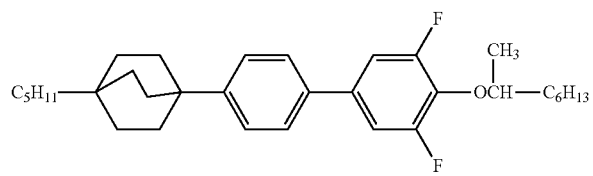
R/S-4011

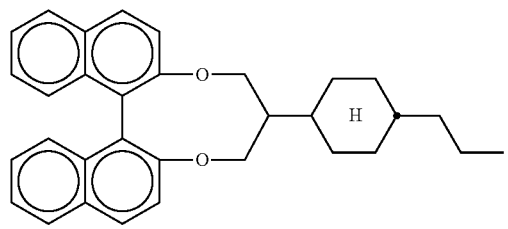
R/S-5011

In a preferred embodiment of the present invention, the mesogenic media comprise one or more compounds selected from the compounds shown in Table F.

The mesogenic media according to the present invention preferably comprise two or more, preferably four or more, compounds selected from the compounds shown in the above tables D to F.

In an embodiment the LC media according to the present invention preferably comprise three or more, more preferably five or more compounds shown in Table D.

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure® 651 (from BASF).

TABLE G

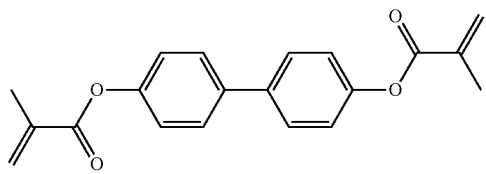
RM-1

TABLE G-continued
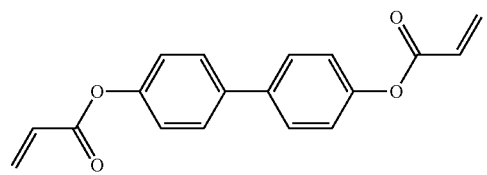 RM-2
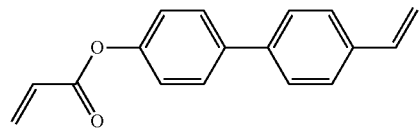 RM-3
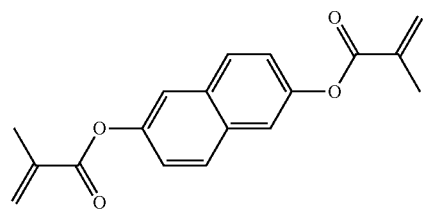 [SMILES: C=C(C)C(=O)Oc1ccc2cc(OC(=O)C(=C)C)ccc2c1] RM-4
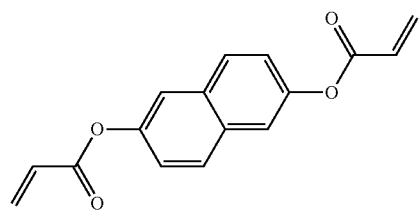 [SMILES: C=CC(=O)Oc1ccc2cc(OC(=O)C=C)ccc2c1] RM-5
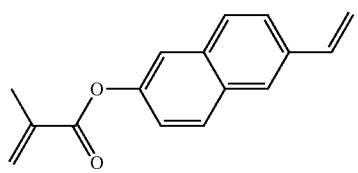 [SMILES: C=Cc1ccc2cc(OC(=O)C(=C)C)ccc2c1] RM-6
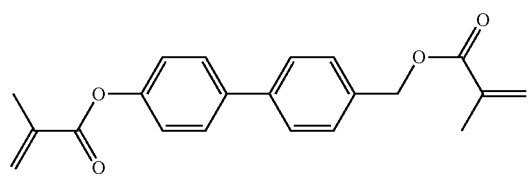 [SMILES: C=C(C)C(=O)OCc1ccc(-c2ccc(OC(=O)C(=C)C)cc2)cc1] RM-7
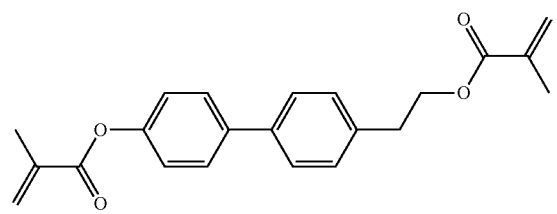 [SMILES: C=C(C)C(=O)OCCc1ccc(-c2ccc(OC(=O)C(=C)C)cc2)cc1] RM-8
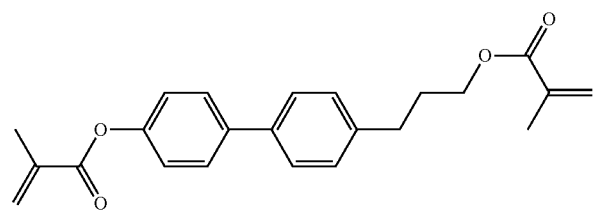 [SMILES: C=C(C)C(=O)OCCCc1ccc(-c2ccc(OC(=O)C(=C)C)cc2)cc1] RM-9

TABLE G-continued
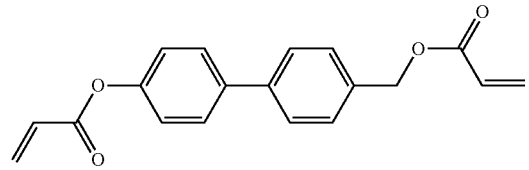 [SMILES: C=CC(=O)OCc1ccc(-c2ccc(OC(=O)C=C)cc2)cc1]
RM-10
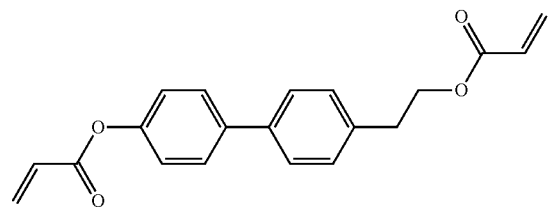 [SMILES: C=CC(=O)OCCc1ccc(-c2ccc(OC(=O)C=C)cc2)cc1]
RM-11
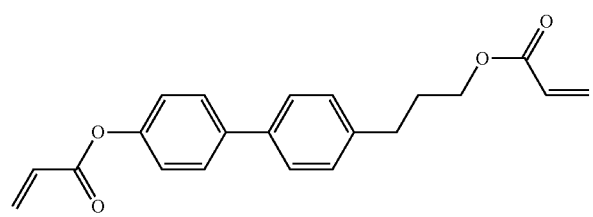 [SMILES: C=CC(=O)OCCCc1ccc(-c2ccc(OC(=O)C=C)cc2)cc1]
RM-12
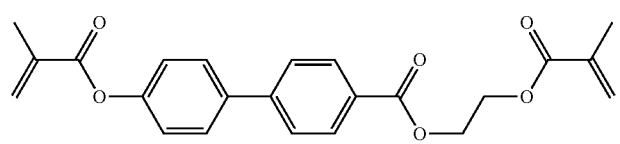 [SMILES: C=C(C)C(=O)OCCOC(=O)c1ccc(-c2ccc(OC(=O)C(=C)C)cc2)cc1]
RM-13
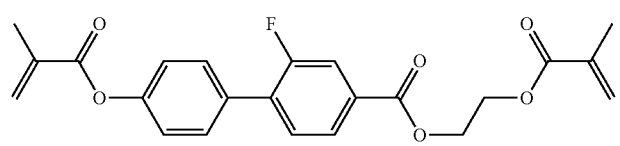 [SMILES: C=C(C)C(=O)OCCOC(=O)c1ccc(-c2ccc(OC(=O)C(=C)C)cc2)c(F)c1]
RM-14
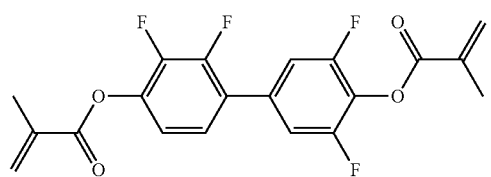 [SMILES: C=C(C)C(=O)Oc1ccc(-c2cc(F)c(OC(=O)C(=C)C)c(F)c2)c(F)c1F]
RM-15
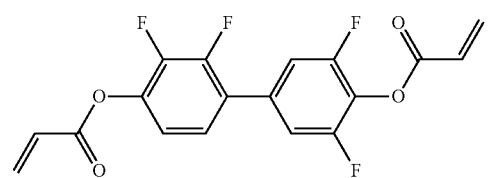 [SMILES: C=CC(=O)Oc1ccc(-c2cc(F)c(OC(=O)C=C)c(F)c2)c(F)c1F]
RM-16
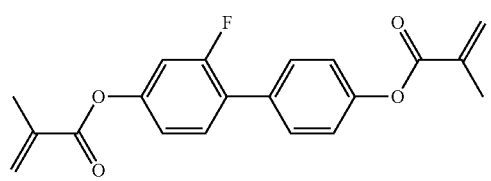 [SMILES: C=C(C)C(=O)Oc1ccc(-c2ccc(OC(=O)C(=C)C)cc2F)cc1]
RM-17
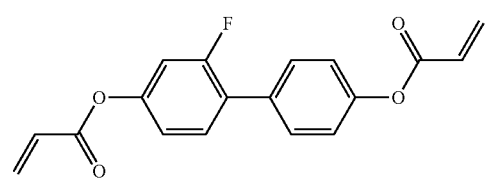
RM-18

TABLE G-continued
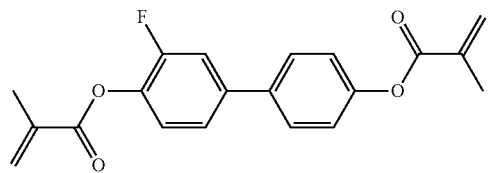 [SMILES: C=C(C)C(=O)Oc1ccc(-c2ccc(OC(=O)C(=C)C)c(F)c2)cc1] RM-19
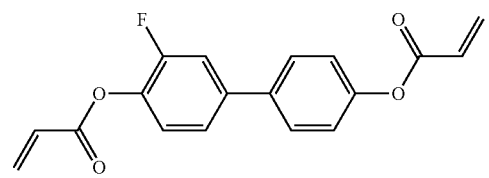 [SMILES: C=CC(=O)Oc1ccc(-c2ccc(OC(=O)C=C)c(F)c2)cc1] RM-20
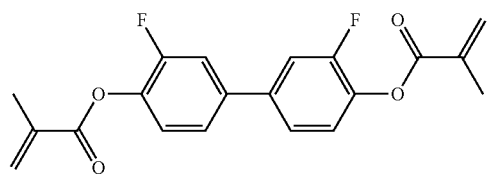 RM-21
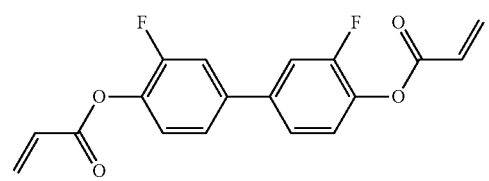 [SMILES: C=CC(=O)Oc1ccc(-c2ccc(OC(=O)C=C)c(F)c2)cc1F] RM-22
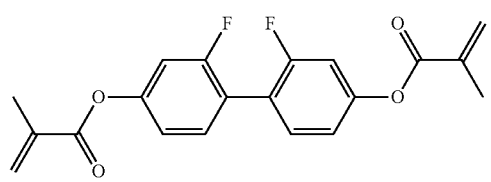 [SMILES: C=C(C)C(=O)Oc1ccc(-c2ccc(OC(=O)C(=C)C)cc2F)c(F)c1] RM-23
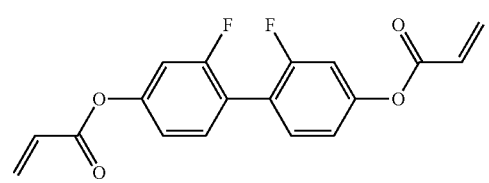 [SMILES: C=CC(=O)Oc1ccc(-c2ccc(OC(=O)C=C)cc2F)c(F)c1] RM-24
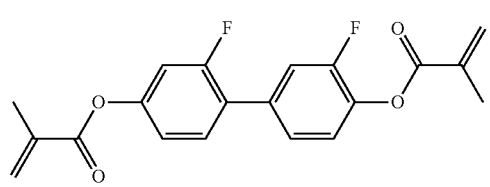 [SMILES: C=C(C)C(=O)Oc1ccc(-c2ccc(OC(=O)C(=C)C)c(F)c2)c(F)c1] RM-25
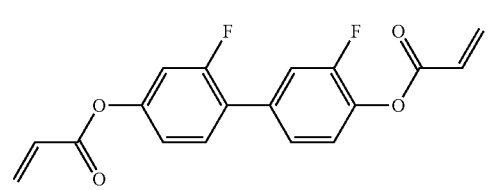 [SMILES: C=CC(=O)Oc1ccc(-c2ccc(OC(=O)C=C)c(F)c2)c(F)c1] RM-26

TABLE G-continued
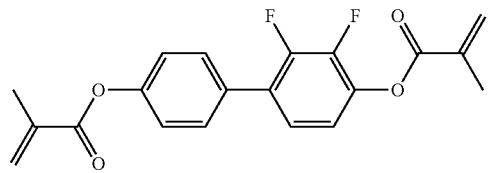 RM-27
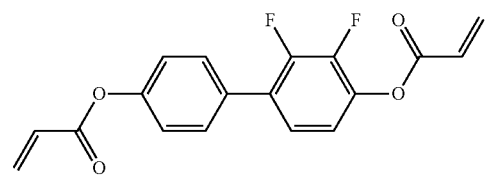 RM-28
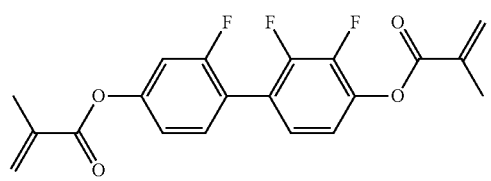 [SMILES: C=C(C)C(=O)Oc1ccc(-c2ccc(OC(=O)C(=C)C)c(F)c2F)c(F)c1] RM-29
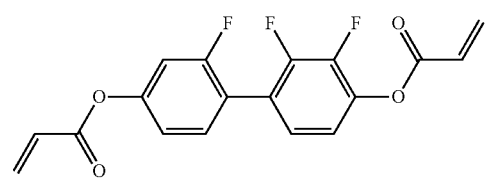 RM-30
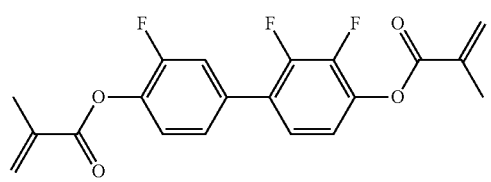 [SMILES: C=C(C)C(=O)Oc1ccc(-c2ccc(OC(=O)C(=C)C)c(F)c2F)cc1F] RM-31
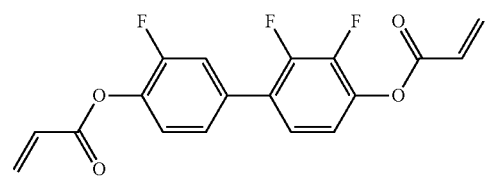 [SMILES: C=CC(=O)Oc1ccc(-c2ccc(OC(=O)C=C)c(F)c2F)cc1F] RM-32
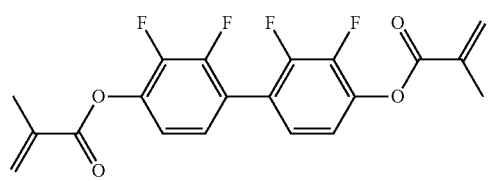 RM-33
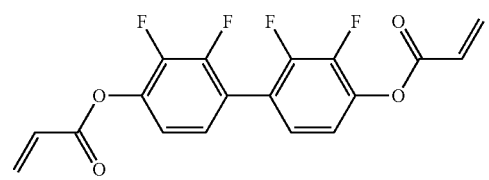 RM-34

TABLE G-continued
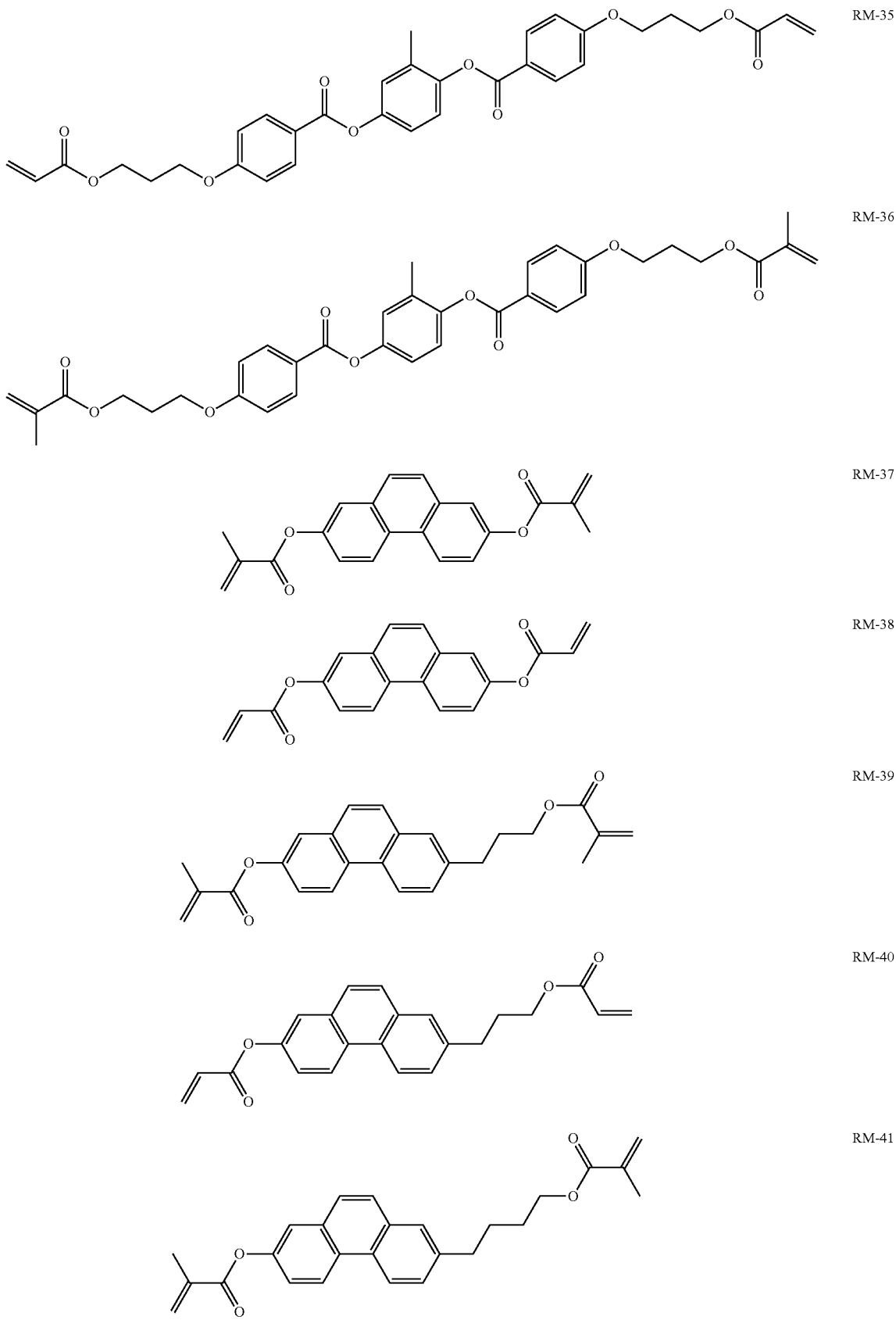

TABLE G-continued
| | |
|---|---|
| 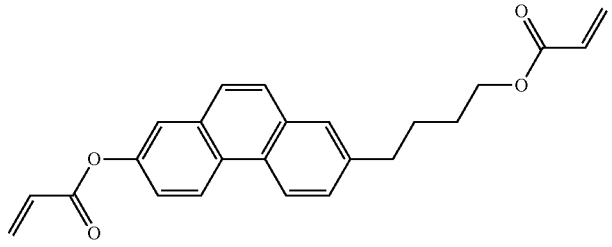 [SMILES: C=CC(=O)OCCCCc1ccc2c(ccc3cc(OC(=O)C=C)ccc32)c1] | RM-42 |
| 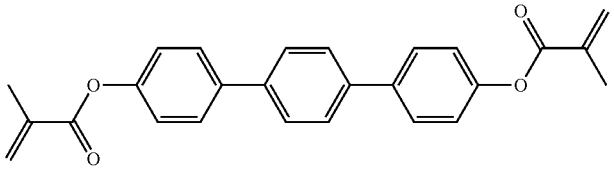 [SMILES: C=C(C)C(=O)Oc1ccc(-c2ccc(-c3ccc(OC(=O)C(=C)C)cc3)cc2)cc1] | RM-43 |
| 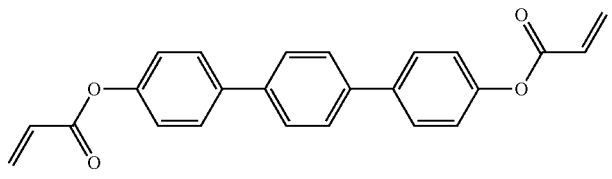 [SMILES: C=CC(=O)Oc1ccc(-c2ccc(-c3ccc(OC(=O)C=C)cc3)cc2)cc1] | RM-44 |
| 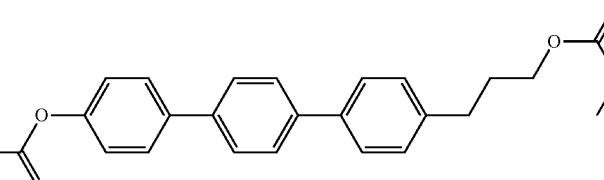 | RM-45 |
| 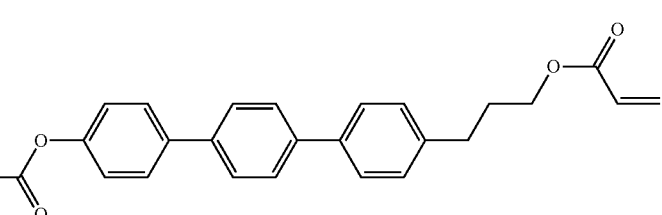 | RM-46 |
| 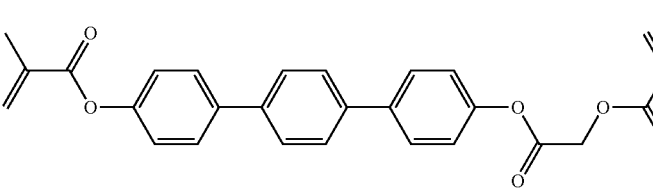 | RM-47 |
| 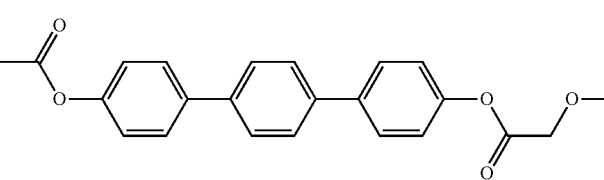 | RM-48 |
| 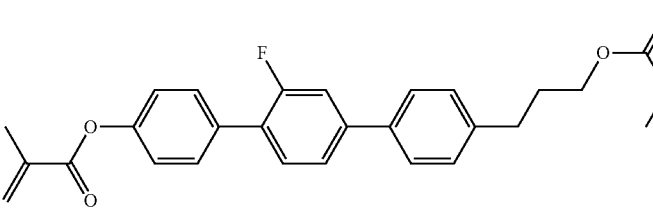 | RM-49 |

TABLE G-continued
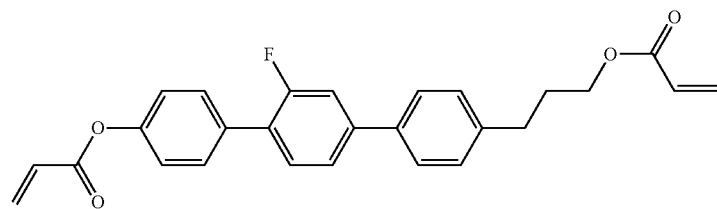 [SMILES: C=CC(=O)OCCCc1ccc(-c2ccc(-c3ccc(OC(=O)C=C)cc3)c(F)c2)cc1] RM-50
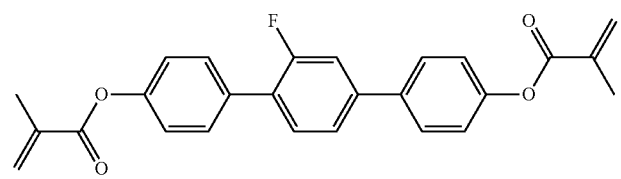 RM-51
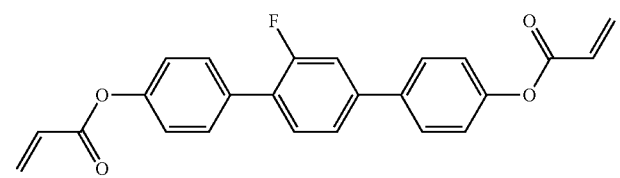 [SMILES: C=CC(=O)Oc1ccc(-c2ccc(-c3ccc(OC(=O)C=C)cc3)c(F)c2)cc1] RM-52
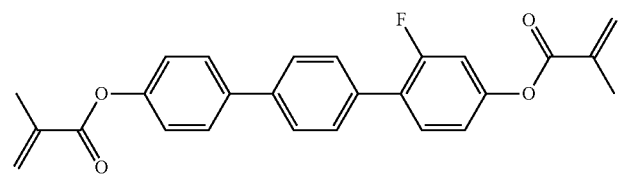 [SMILES: C=C(C)C(=O)Oc1ccc(-c2ccc(-c3ccc(OC(=O)C(=C)C)cc3F)cc2)cc1] RM-53
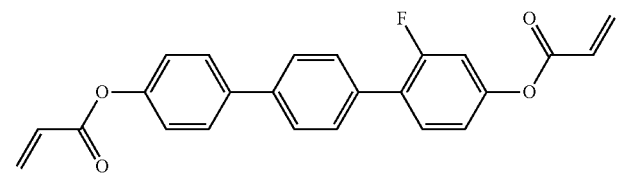 [SMILES: C=CC(=O)Oc1ccc(-c2ccc(-c3ccc(OC(=O)C=C)cc3F)cc2)cc1] RM-54
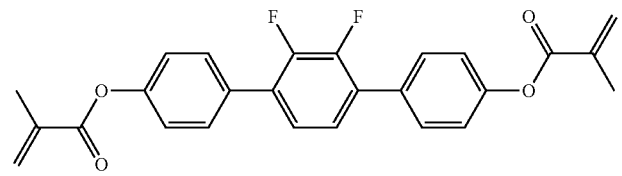 [SMILES: C=C(C)C(=O)Oc1ccc(-c2ccc(-c3ccc(OC(=O)C(=C)C)cc3)c(F)c2F)cc1] RM-55
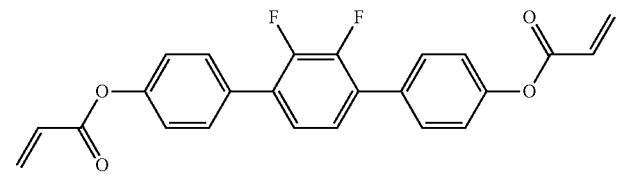 [SMILES: C=CC(=O)Oc1ccc(-c2ccc(-c3ccc(OC(=O)C=C)cc3)c(F)c2F)cc1] RM-56
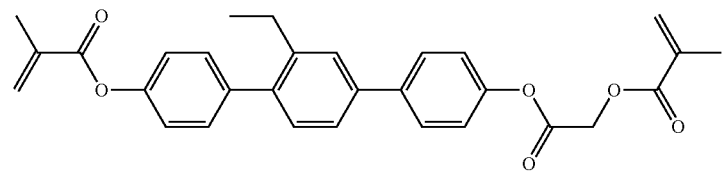 RM-57

TABLE G-continued
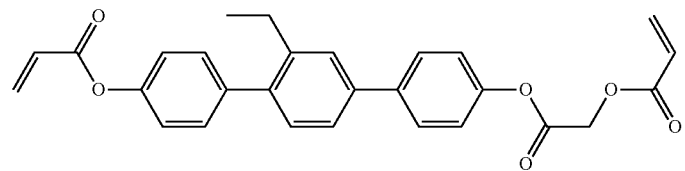 RM-58
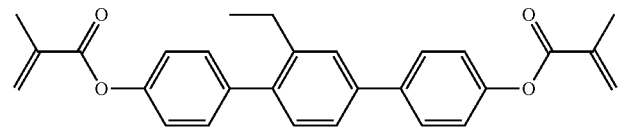 RM-59
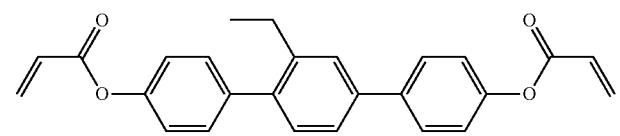 [SMILES: C=CC(=O)Oc1ccc(-c2ccc(-c3ccc(OC(=O)C=C)cc3)c(CC)c2)cc1] RM-60
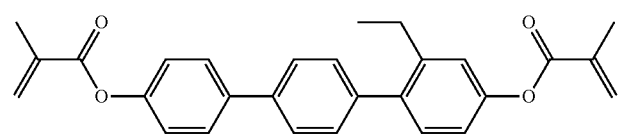 [SMILES: C=C(C)C(=O)Oc1ccc(-c2ccc(-c3ccc(OC(=O)C(=C)C)cc3CC)cc2)cc1] RM-61
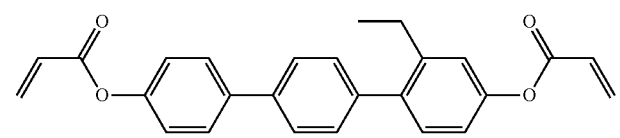 [SMILES: C=CC(=O)Oc1ccc(-c2ccc(-c3ccc(OC(=O)C=C)cc3CC)cc2)cc1] RM-62
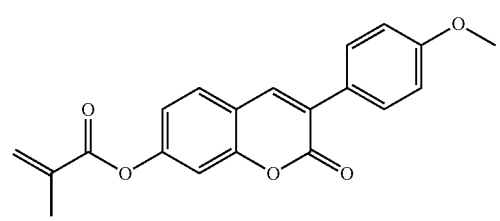 [SMILES: C=C(C)C(=O)Oc1ccc2cc(-c3ccc(OC)cc3)c(=O)oc2c1] RM-63
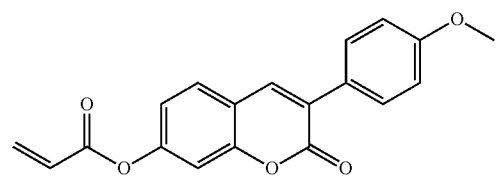 [SMILES: C=CC(=O)Oc1ccc2cc(-c3ccc(OC)cc3)c(=O)oc2c1] RM-64
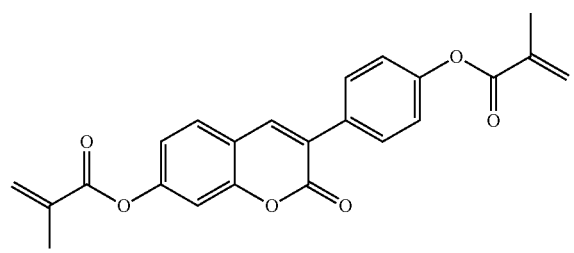 [SMILES: C=C(C)C(=O)Oc1ccc(-c2cc3ccc(OC(=O)C(=C)C)cc3oc2=O)cc1] RM-65
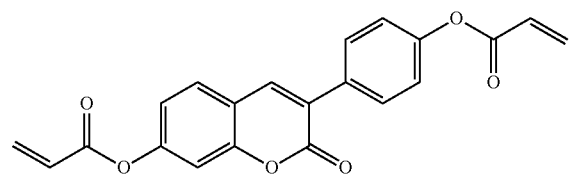 [SMILES: C=CC(=O)Oc1ccc(-c2cc3ccc(OC(=O)C=C)cc3oc2=O)cc1] RM-66

TABLE G-continued
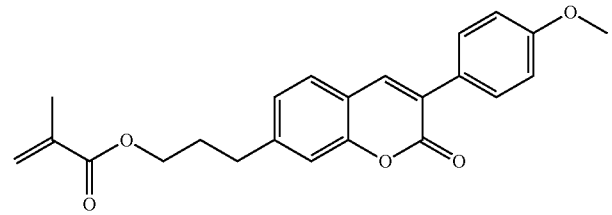 [SMILES: C=C(C)C(=O)OCCCc1ccc2cc(-c3ccc(OC)cc3)c(=O)oc2c1]
RM-67
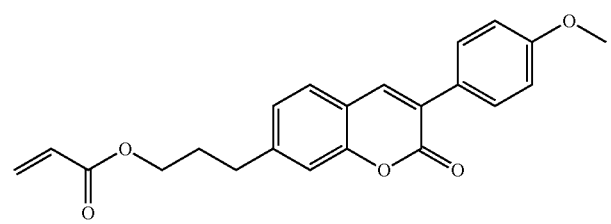 [SMILES: C=CC(=O)OCCCc1ccc2cc(-c3ccc(OC)cc3)c(=O)oc2c1]
RM-68
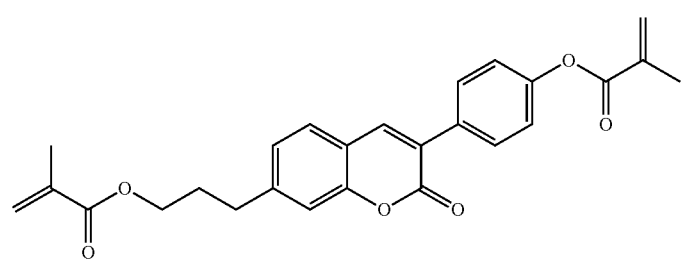 [SMILES: C=C(C)C(=O)OCCCc1ccc2cc(-c3ccc(OC(=O)C(=C)C)cc3)c(=O)oc2c1]
RM-69
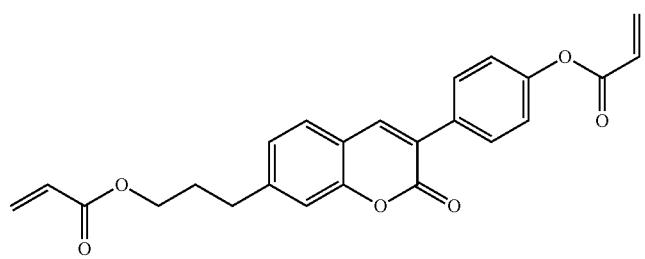 [SMILES: C=CC(=O)OCCCc1ccc2cc(-c3ccc(OC(=O)C=C)cc3)c(=O)oc2c1]
RM-70
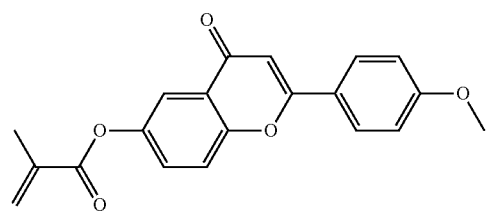 [SMILES: C=C(C)C(=O)Oc1ccc2oc(-c3ccc(OC)cc3)cc(=O)c2c1]
RM-71
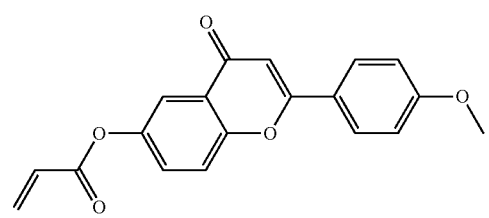 [SMILES: C=CC(=O)Oc1ccc2oc(-c3ccc(OC)cc3)cc(=O)c2c1]
RM-72
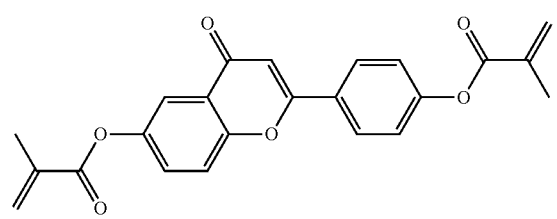 [SMILES: C=C(C)C(=O)Oc1ccc(-c2cc(=O)c3cc(OC(=O)C(=C)C)ccc3o2)cc1]
RM-73

TABLE G-continued
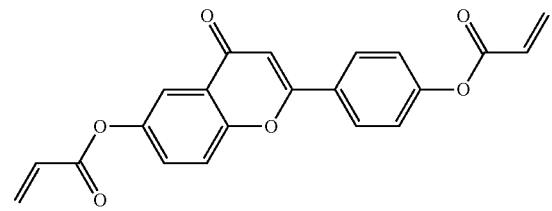 [SMILES: C=CC(=O)Oc1ccc(-c2cc(=O)c3cc(OC(=O)C=C)ccc3o2)cc1]
RM-74
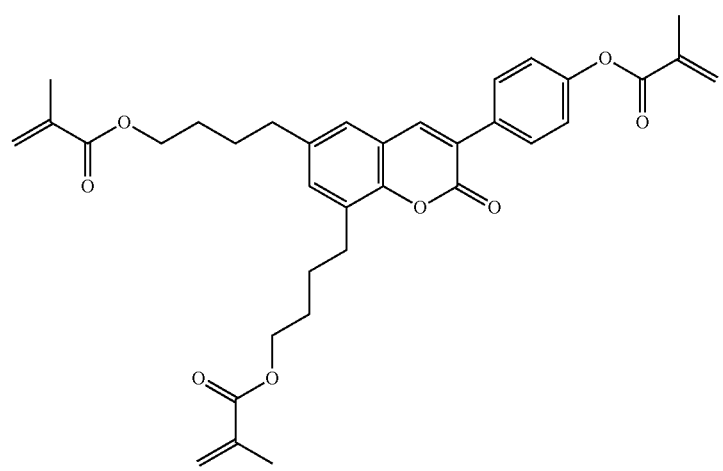 [SMILES: C=C(C)C(=O)OCCCCc1cc(CCCCOC(=O)C(=C)C)c2oc(=O)c(-c3ccc(OC(=O)C(=C)C)cc3)cc2c1]
RM-75
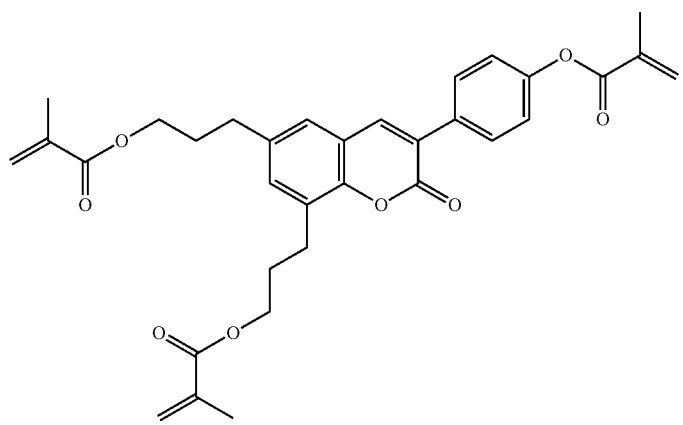 [SMILES: C=C(C)C(=O)OCCCc1cc(CCCOC(=O)C(=C)C)c2oc(=O)c(-c3ccc(OC(=O)C(=C)C)cc3)cc2c1]
RM-76
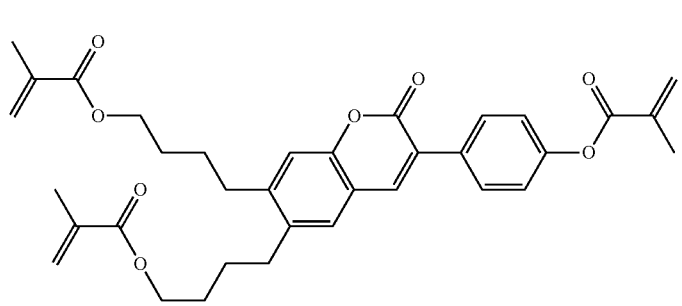 [SMILES: C=C(C)C(=O)OCCCCc1cc2cc(-c3ccc(OC(=O)C(=C)C)cc3)c(=O)oc2cc1CCCCOC(=O)C(=C)C]
RM-77

TABLE G-continued
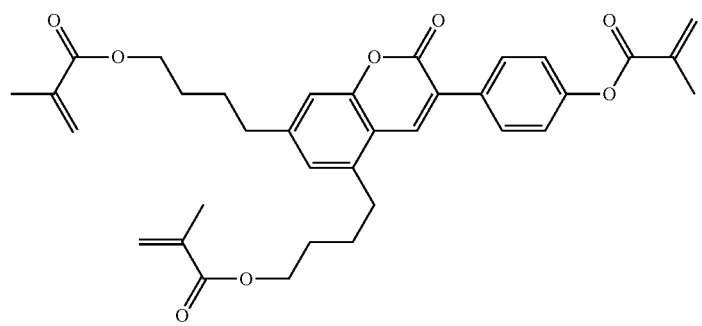 [SMILES: C=C(C)C(=O)OCCCCc1cc(CCCCOC(=O)C(=C)C)c2cc(-c3ccc(OC(=O)C(=C)C)cc3)c(=O)oc2c1]
RM-78
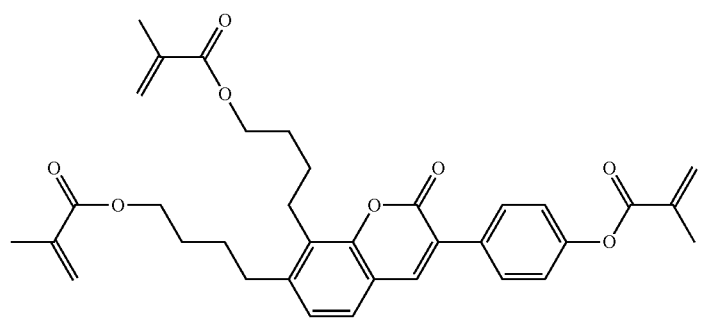 [SMILES: C=C(C)C(=O)OCCCCc1ccc2cc(-c3ccc(OC(=O)C(=C)C)cc3)c(=O)oc2c1CCCCOC(=O)C(=C)C]
RM-79
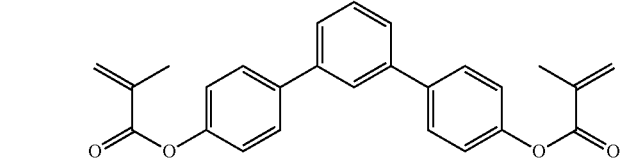 [SMILES: C=C(C)C(=O)Oc1ccc(-c2cccc(-c3ccc(OC(=O)C(=C)C)cc3)c2)cc1]
RM-80
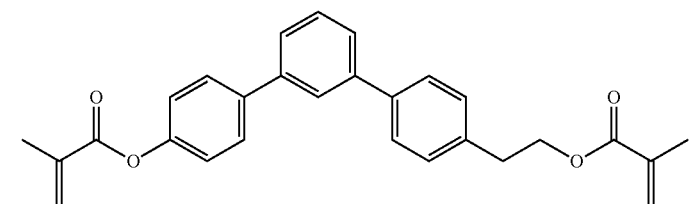 [SMILES: C=C(C)C(=O)OCCc1ccc(-c2cccc(-c3ccc(OC(=O)C(=C)C)cc3)c2)cc1]
RM-81
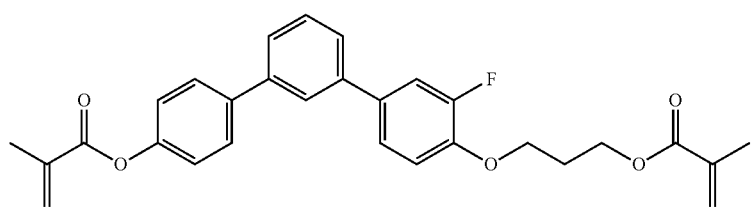 [SMILES: C=C(C)C(=O)OCCCOc1ccc(-c2cccc(-c3ccc(OC(=O)C(=C)C)cc3)c2)cc1F]
RM-82
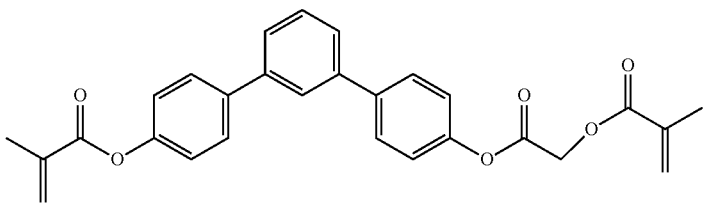 [SMILES: C=C(C)C(=O)OCC(=O)Oc1ccc(-c2cccc(-c3ccc(OC(=O)C(=C)C)cc3)c2)cc1]
RM-83

TABLE G-continued
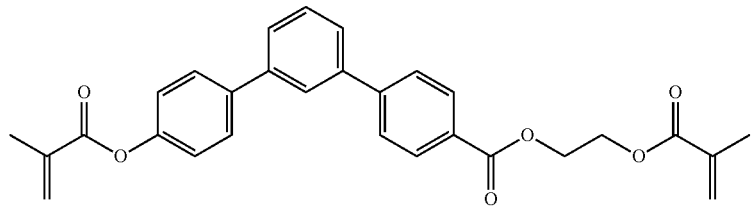 [SMILES: C=C(C)C(=O)OCCOC(=O)c1ccc(-c2cccc(-c3ccc(OC(=O)C(=C)C)cc3)c2)cc1]
RM-84
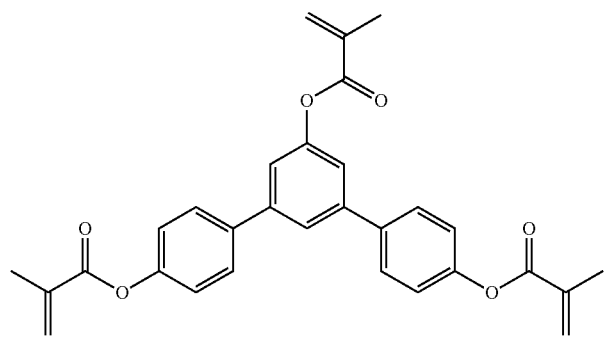 [SMILES: C=C(C)C(=O)Oc1ccc(-c2cc(OC(=O)C(=C)C)cc(-c3ccc(OC(=O)C(=C)C)cc3)c2)cc1]
RM-85
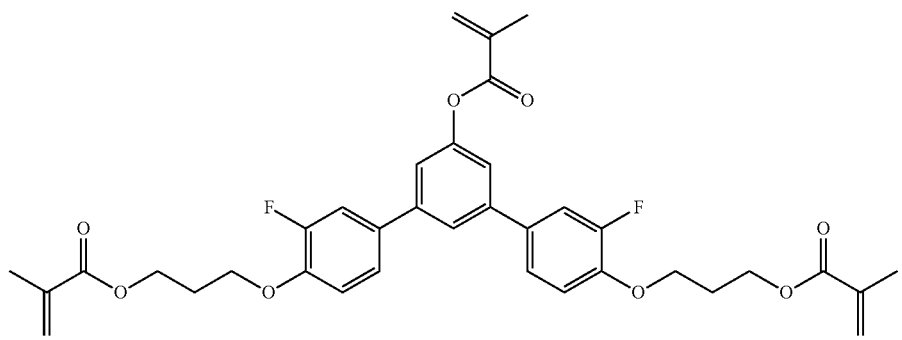 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-86
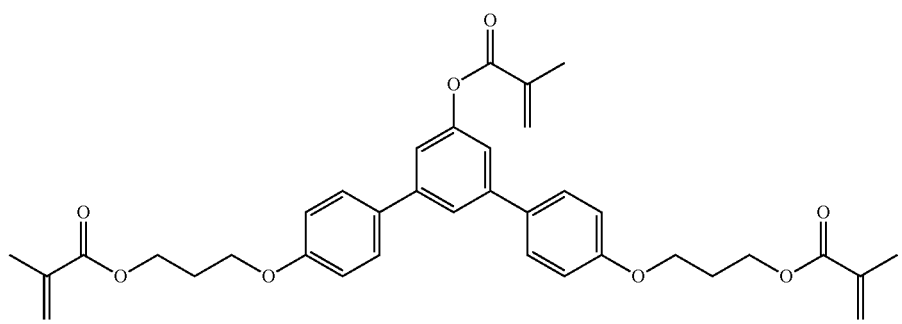 [SMILES: C=C(C)C(=O)OCCCOc1ccc(-c2cc(OC(=O)C(=C)C)cc(-c3ccc(OCCCOC(=O)C(=C)C)cc3)c2)cc1]
RM-87
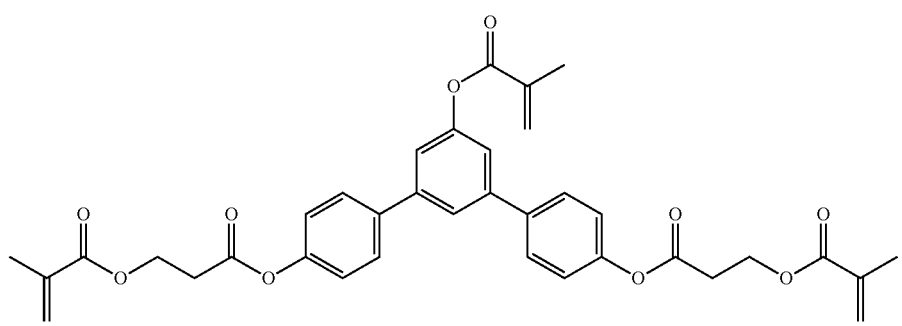 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-88

TABLE G-continued
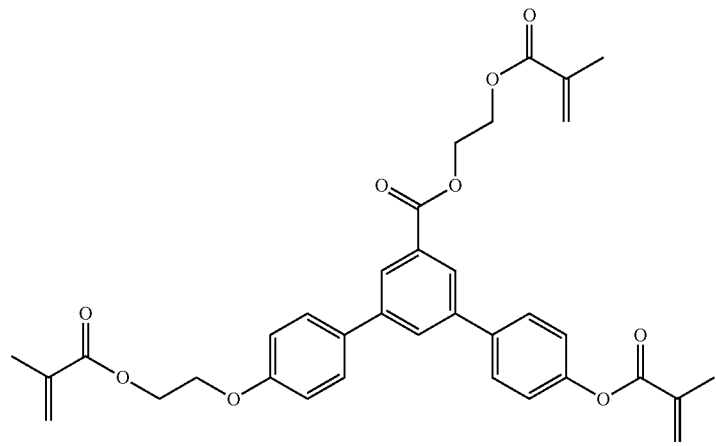 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-89
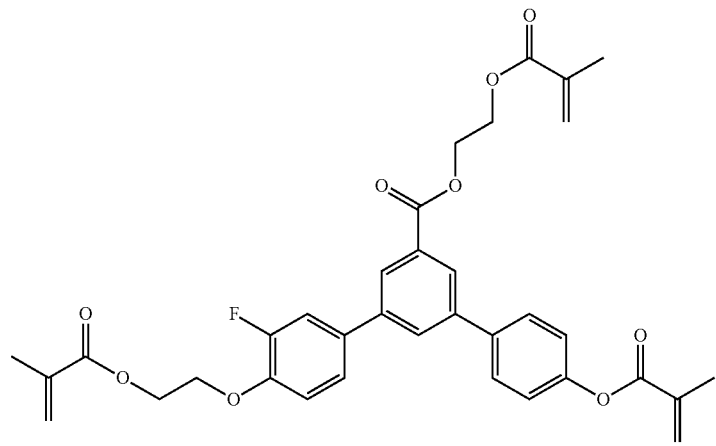 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]
RM-90
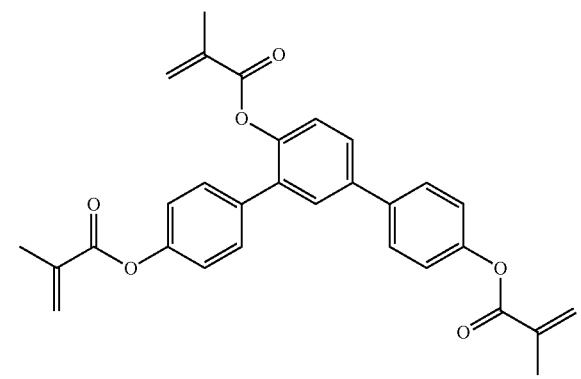 [SMILES: C=C(C)C(=O)Oc1ccc(-c2ccc(OC(=O)C(=C)C)c(-c3ccc(OC(=O)C(=C)C)cc3)c2)cc1]
RM-91
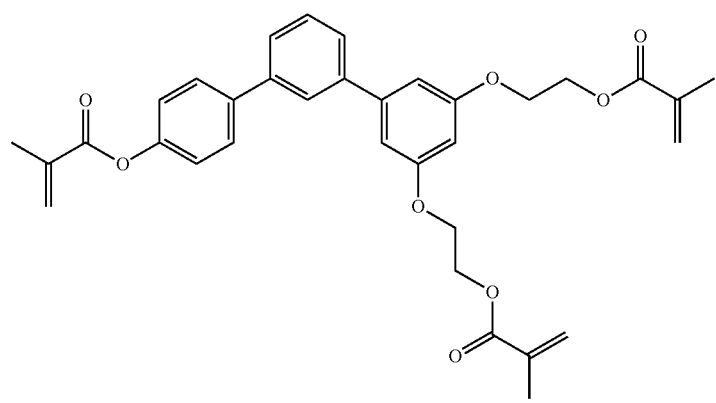 [SMILES: C=C(C)C(=O)OCCOc1cc(OCCOC(=O)C(=C)C)cc(-c2cccc(-c3ccc(OC(=O)C(=C)C)cc3)c2)c1]
RM-92

TABLE G-continued
RM-93
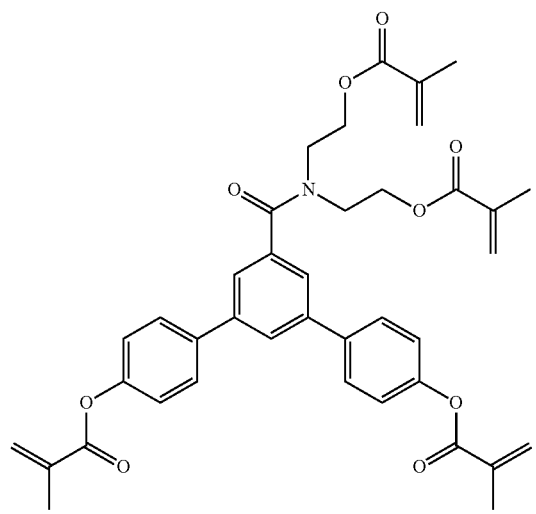 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-94
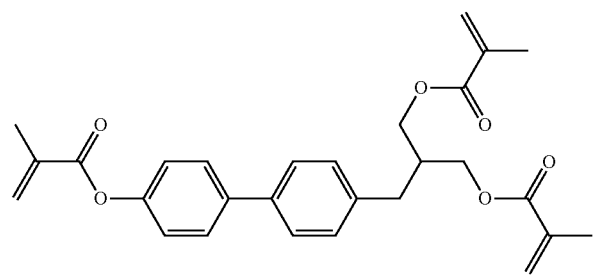 [SMILES: C=C(C)C(=O)OCC(COC(=O)C(=C)C)Cc1ccc(-c2ccc(OC(=O)C(=C)C)cc2)cc1]
RM-95
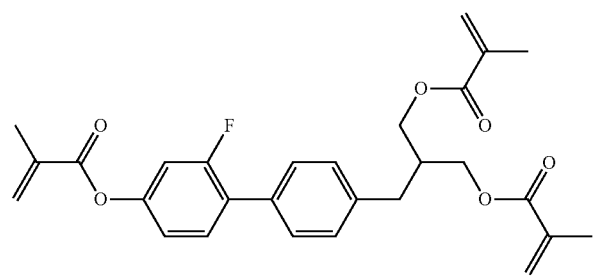 [SMILES: C=C(C)C(=O)OCC(COC(=O)C(=C)C)Cc1ccc(-c2ccc(OC(=O)C(=C)C)cc2F)cc1]
RM-96
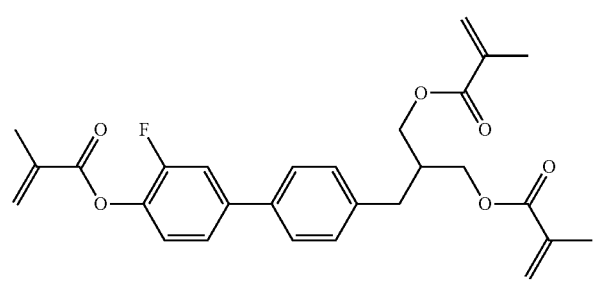 [SMILES: C=C(C)C(=O)OCC(COC(=O)C(=C)C)Cc1ccc(-c2ccc(OC(=O)C(=C)C)c(F)c2)cc1]

TABLE G-continued
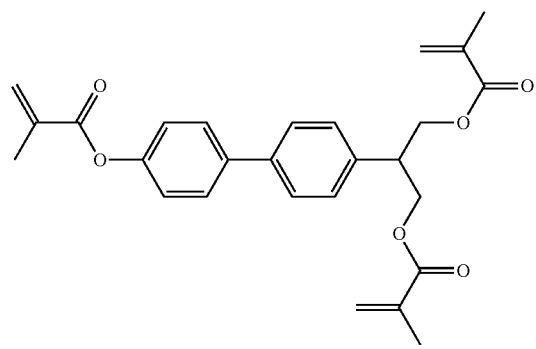 [SMILES: C=C(C)C(=O)OCC(COC(=O)C(=C)C)c1ccc(-c2ccc(OC(=O)C(=C)C)cc2)cc1]
RM-97
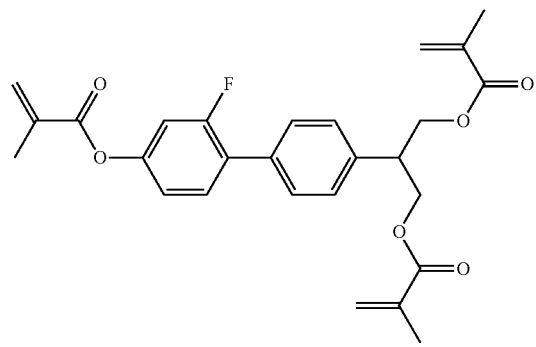 [SMILES: C=C(C)C(=O)OCC(COC(=O)C(=C)C)c1ccc(-c2ccc(OC(=O)C(=C)C)cc2F)cc1]
RM-98
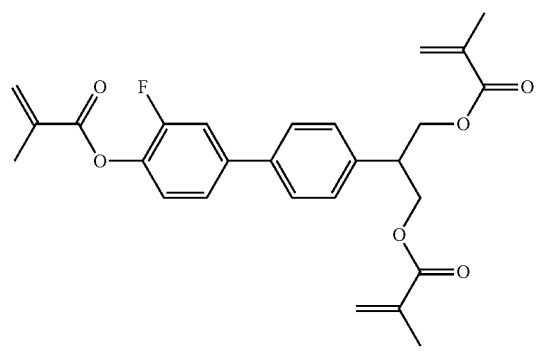 [SMILES: C=C(C)C(=O)OCC(COC(=O)C(=C)C)c1ccc(-c2ccc(OC(=O)C(=C)C)c(F)c2)cc1]
RM-99
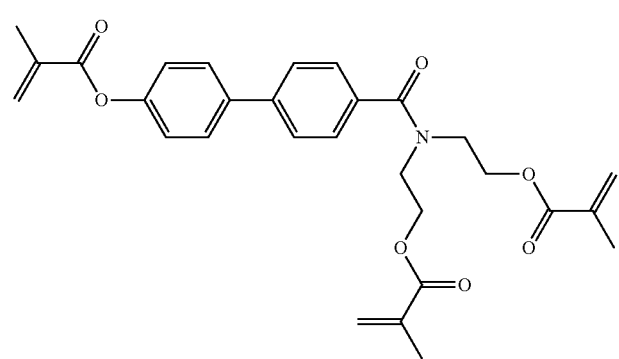 [SMILES: C=C(C)C(=O)OCCN(CCOC(=O)C(=C)C)C(=O)c1ccc(-c2ccc(OC(=O)C(=C)C)cc2)cc1]
RM-100

TABLE G-continued
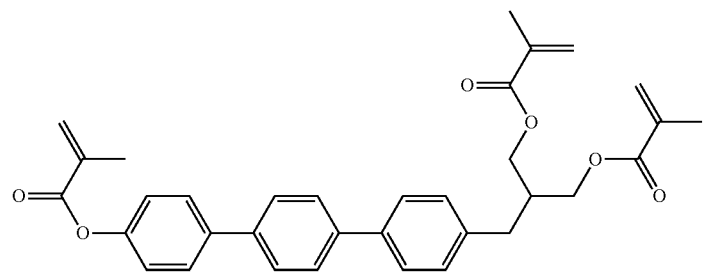 [SMILES: C=C(C)C(=O)OCC(COC(=O)C(=C)C)Cc1ccc(-c2ccc(-c3ccc(OC(=O)C(=C)C)cc3)cc2)cc1]
RM-101
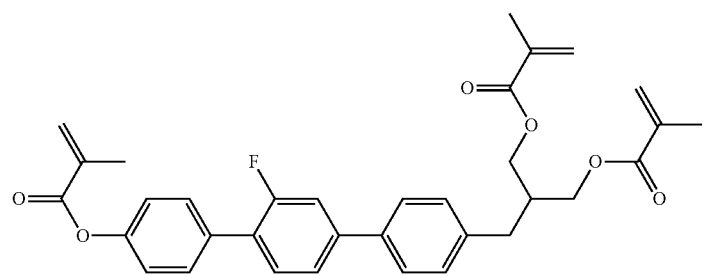 [SMILES: C=C(C)C(=O)OCC(COC(=O)C(=C)C)Cc1ccc(-c2ccc(-c3ccc(OC(=O)C(=C)C)cc3)c(F)c2)cc1]
RM-102
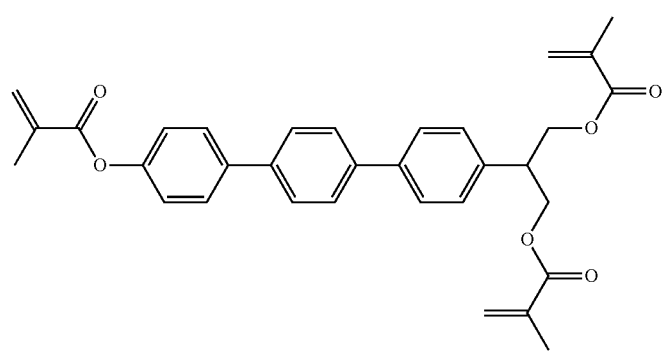 [SMILES: C=C(C)C(=O)OCC(COC(=O)C(=C)C)c1ccc(-c2ccc(-c3ccc(OC(=O)C(=C)C)cc3)cc2)cc1]
RM-103
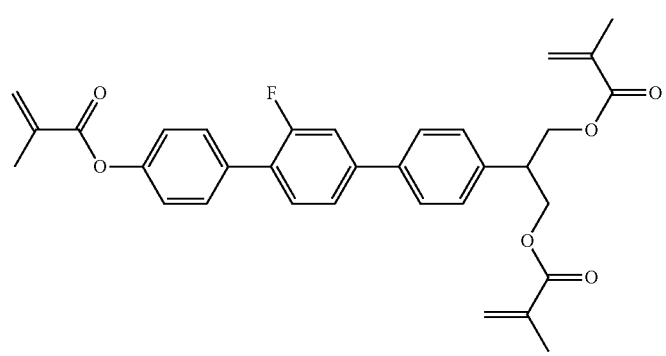 [SMILES: C=C(C)C(=O)OCC(COC(=O)C(=C)C)c1ccc(-c2ccc(-c3ccc(OC(=O)C(=C)C)cc3)c(F)c2)cc1]
RM-104
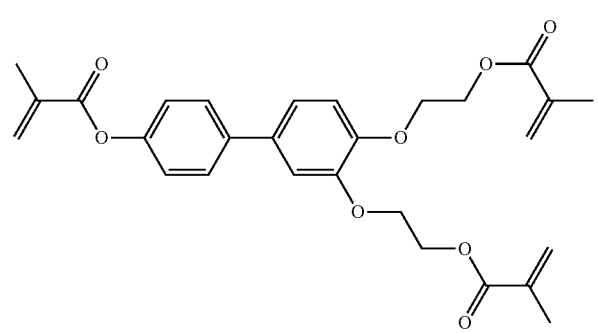 [SMILES: C=C(C)C(=O)OCCOc1ccc(-c2ccc(OC(=O)C(=C)C)cc2)cc1OCCOC(=O)C(=C)C]
RM-105

TABLE G-continued
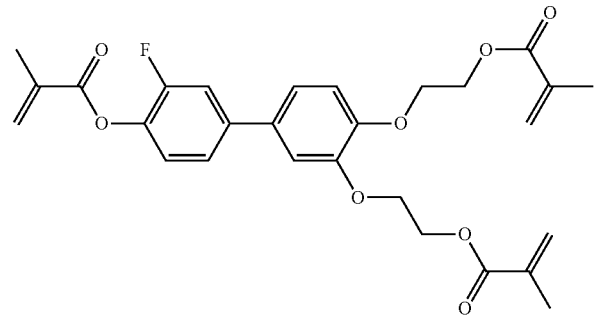 [SMILES: C=C(C)C(=O)OCCOc1ccc(-c2ccc(OC(=O)C(=C)C)c(F)c2)cc1OCCOC(=O)C(=C)C]
RM-106
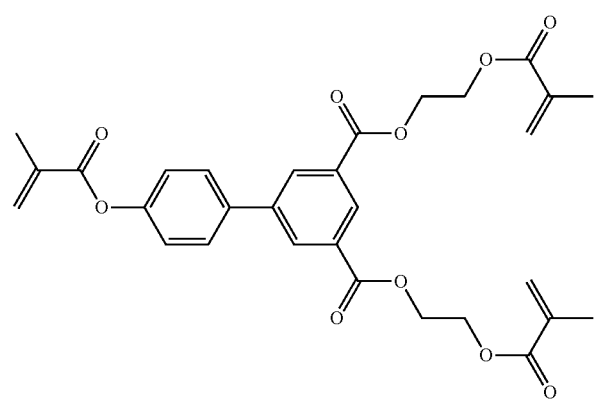 [SMILES: C=C(C)C(=O)OCCOC(=O)c1cc(C(=O)OCCOC(=O)C(=C)C)cc(-c2ccc(OC(=O)C(=C)C)cc2)c1]
RM-107
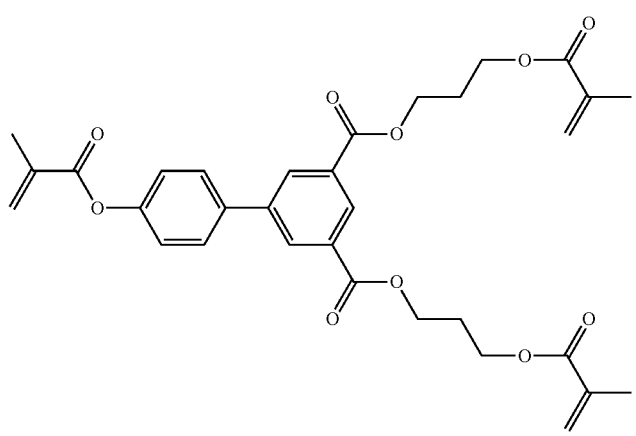 [SMILES: C=C(C)C(=O)OCCCOC(=O)c1cc(C(=O)OCCCOC(=O)C(=C)C)cc(-c2ccc(OC(=O)C(=C)C)cc2)c1]
RM-108
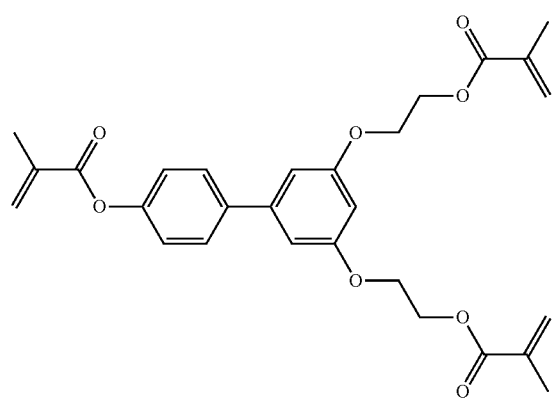 [SMILES: C=C(C)C(=O)OCCOc1cc(OCCOC(=O)C(=C)C)cc(-c2ccc(OC(=O)C(=C)C)cc2)c1]
RM-109

TABLE G-continued
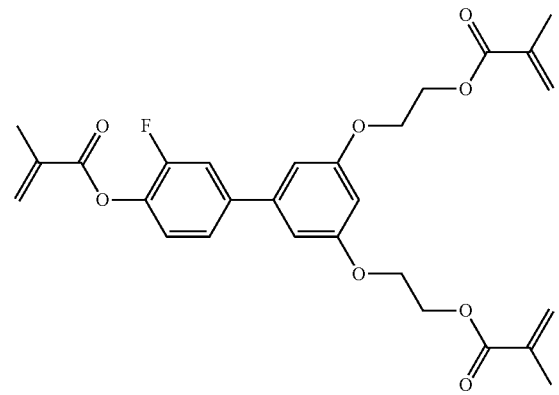 [SMILES: C=C(C)C(=O)OCCOc1cc(OCCOC(=O)C(=C)C)cc(-c2ccc(OC(=O)C(=C)C)c(F)c2)c1]
RM-110
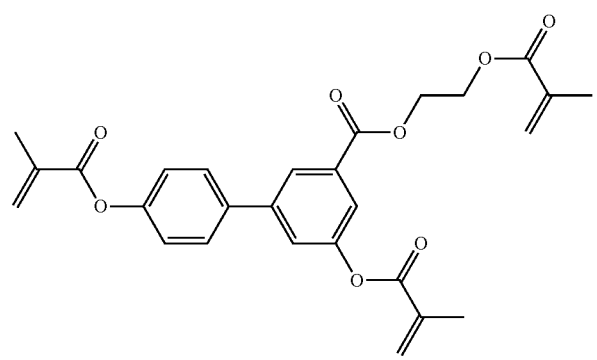 [SMILES: C=C(C)C(=O)OCCOC(=O)c1cc(OC(=O)C(=C)C)cc(-c2ccc(OC(=O)C(=C)C)cc2)c1]
RM-111
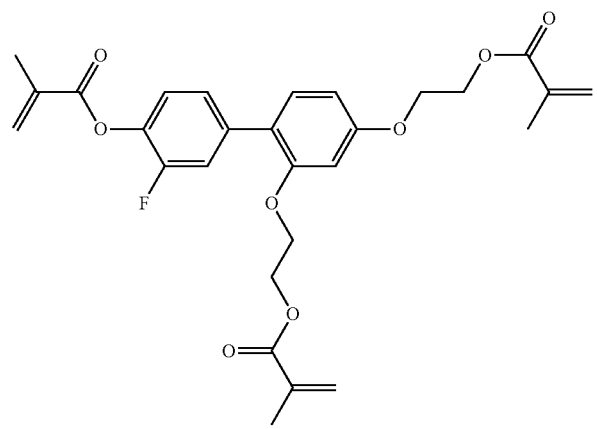 [SMILES: C=C(C)C(=O)OCCOc1ccc(-c2ccc(OC(=O)C(=C)C)c(F)c2)c(OCCOC(=O)C(=C)C)c1]
RM-112
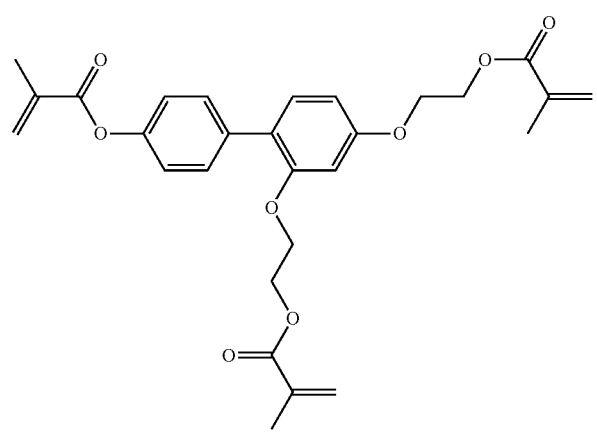 [SMILES: C=C(C)C(=O)OCCOc1ccc(-c2ccc(OC(=O)C(=C)C)cc2)c(OCCOC(=O)C(=C)C)c1]
RM-113

TABLE G-continued
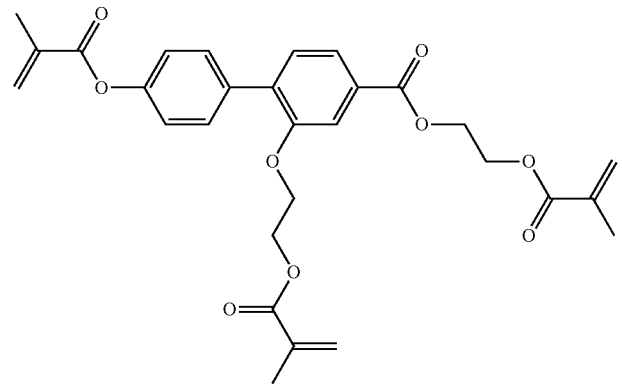 [SMILES: C=C(C)C(=O)OCCOC(=O)c1ccc(-c2ccc(OC(=O)C(=C)C)cc2)c(OCCOC(=O)C(=C)C)c1]
RM-114
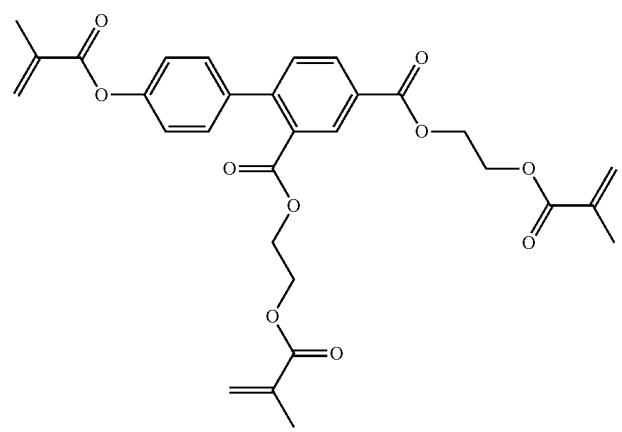 [SMILES: C=C(C)C(=O)OCCOC(=O)c1ccc(-c2ccc(OC(=O)C(=C)C)cc2)c(C(=O)OCCOC(=O)C(=C)C)c1]
RM-115
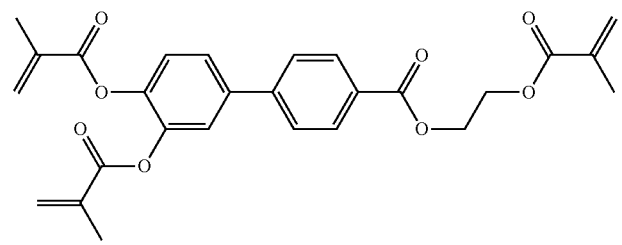 [SMILES: C=C(C)C(=O)OCCOC(=O)c1ccc(-c2ccc(OC(=O)C(=C)C)c(OC(=O)C(=C)C)c2)cc1]
RM-116
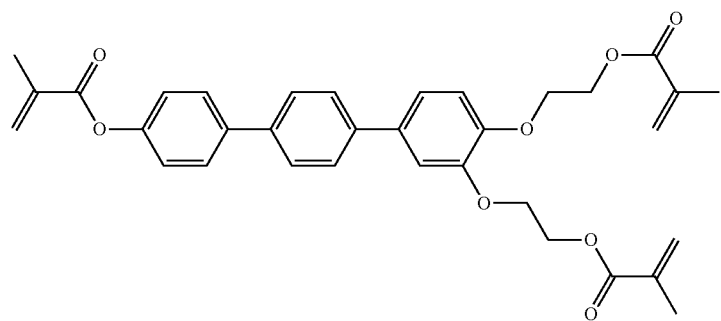 [SMILES: C=C(C)C(=O)OCCOc1ccc(-c2ccc(-c3ccc(OC(=O)C(=C)C)cc3)cc2)cc1OCCOC(=O)C(=C)C]
RM-117

TABLE G-continued
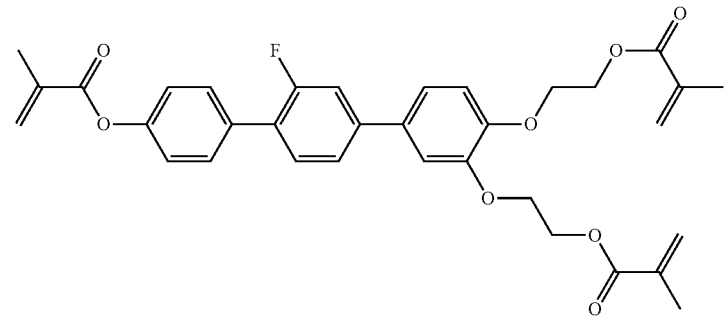 [SMILES: C=C(C)C(=O)OCCOc1ccc(-c2ccc(-c3ccc(OC(=O)C(=C)C)cc3)c(F)c2)cc1OCCOC(=O)C(=C)C]
RM-118
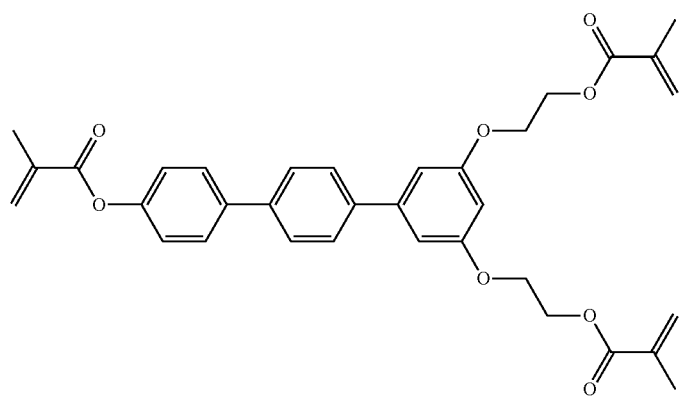 [SMILES: C=C(C)C(=O)OCCOc1cc(OCCOC(=O)C(=C)C)cc(-c2ccc(-c3ccc(OC(=O)C(=C)C)cc3)cc2)c1]
RM-119
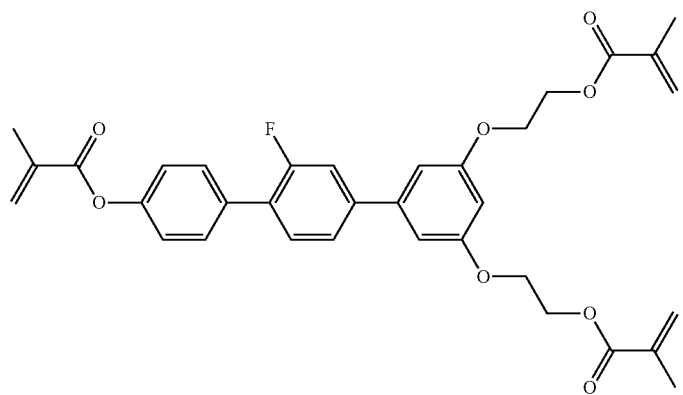 [SMILES: C=C(C)C(=O)OCCOc1cc(OCCOC(=O)C(=C)C)cc(-c2ccc(-c3ccc(OC(=O)C(=C)C)cc3)c(F)c2)c1]
RM-120
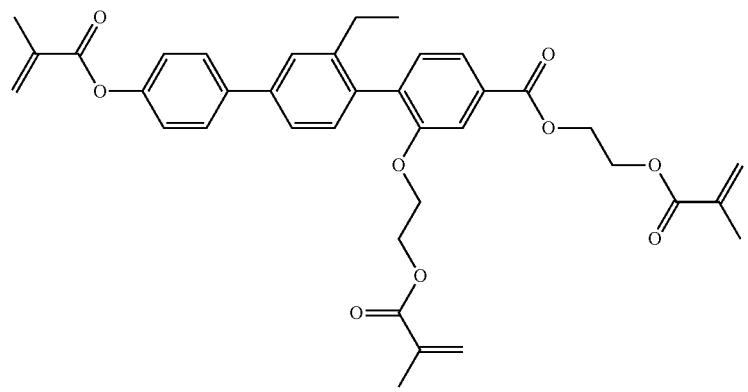 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]
RM-121

In a preferred embodiment of the present invention, the mesogenic media comprise one or more compounds selected from the group of the compounds from Table G.

The liquid crystalline media according to the present invention comprise preferably four or more, more preferably six or more, even more preferably seven or more, and particularly preferably eight or more compounds selected from the group of compounds of table D, preferably compounds of three or more different formulae selected from the group of formulae of table D. It is particularly preferred that the medium additionally contains one, two or more compounds selected from the group of formulae of table E. Even more preferably the medium further contains one, two or more compounds selected from the group of formulae of table G.

Table H below shows illustrative compounds which can preferably be used as further or alternative additives in the mesogenic media according to the present invention.

TABLE H

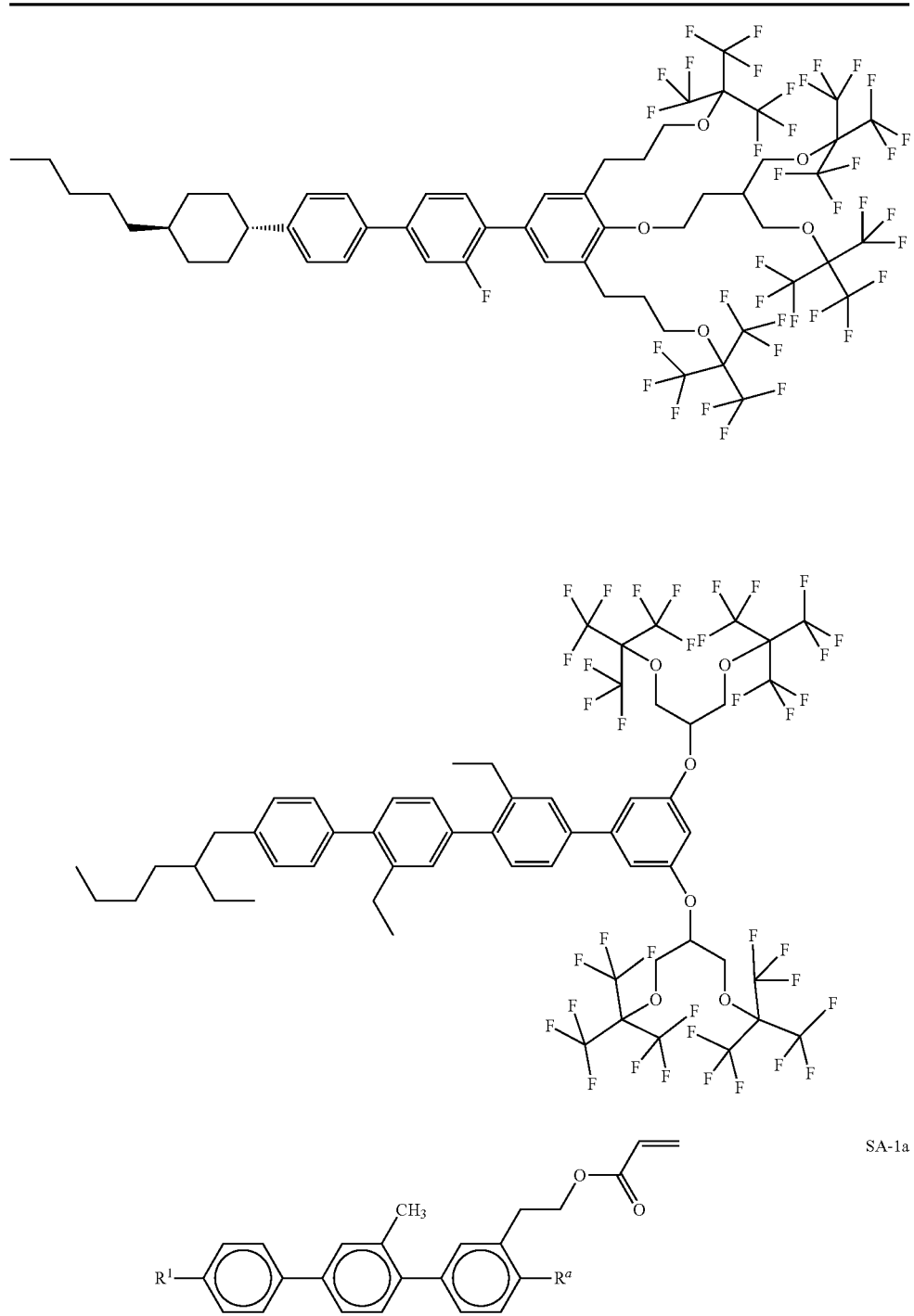

SA-1a

TABLE H-continued
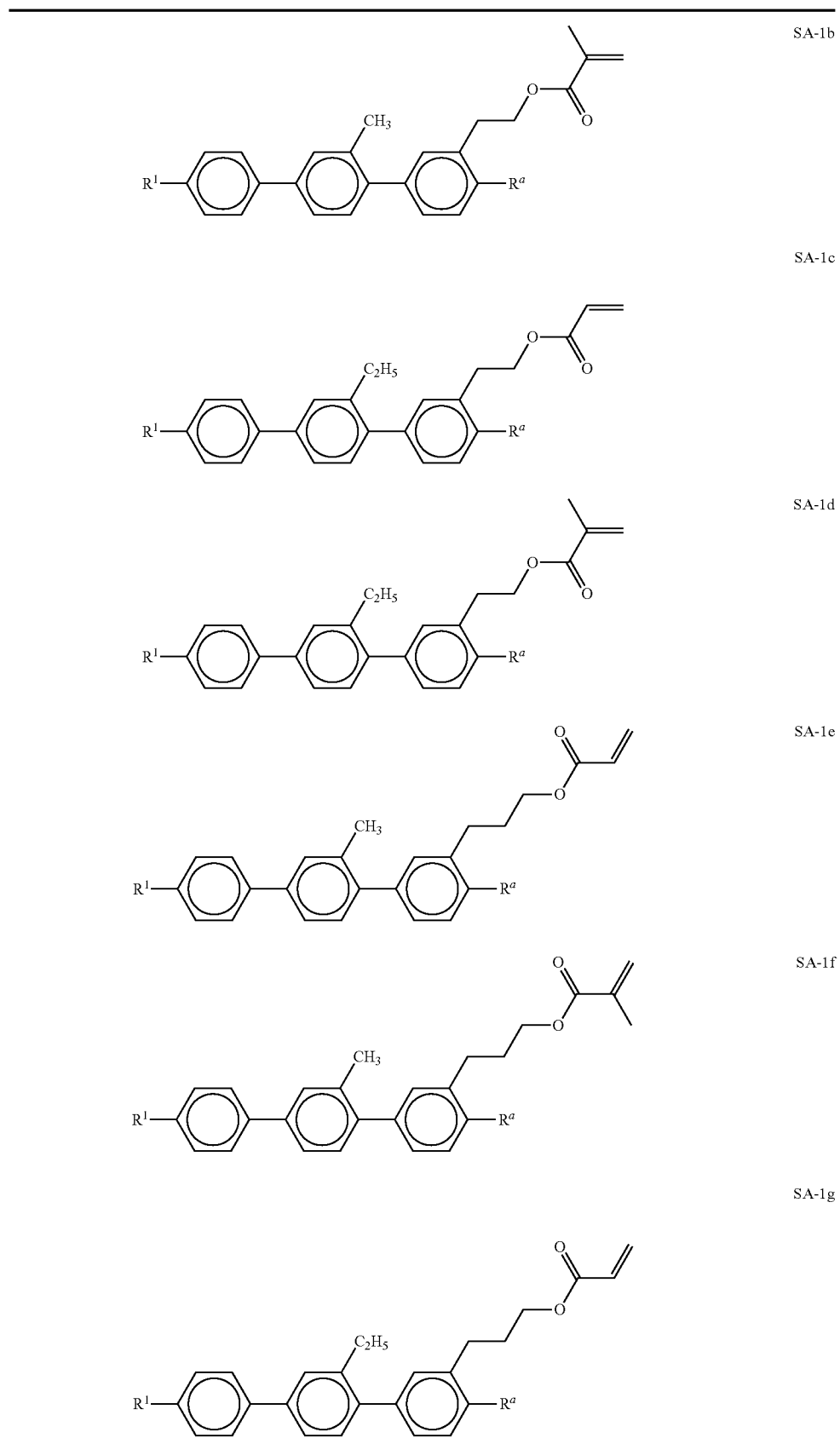

TABLE H-continued
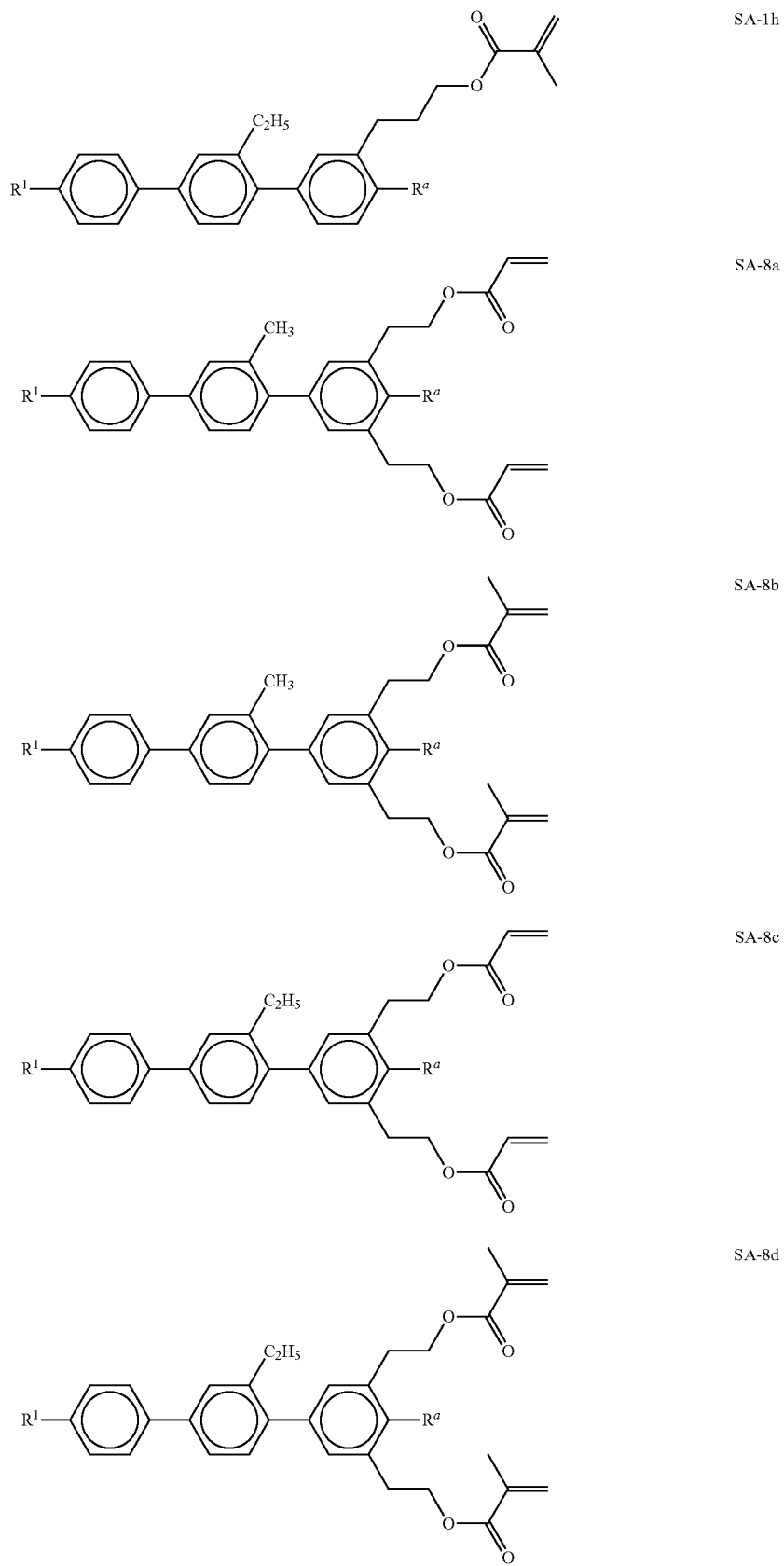

TABLE H-continued
SA-8e
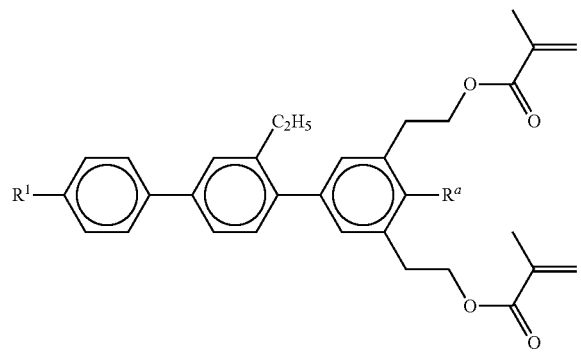
SA-8f
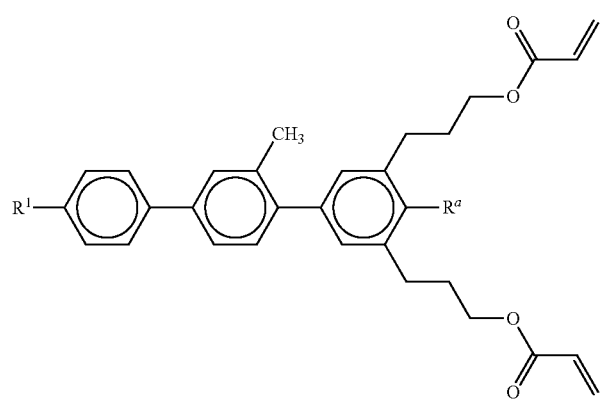
SA-8g
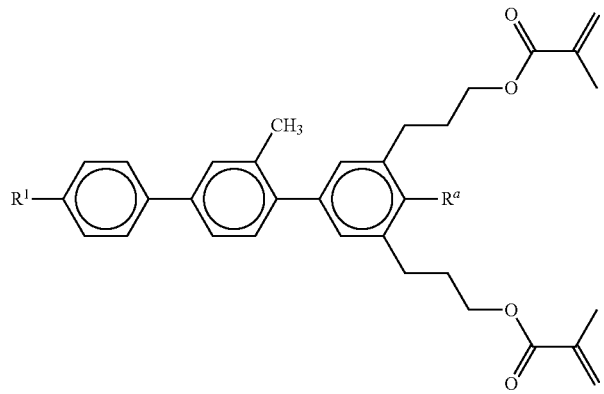
SA-8h
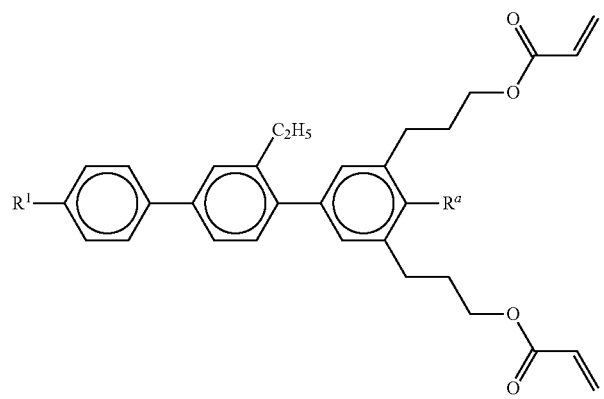

TABLE H-continued
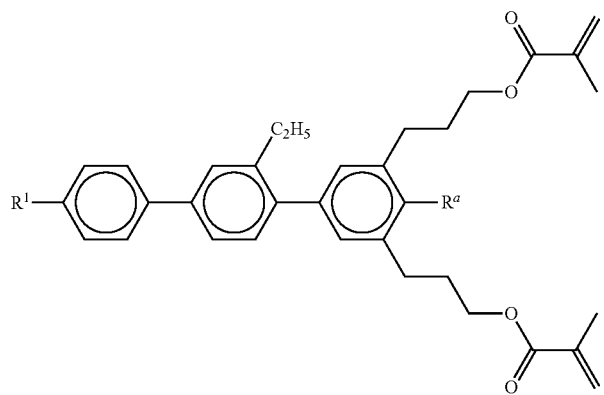
SA-8i
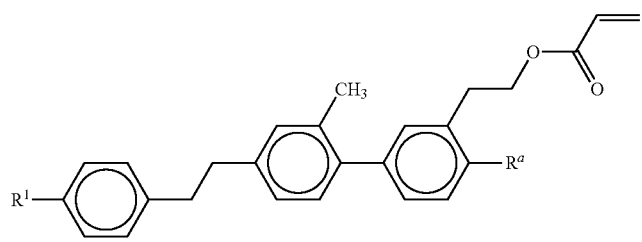
SA-10a
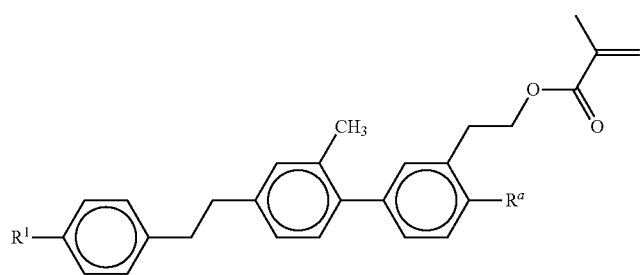
SA-10b
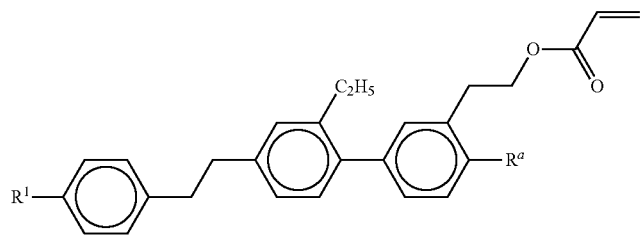
SA-10c
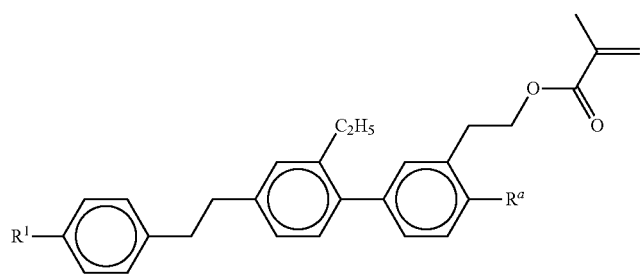
SA-10d TABLE H-continued
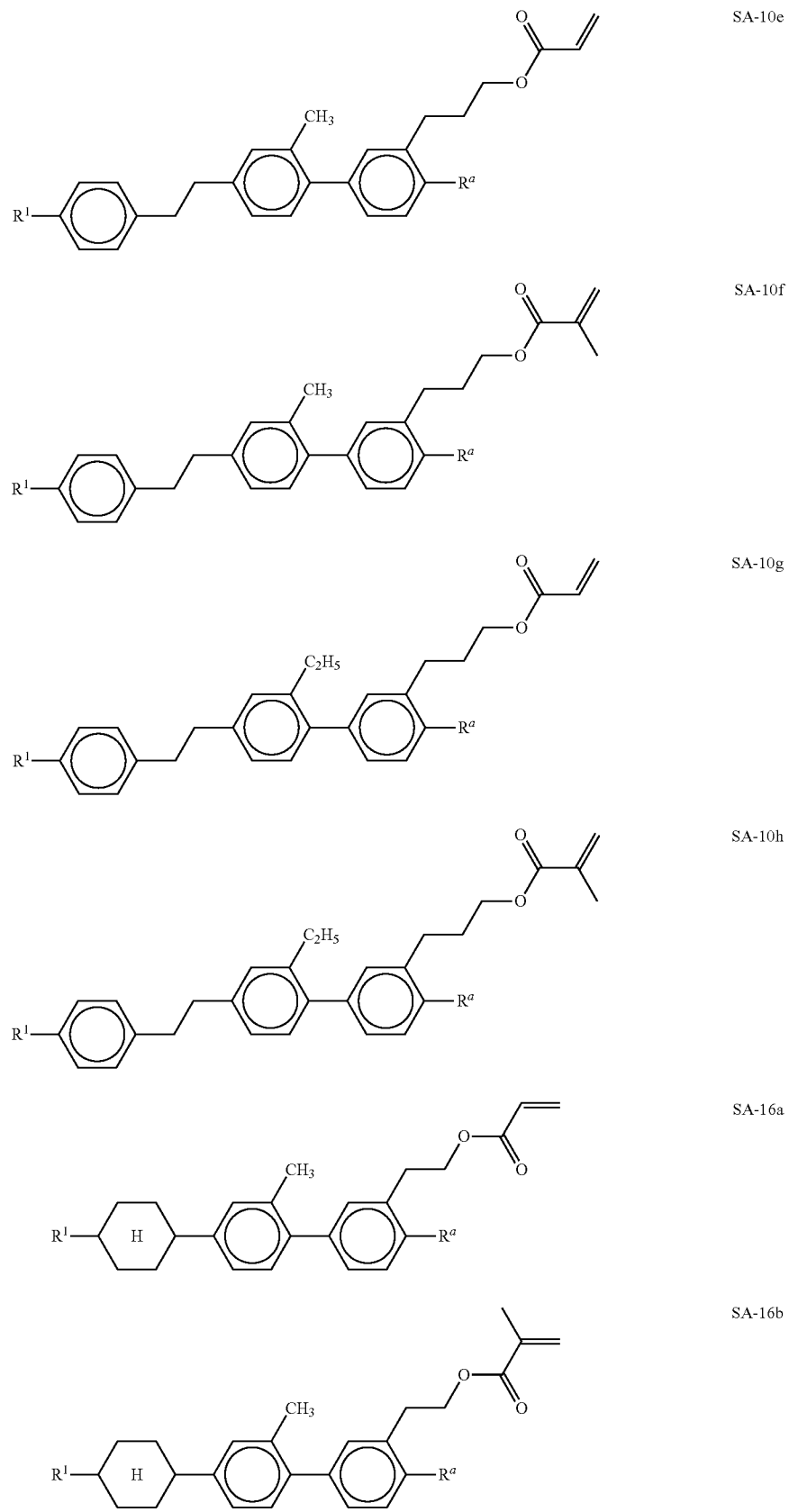

TABLE H-continued
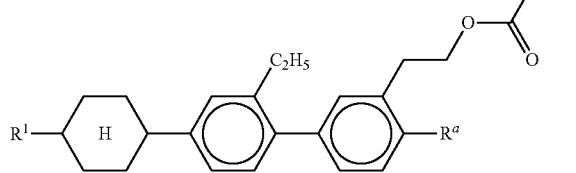
SA-16c
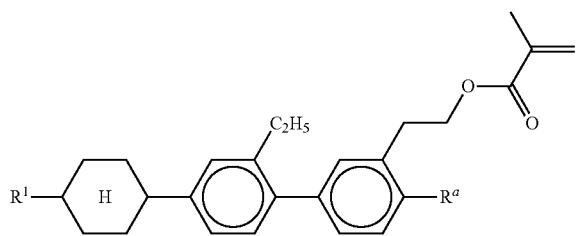
SA-16d
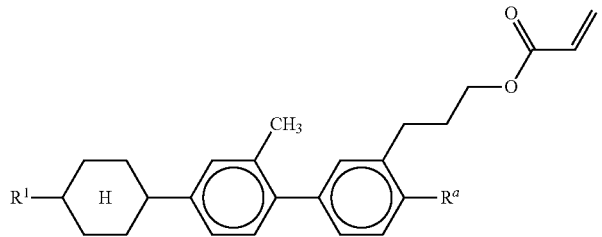
SA-16e
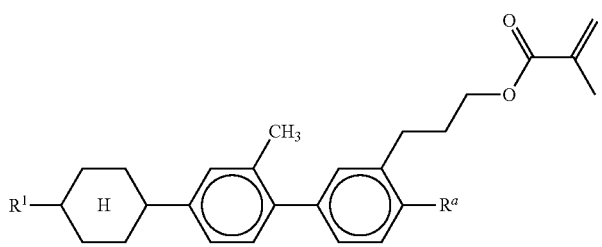
SA-16f
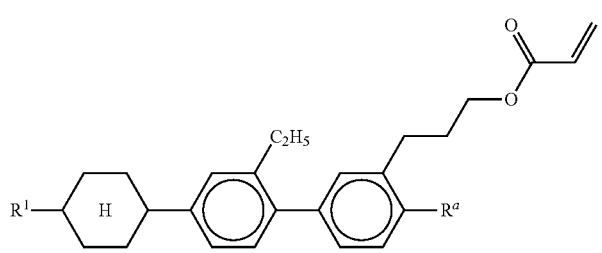
SA-16g
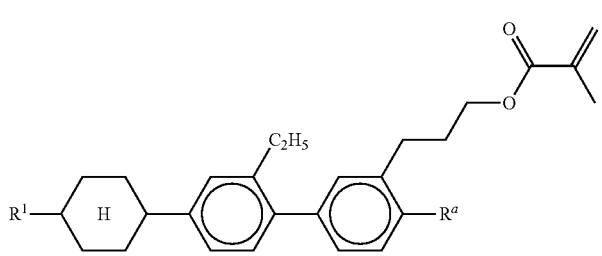
SA-16h TABLE H-continued
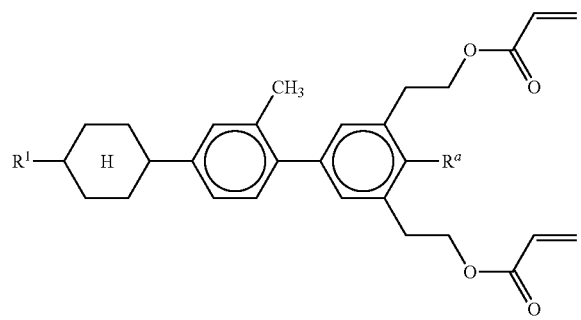
SA-23a
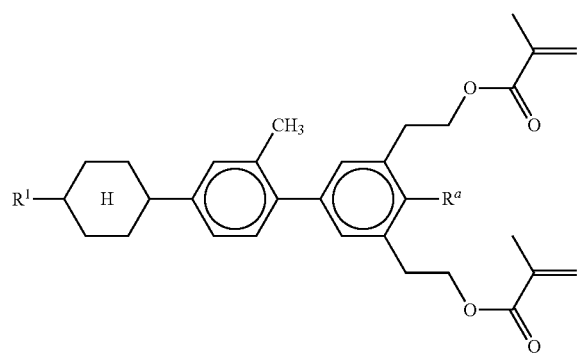
SA-23b
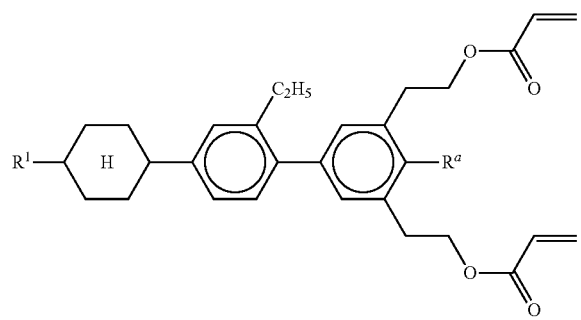
SA-23c
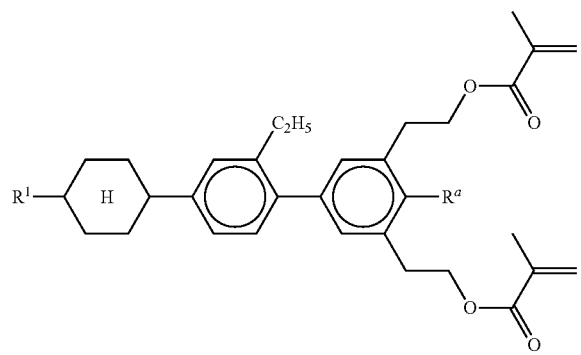
SA-23d TABLE H-continued
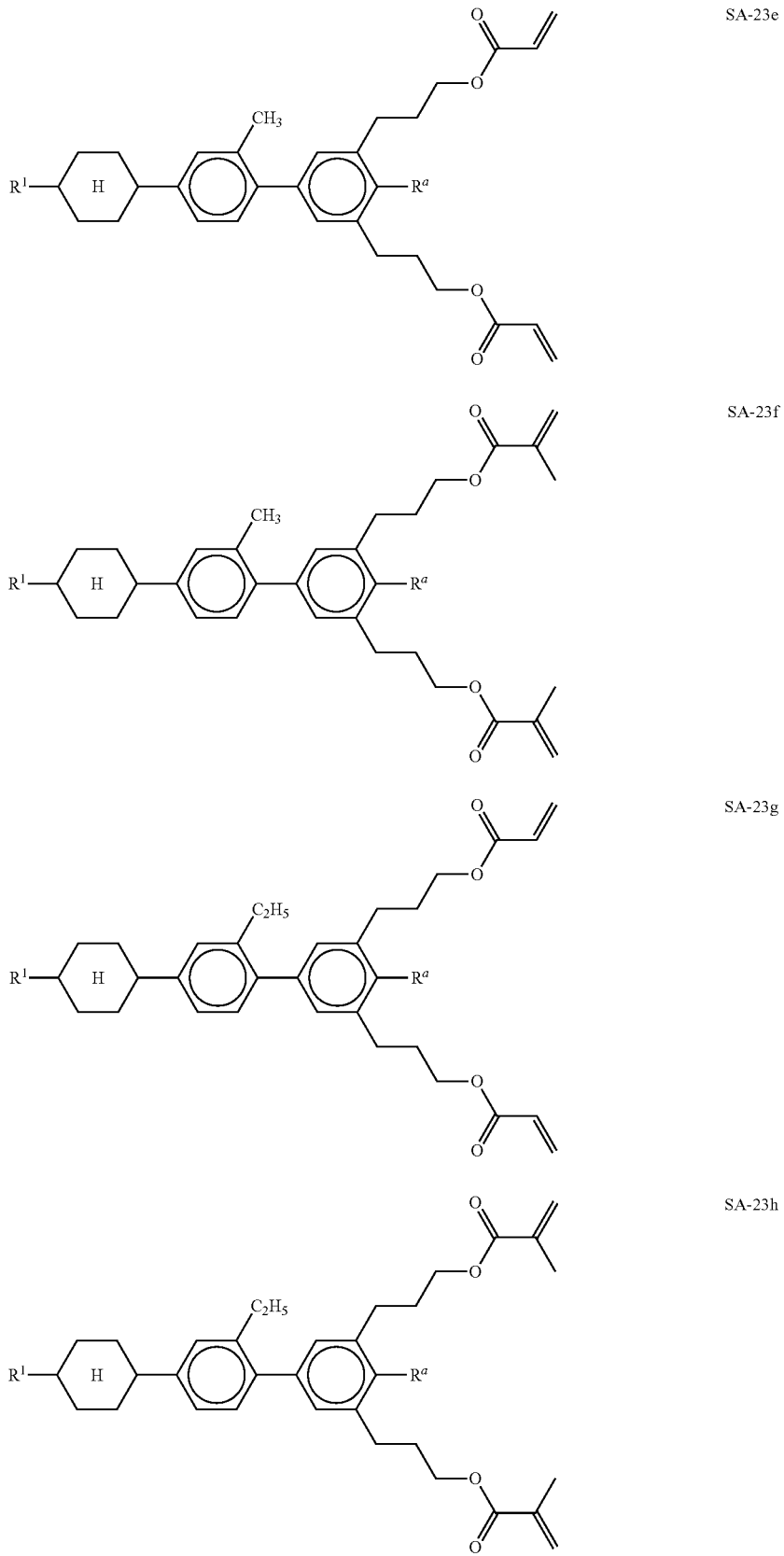
SA-23e
SA-23f
SA-23g
SA-23h TABLE H-continued
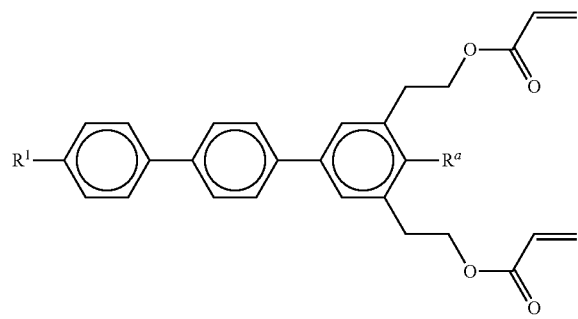
SA-62a
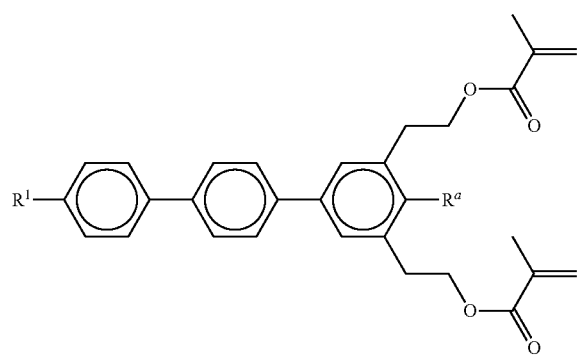
SA-62b
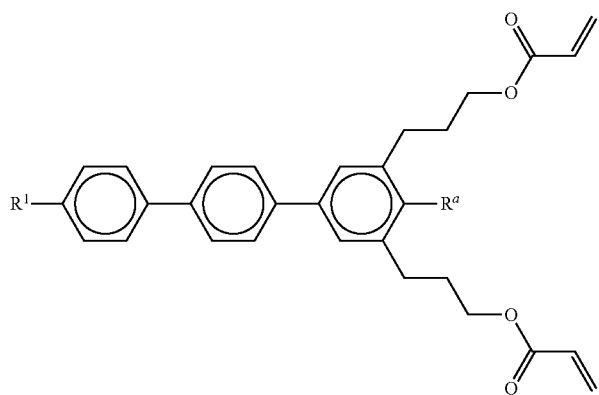
SA-62c
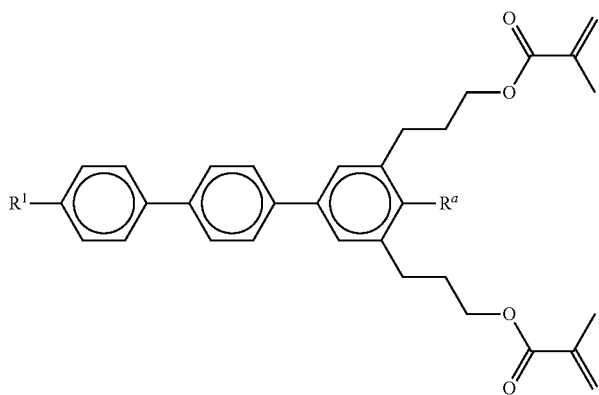
SA-62d TABLE H-continued
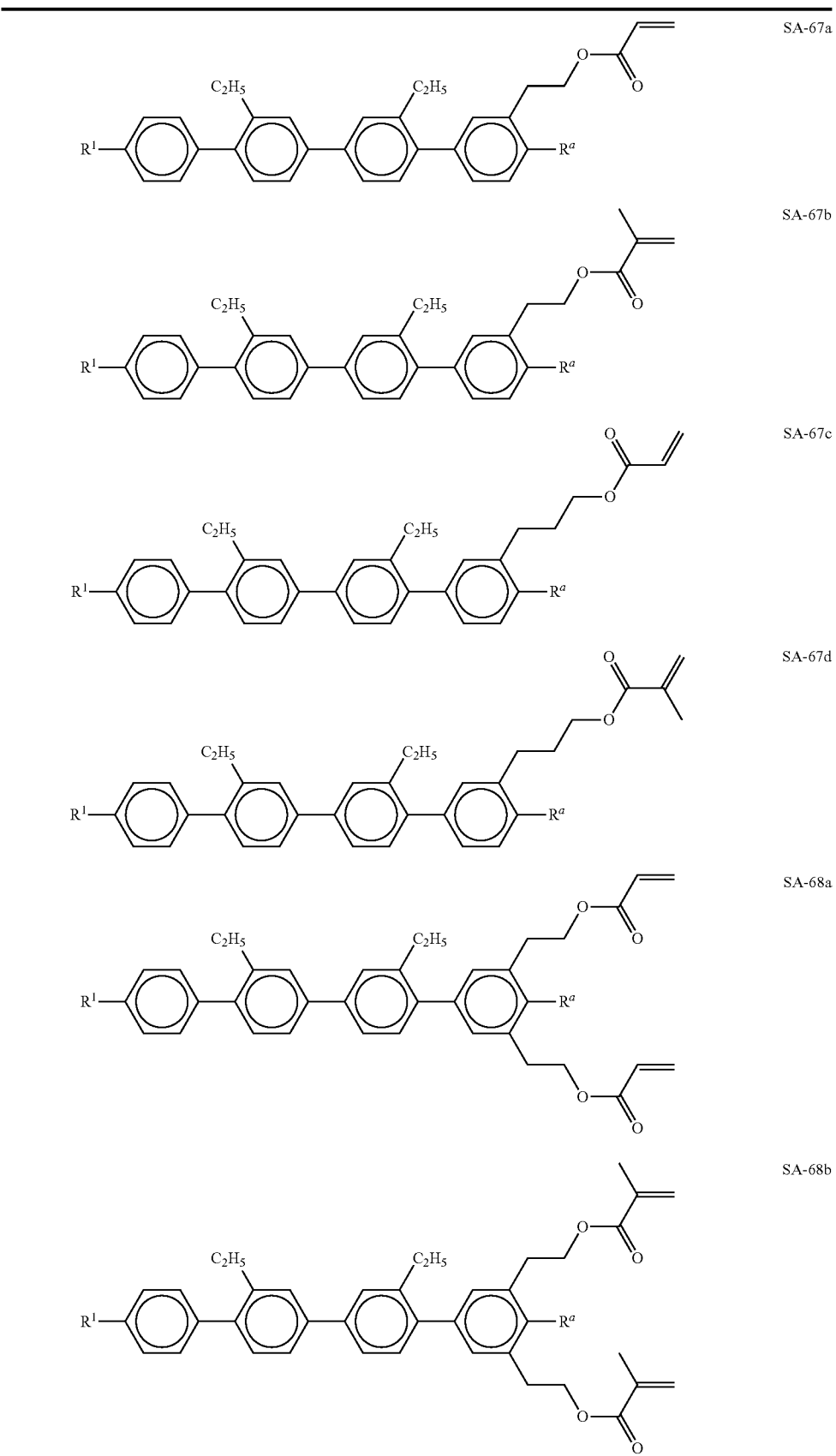

TABLE H-continued
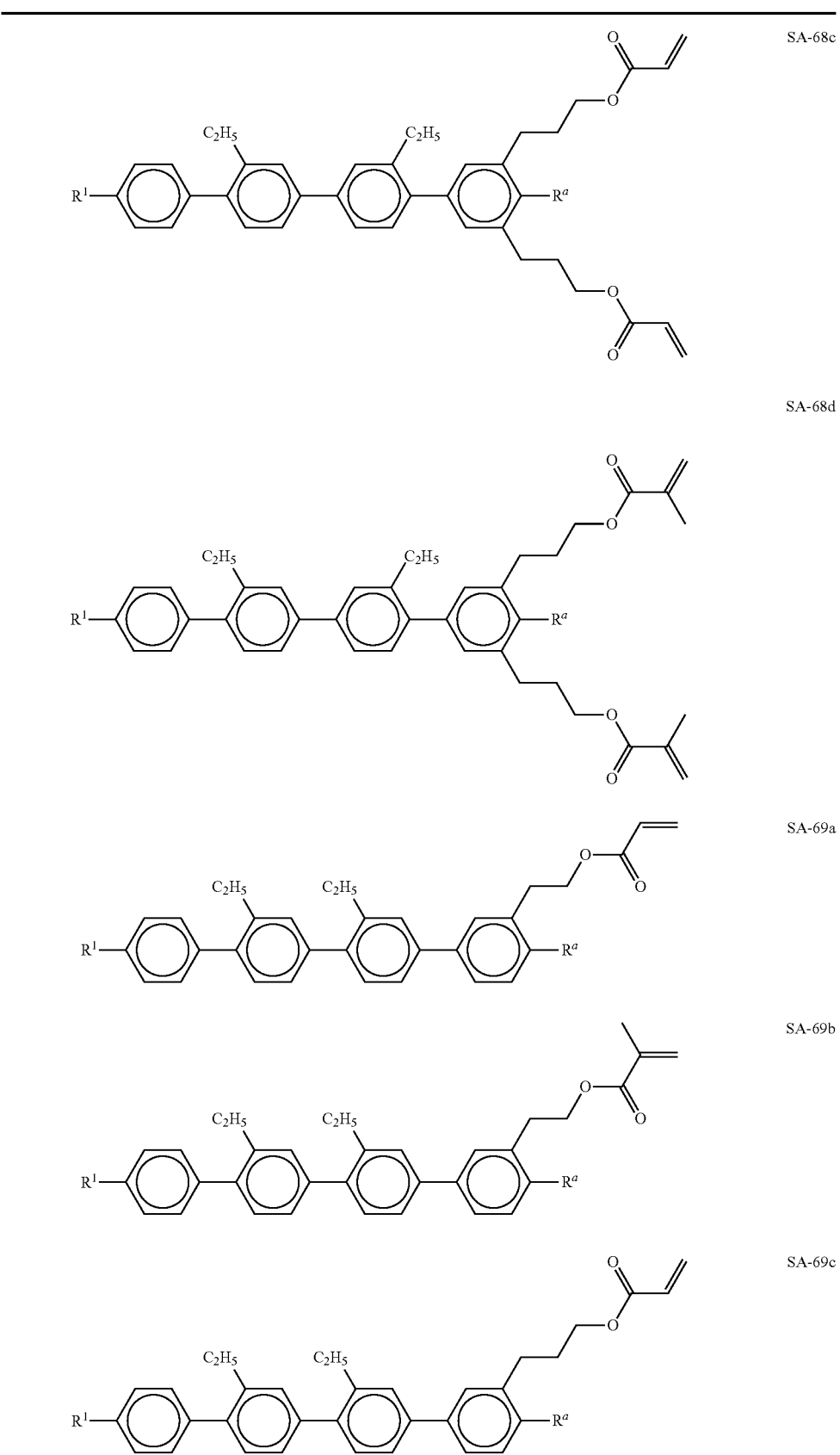

TABLE H-continued
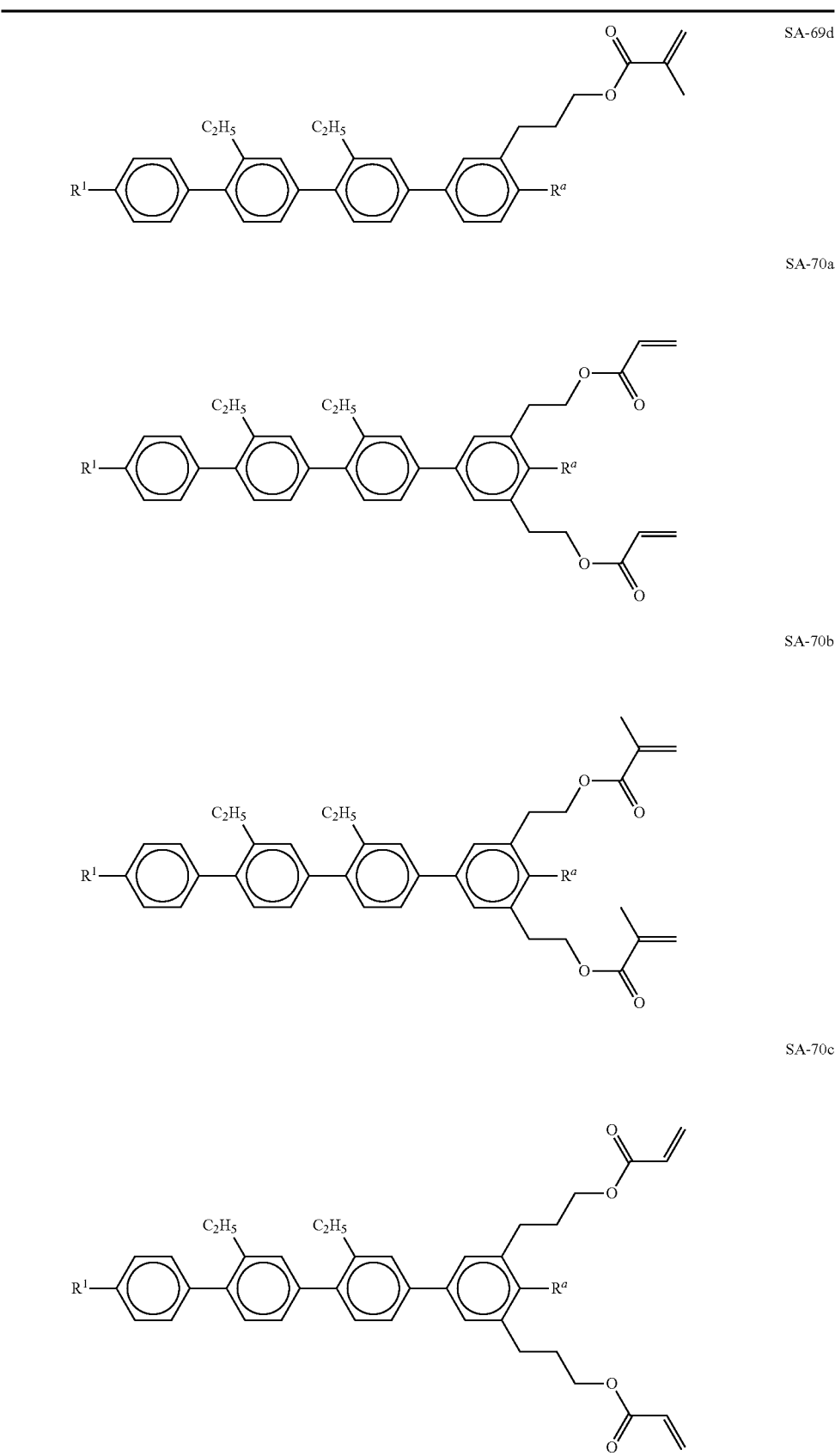

TABLE H-continued
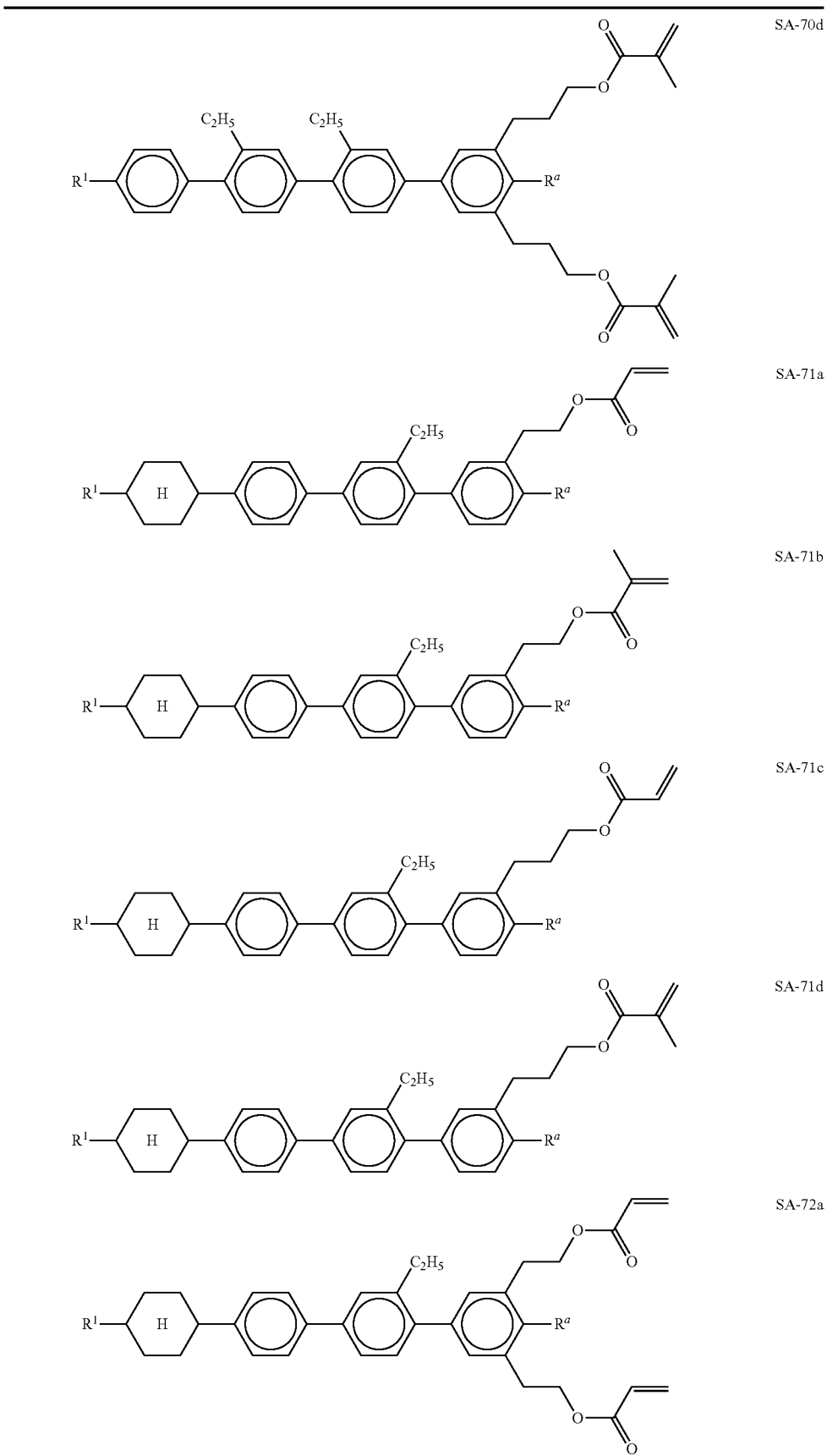

TABLE H-continued
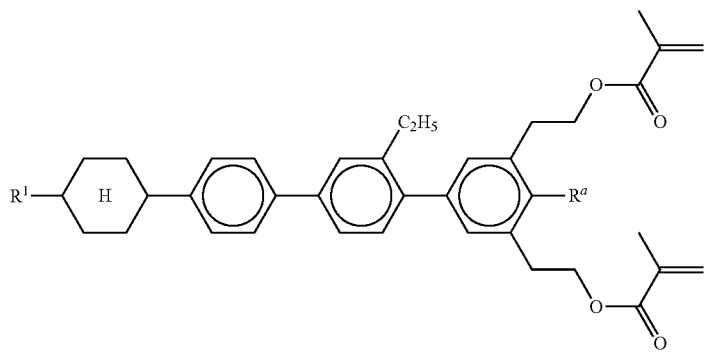
SA-72b
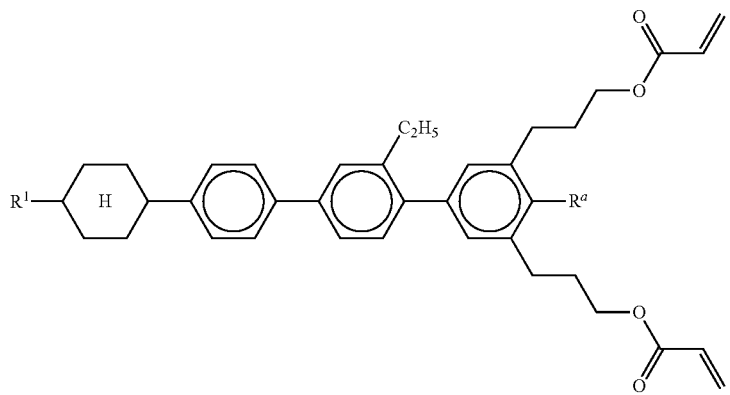
SA-72c
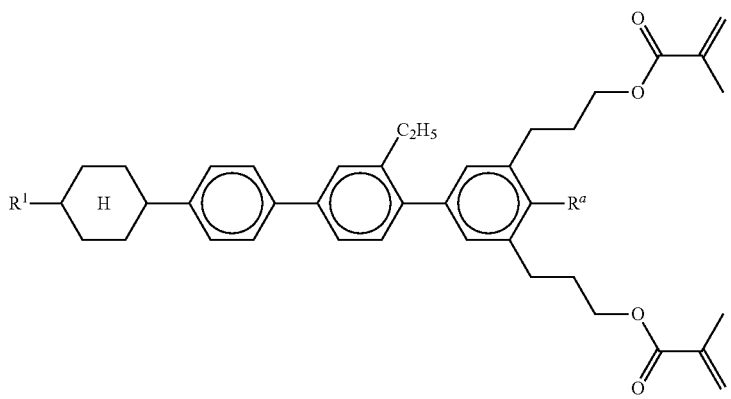
SA-72d
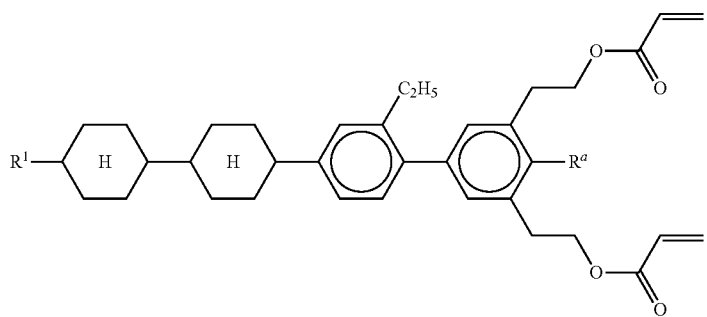
SA-76a TABLE H-continued

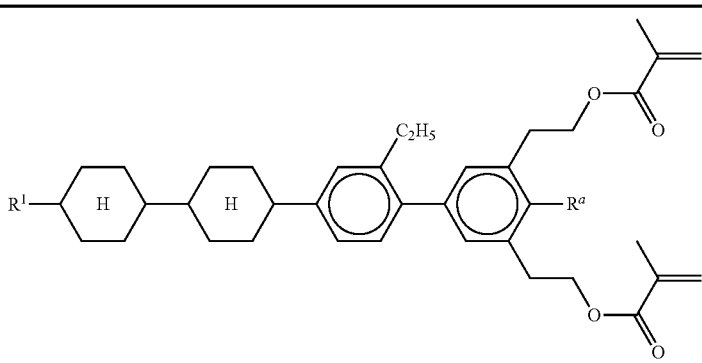

SA-76b

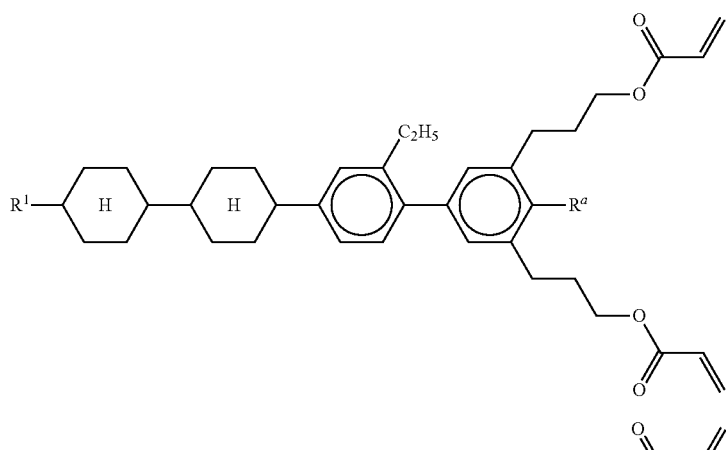

SA-76c

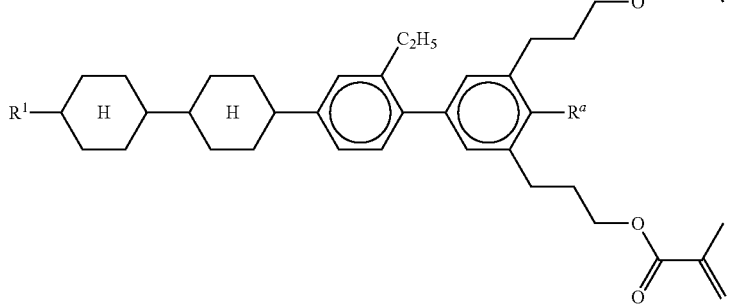

SA-76d in which $R^a$ denotes an anchor group, preferably a group of formula

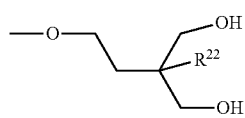

wherein $R^{22}$ is H, methyl, ethyl, n-propyl, i-propyl, n-butyl, tert-butyl, $CH_2CH_2$-tert-butyl or n-pentyl, preferably H,
and $R^1$ denotes a straight-chain alkyl or alkoxy radical having 1 to 8 carbon atoms, preferably $C_2H_5$, $n\text{-}C_3H_7$, $n\text{-}C_4H_9$, $n\text{-}C_5H_{11}$, $n\text{-}C_6H_{13}$ or $n\text{-}C_7H_{15}$, most preferably $n\text{-}C_5H_{11}$.

The following examples are merely illustrative of the present invention and they should not be considered as limiting the scope of the invention in any way. The examples and modifications or other equivalents thereof will become apparent to those skilled in the art in the light of the present disclosure.

However, the physical properties and compositions shown in the following illustrate which properties can be achieved and in which ranges they can be modified. Especially the combination of the various properties, which can be preferably achieved, is thus well defined.

EXAMPLES

Liquid crystal mixtures and composite systems are realized with the compositions and properties as given in the following. Their properties and optical performance are investigated.

Comparative Example 1

A comparative liquid-crystal base mixture CB-1 is prepared and characterized with respect to its general physical properties, having the composition and properties as indicated in the following table.

| | | | |
|---|---|---|---|
| PP-5-N | 51.00% | Clearing point: | 58.0° C. |
| PP-7-N | 25.00% | Δn [589 nm, 20° C.]: | 0.226 |
| PP-8O-N | 16.00% | Δε [1 kHz, 20° C.]: | 14.3 |
| PPP-5-N | 8.00% | | |
| Σ 100.00% | | | |

A comparative cholesteric mixture CC-1 is prepared by adding the chiral dopant R-5011 available from Merck KGaA, Darmstadt, Germany to the comparative base mixture CB-1 such that a pitch of 0.9 μm is obtained, wherein CC-1 contains 99.08% of the mixture CB-1 and 0.92% of R-5011.

Comparative Example 2

A comparative liquid-crystal base mixture CB-2 is prepared and characterized with respect to its general physical properties, having the composition and properties as indicated in the following table.

| | | | |
|---|---|---|---|
| PP-2-N | 8.75% | Clearing point: | 97.0° C. |
| PP-5O-N | 18.76% | Δn [589 nm, 20° C.]: | 0.267 |
| PP-6-ON | 8.75% | Δε [1 kHz, 20° C.]: | 17.0 |
| CPP-5-N | 10.01% | | |
| PPP-5-N | 4.97% | | |
| PGIP-3-N | 18.76% | | |
| PP-5-N | 30.00% | | |
| Σ 100.00% | | | |

A comparative cholesteric mixture CC-2 is prepared by adding the chiral dopant R-5011 available from Merck KGaA, Darmstadt, Germany to the comparative base mixture CB-2 such that a pitch of 2 μm is obtained, wherein CC-2 contains 99.57% of the mixture CB-2 and 0.43% of R-5011.

Comparative Example 3

A comparative liquid-crystal base mixture CB-3 is prepared and characterized with respect to its general physical properties, having the composition and properties as indicated in the following table.

| | | | |
|---|---|---|---|
| PZG-2-N | 9.00% | Clearing point: | 92.0° C. |
| PZG-3-N | 10.00% | Δn [589 nm, 20° C.]: | 0.257 |
| PZG-4-N | 14.00% | Δε [1 kHz, 20° C.]: | 41.8 |
| PZG-5-N | 14.00% | | |
| CP-3-N | 2.00% | | |
| PPTUI-3-2 | 20.00% | | |
| PPTUI-3-4 | 28.00% | | |
| CGPC-3-3 | 3.00% | | |
| Σ 100.00% | | | |

A comparative cholesteric mixture CC-3 is prepared by adding the chiral dopant R-5011 available from Merck KGaA, Darmstadt, Germany to the comparative base mixture CB-3 such that a pitch of 2 μm is obtained, wherein CC-3 contains 99.46% of the mixture CB-3 and 0.54% of R-5011.

Comparative Example 4

A comparative liquid-crystal base mixture CB-4 is prepared and characterized with respect to its general physical properties, having the composition and properties as indicated in the following table.

| | | | |
|---|---|---|---|
| CP-3-N | 16.00% | Clearing point: | 114.5° C. |
| CP-5-N | 16.00% | Δn [589 nm, 20° C.]: | 0.135 |
| CPG-3-F | 5.00% | Δε [1 kHz, 20° C.]: | 11.3 |
| CPG-5-F | 5.00% | | |
| CPU-3-F | 15.00% | | |
| CPU-5-F | 15.00% | | |
| CCGU-3-F | 7.00% | | |
| CGPC-3-3 | 4.00% | | |
| CGPC-5-3 | 4.00% | | |
| CGPC-5-5 | 4.00% | | |
| CCZPC-3-3 | 3.00% | | |
| CCZPC-3-4 | 3.00% | | |
| CCZPC-3-5 | 3.00% | | |
| Σ 100.00% | | | |

A comparative cholesteric mixture CC-4 is prepared by adding the chiral dopant R-5011 available from Merck KGaA, Darmstadt, Germany to the comparative base mixture CB-4 such that a pitch of 2 μm is obtained, wherein CC-4 contains 99.62% of the mixture CB-4 and 0.38% of R-5011.

For the respective comparative cholesteric mixtures the VHR is respectively determined. Moreover, for the comparative cholesteric mixtures the pitch is confirmed by measuring the wavelength of the selective reflection maximum $\lambda_{max}$ at 20° C. using the NIR spectroscopic method described above.

The mixtures are placed in electro-optical cells which are provided with orientation layers (antiparallel rubbed polyimide AL-1054 from Japan Synthetic Rubber), wherein the LC mixtures have a layer thickness of 23.2 μm with). The haze of the respective cells in the scattering state is determined according to ASTM 1003-92 using a spectrophotometer (Lambda 1050, Perkin Elmer) and a 150 mm Ulbricht's sphere.

The following Table shows the obtained results.

| | Comparative Example 1 | Comparative Example 2 | Comparative Example 3 | Comparative Example 4 |
|---|---|---|---|---|
| VHR | 20% | 20% | 30% | 85% |
| pitch | 0.9 μm | 2 μm | 2 μm | 2 μm |
| voltage for hazy state | 4 V | 10 V | 9 V | 13 V |
| haze | 68% | 84% | 89% | 74% |

Example 1

A liquid-crystal base mixture B-1 is prepared and characterized with respect to its general physical properties, having the composition and properties as indicated in the following table.

| | | | |
|---|---|---|---|
| GGP-5-CI | 17.00% | Clearing point: | 101.0° C. |
| PGIGI-3-F | 7.00% | Δn [589 nm, 20° C.]: | 0.181 |
| CPG-2-F | 8.00% | $n_e$ [589 nm, 20° C.]: | 1.693 |
| CPG-3-F | 8.00% | Δε [1 kHz, 20° C.]: | 13.2 |
| CPG-5-F | 5.00% | $\varepsilon_\parallel$ [1 kHz, 20° C.]: | 18.0 |
| CGU-2-F | 7.00% | | |
| CGU-3-F | 7.00% | | |
| CGU-5-F | 4.00% | | |
| PGU-2-F | 8.00% | | |
| PGU-3-F | 8.00% | | |
| CPGU-3-F | 10.00% | | |
| CPP-3-2 | 5.00% | | |
| CGPC-3-3 | 3.00% | | |
| CGPC-5-3 | 3.00% | | |
| Σ 100.00% | | | |

A cholesteric mixture C-1 is prepared by adding the chiral dopant R-5011 available from Merck KGaA, Darmstadt, Germany to the base mixture B-1 such that a pitch of 2 μm is obtained, wherein C-1 contains 99.65% of the mixture B-1 and 0.35% of R-5011.

The VHR, pitch and haze are determined as described for the Comparative Examples above, and the following values are obtained: VHR: 90%, pitch: 2 μm, voltage for the hazy state: 7 V, haze: 62%.

The mixture exhibits a long shelf life at low temperatures. The shelf life is determined by storing the respective sample at the respective temperature and determining the time period during which no visible crystallisation or decomposition occurs. The following Table shows the determined shelf life

| | |
|---|---|
| shelf life (bulk, −20° C.) | 70 days |
| shelf life (bulk, −30° C.) | 49 days |
| shelf life (bulk, −40° C.) | 19 days |
| shelf life (6 μm TN cell, −30° C.) | >117 days |
| shelf life (6 μm TN cell, −40° C.) | >19 days |

The mixture shows favourable electro-optical performance and stability.

Example 2

A liquid-crystal base mixture B-2 is prepared and characterized with respect to its general physical properties, having the composition and properties as indicated in the following table.

| | | | |
|---|---|---|---|
| PP-1-2V1 | 8.00% | Clearing point: | 98.0° C. |
| CP-3-O1 | 7.00% | Δn [589 nm, 20° C.]: | 0.231 |
| CP-3-CI | 3.00% | $n_e$ [589 nm, 20° C.]: | 1.755 |
| PGP-2-2V | 9.00% | Δε [1 kHz, 20° C.]: | 7.0 |
| PGP-3-2V | 6.00% | $\varepsilon_\parallel$ [1 kHz, 20° C.]: | 11.0 |
| PGU-3-F | 4.00% | | |
| GGP-3-CI | 9.00% | | |
| GGP-5-CI | 20.00% | | |
| GPEP-2-CI | 8.00% | | |
| GPEP-5-CI | 12.00% | | |
| PGIGI-3-F | 5.00% | | |
| CPGP-4-3 | 3.00% | | |
| CPGP-5-2 | 3.00% | | |
| DPGU-4-F | 3.00% | | |
| Σ 100.00% | | | |

A cholesteric mixture C-2 is prepared by adding the chiral dopant R-5011 available from Merck KGaA, Darmstadt, Germany to the base mixture B-2 such that a pitch of 2 μm is obtained, wherein C-2 contains 99.54% of the mixture B-2 and 0.46% of R-5011.

The pitch and haze are determined as described for the Comparative Examples above, and the following values are obtained:

Pitch: 2 μm, voltage for the hazy state: 21 V, haze: 73%.

The mixture exhibits a long shelf life at −20° C. as well as at even lower temperatures when placed in cells. The following Table shows the determined shelf life values.

| | |
|---|---|
| shelf life (bulk, −20° C.) | >203 days |
| shelf life (bulk, −30° C.) | 8 days |
| shelf life (bulk, −40° C.) | 8 days |
| shelf life (6 μm TN cell, −30° C.) | >202 days |
| shelf life (6 μm TN cell, −40° C.) | 70 days |

The mixture shows favourable electro-optical performance and stability.

Example 3

A liquid-crystal base mixture B-3 is prepared and characterized with respect to its general physical properties, having the composition and properties as indicated in the following table.

| | | | |
|---|---|---|---|
| PGIGI-3-F | 12.00% | Clearing point: | 104.0° C. |
| CPG-2-F | 8.00% | Δn [589 nm, 20° C.]: | 0.161 |
| CPG-3-F | 8.00% | Δε [1 kHz, 20° C.]: | 10.9 |
| CPG-5-F | 5.00% | $\varepsilon_\parallel$ [1 kHz, 20° C.]: | 15.2 |
| CPU-5-F | 10.00% | | |
| CPU-7-F | 10.00% | | |
| PGU-3-F | 4.00% | | |
| PGU-5-F | 9.00% | | |
| CCGU-3-F | 8.00% | | |
| CPP-3-2 | 4.00% | | |
| CGPC-3-3 | 3.00% | | |
| CGPC-5-3 | 3.00% | | |
| CGPC-5-5 | 3.00% | | |
| CPGU-3-OT | 3.00% | | |
| CP-5-N | 10.00% | | |
| Σ 100.00% | | | |

A cholesteric mixture C-3 is prepared by adding the chiral dopant R-5011 available from Merck KGaA, Darmstadt, Germany to the base mixture B-3 such that a pitch of 2 μm is obtained.

The mixture exhibits a long shelf life at −20° C. and −30° C. as well as at even lower temperatures when placed in cells. The following Table shows the determined shelf life values.

| | |
|---|---|
| shelf life (bulk, −20° C.) | >94 days |
| shelf life (bulk, −30° C.) | >94 days |
| shelf life (bulk, −40° C.) | 0 days |
| shelf life (6 μm TN cell, −30° C.) | >94 days |
| shelf life (6 μm TN cell, −40° C.) | >94 days |

The mixture shows favourable electro-optical performance and stability.

Example 4

A liquid-crystal base mixture B-4 is prepared and characterized with respect to its general physical properties, having the composition and properties as indicated in the following table.

| | | | |
|---|---|---|---|
| PGIGI-3-F | 10.00% | Clearing point: | 105.0° C. |
| CPG-2-F | 6.00% | Δn [589 nm, 20° C.]: | 0.160 |
| CPG-3-F | 7.00% | $n_e$ [589 nm, 20° C.]: | 1.663 |
| CPG-5-F | 5.00% | Δε [1 kHz, 20° C.]: | 10.0 |
| CPU-5-F | 10.00% | | |
| CPU-7-F | 10.00% | | |
| PGU-3-F | 4.00% | | |
| PGU-5-F | 7.00% | | |
| CCGU-3-F | 8.00% | | |
| CPP-3-2 | 4.00% | | |
| CGPC-3-3 | 3.00% | | |
| CGPC-5-3 | 3.00% | | |
| CGPC-5-5 | 3.00% | | |
| CPGU-3-OT | 5.00% | | |
| CP-5-N | 15.00% | | |
| Σ 100.00% | | | |

A cholesteric mixture C-4 is prepared by adding the chiral dopant R-5011 available from Merck KGaA, Darmstadt, Germany to the base mixture B-4 such that a pitch of 2 μm is obtained, wherein C-4 contains 99.65% of the mixture B-4 and 0.35% of R-5011.

The mixture exhibits a long shelf life at low temperatures. The following Table shows the determined shelf life values.

| | |
|---|---|
| shelf life (bulk, −20° C.) | >73 days |
| shelf life (bulk, −30° C.) | 49 days |
| shelf life (bulk, −40° C.) | 39 days |
| shelf life (6 μm TN cell, −30° C.) | >73 days |
| shelf life (6 μm TN cell, −40° C.) | >73 days |

The mixture shows favourable electro-optical performance and stability.

Example 5

A liquid-crystal base mixture B-5 is prepared and characterized with respect to its general physical properties, having the composition and properties as indicated in the following table.

| | | | |
|---|---|---|---|
| CP-5-N | 15.00% | Clearing point: | 101.0° C. |
| PGIGI-3-F | 10.00% | Δn [589 nm, 20° C.]: | 0.173 |
| CPG-2-F | 6.00% | $n_e$ [589 nm, 20° C.]: | 1.680 |
| CPG-3-F | 7.00% | Δε [1 kHz, 20° C.]: | 11.0 |
| CPG-5-F | 5.00% | $ε_∥$ [1 kHz, 20° C.]: | 15.2 |
| CPU-5-F | 10.00% | | |
| CPU-7-F | 10.00% | | |
| PGU-3-F | 4.00% | | |
| PGU-5-F | 3.00% | | |
| PGP-2-3 | 4.00% | | |
| PGP-2-4 | 5.00% | | |
| PGP-2-5 | 4.00% | | |
| CCGU-3-F | 8.00% | | |
| CPGP-3-OT | 5.00% | | |
| CPGP-5-2 | 4.00% | | |
| Σ 100.00% | | | |

A cholesteric mixture C-5 is prepared by adding the chiral dopant R-5011 available from Merck KGaA, Darmstadt, Germany to the base mixture B-5 such that a pitch of 2 μm is obtained, wherein C-5 contains 99.62% of the mixture B-5 and 0.38% of R-5011.

The mixture shows favourable electro-optical performance and stability.

Example 6

A liquid-crystal base mixture B-6 is prepared and characterized with respect to its general physical properties, having the composition and properties as indicated in the following table.

| | | | |
|---|---|---|---|
| APUQU-3-F | 8.00% | Clearing point: | 127.8° C. |
| CPU-3-F | 15.00% | Δn [589 nm, 20° C.]: | 0.206 |
| CCGU-3-F | 8.00% | $n_e$ [589 nm, 20° C.]: | 1.711 |
| CPGP-5-2 | 4.00% | Δε [1 kHz, 20° C.]: | 42.7 |
| CPGP-5-3 | 4.00% | $ε_∥$ [1 kHz, 20° C.]: | 48.2 |
| CPGU-3-OT | 8.00% | | |
| DPGU-4-F | 4.00% | | |
| PGU-2-F | 10.00% | | |
| PGU-3-F | 11.00% | | |
| PGUQU-3-F | 8.00% | | |
| PGUQU-4-F | 10.00% | | |
| PGUQU-5-F | 10.00% | | |
| Σ 100.00% | | | |

A cholesteric mixture C-6 is prepared by adding the chiral dopant R-5011 available from Merck KGaA, Darmstadt, Germany to the base mixture B-6 such that a pitch of 2 μm is obtained.

The mixture shows favourable electro-optical performance and stability.

Example 7

A liquid-crystal base mixture B-7 is prepared and characterized with respect to its general physical properties, having the composition and properties as indicated in the following table.

| | | | |
|---|---|---|---|
| CP-3-N | 14.00% | Clearing point: | 119.3° C. |
| PTP-1-O2 | 8.00% | Δn [589 nm, 20° C.]: | 0.236 |
| PTP-3-O1 | 6.00% | $n_e$ [589 nm, 20° C.]: | 1.752 |
| CP-3-O1 | 8.50% | Δε [1 kHz, 20° C.]: | 7.2 |
| PGP-2-2V | 8.00% | $ε_∥$ [1 kHz, 20° C.]: | 11.0 |
| CPGP-4-3 | 5.00% | | |
| CPGP-5-2 | 5.00% | | |
| PGP-2-3 | 5.00% | | |
| PGP-2-4 | 5.00% | | |
| PGP-2-5 | 10.00% | | |
| CPTP-3-O1 | 6.00% | | |
| CPTP-3-O2 | 6.00% | | |
| PGUQU-3-F | 7.50% | | |
| PGUQU-4-F | 2.00% | | |
| PP-1-2V1 | 4.00% | | |
| Σ 100.00% | | | |

A cholesteric mixture C-7 is prepared by adding the chiral dopant R-5011 available from Merck KGaA, Darmstadt, Germany to the base mixture B-7 such that a pitch of 2 μm is obtained.

The mixture shows favourable electro-optical performance and stability.

Example 8

A liquid-crystal base mixture B-8 is prepared and characterized with respect to its general physical properties, having the composition and properties as indicated in the following table.

| | | | | |
|---|---|---|---|---|
| CP-1V-N | 16.00% | Clearing point: | 110.1° C. |
| PP-2-N | 7.00% | Δn [589 nm, 20° C.]: | 0.218 |
| PGUQU-3-F | 10.00% | $n_e$ [589 nm, 20° C.]: | 1.737 |
| CPG-2-F | 10.00% | Δε [1 kHz, 20° C.]: | 11.1 |
| PP-1-2V1 | 10.00% | $\varepsilon_{\parallel}$ [1 kHz, 20° C.]: | 15.3 |
| PGIGI-3-F | 12.00% | | |
| CPGP-5-2 | 8.00% | | |
| CPGP-5-3 | 8.00% | | |
| PGP-2-3 | 7.00% | | |
| PGP-2-4 | 6.00% | | |
| PGP-2-5 | 6.00% | | |
| Σ 100.00% | | | |

A cholesteric mixture C-8 is prepared by adding the chiral dopant R-5011 available from Merck KGaA, Darmstadt, Germany to the base mixture B-8 such that a pitch of 2 μm is obtained, wherein C-8 contains 99.51% of the mixture B-8 and 0.49% of R-5011.

The mixture shows favourable electro-optical performance and stability.

Example 9

A liquid-crystal base mixture B-9 is prepared and characterized with respect to its general physical properties, having the composition and properties as indicated in the following table.

| | | | | |
|---|---|---|---|---|
| PUQU-2-F | 6.00% | Clearing point: | 98.1° C. |
| PUQU-3-F | 12.00% | Δn [589 nm, 20° C.]: | 0.166 |
| PGU-2-F | 5.00% | $n_e$ [589 nm, 20° C.]: | 1.668 |
| PGU-3-F | 11.00% | Δε [1 kHz, 20° C.]: | 11.4 |
| PPGU-3-F | 4.00% | $\varepsilon_{\parallel}$ [1 kHz, 20° C.]: | 15.2 |
| CPGP-5-2 | 7.00% | | |
| CPGP-5-3 | 6.00% | | |
| CPGP-4-3 | 7.00% | | |
| CC-3-V | 25.00% | | |
| PGP-2-3 | 4.00% | | |
| PGP-2-4 | 4.00% | | |
| CPU-3-F | 9.00% | | |
| Σ 100.00% | | | |

A cholesteric mixture C-9 is prepared by adding the chiral dopant R-5011 available from Merck KGaA, Darmstadt, Germany to the base mixture B-9 such that a pitch of 2 μm is obtained.

The mixture shows favourable electro-optical performance and stability.

Example 10

A liquid-crystal base mixture B-10 is prepared and characterized with respect to its general physical properties, having the composition and properties as indicated in the following table.

| | | | | |
|---|---|---|---|---|
| PGUQU-3-F | 6.00% | Clearing point: | 101.0° C. |
| PGUQU-4-F | 10.00% | Δn [589 nm, 20° C.]: | 0.194 |
| PGUCU-5-F | 10.00% | $n_e$ [589 nm, 20° C.]: | 1.699 |
| PUQU-3-F | 17.00% | Δε [1 kHz, 20° C.]: | 37.0 |
| PGU-2-F | 10.00% | $\varepsilon_{\parallel}$ [1 kHz, 20° C.]: | 42.9 |
| PGU-3-F | 11.00% | | |
| CPGU-3-OT | 8.00% | | |
| CCGU-3-F | 8.00% | | |
| CPU-3-F | 12.00% | | |

-continued

| | |
|---|---|
| CPGP-5-2 | 4.00% |
| CPGP-5-3 | 4.00% |
| Σ 100.00% | |

A cholesteric mixture C-10 is prepared by adding the chiral dopant R-5011 available from Merck KGaA, Darmstadt, Germany to the base mixture B-10 such that a pitch of 2 μm is obtained, wherein C-10 contains 99.71% of the mixture B-10 and 0.29% of R-5011.

The mixture shows favourable electro-optical performance and stability.

Example 11

A liquid-crystal base mixture B-11 is prepared and characterized with respect to its general physical properties, having the composition and properties as indicated in the following table.

| | | | | |
|---|---|---|---|---|
| CP-3-O1 | 8.00% | Clearing point: | 111.5° C. |
| CC-3-V | 12.00% | Δn [589 nm, 20° C.]: | 0.213 |
| CPGP-5-2 | 6.00% | $n_e$ [589 nm, 20° C.]: | 1.729 |
| CPGP-5-3 | 6.00% | Δε [1 kHz, 20° C.]: | 3.1 |
| PGP-2-2V | 14.00% | $\varepsilon_{\parallel}$ [1 kHz, 20° C.]: | 6.3 |
| PGP-1-2V | 13.00% | | |
| PGP-3-2V | 13.00% | | |
| PGP-2-5 | 6.00% | | |
| PP-1-2V1 | 12.00% | | |
| PUQU-3-F | 6.00% | | |
| PGUQU-3-F | 4.00% | | |
| Σ 100.00% | | | |

A cholesteric mixture C-11 is prepared by adding the chiral dopant R-5011 available from Merck KGaA, Darmstadt, Germany to the base mixture B-11 such that a pitch of 2 μm is obtained.

The mixture shows favourable electro-optical performance and stability.

Example 12

A liquid-crystal base mixture B-12 is prepared and characterized with respect to its general physical properties, having the composition and properties as indicated in the following table.

| | | | | |
|---|---|---|---|---|
| PGIGI-3-F | 8.00% | Clearing point: | 102.0° C. |
| GGP-3-F | 8.00% | Δn [589 nm, 20° C.]: | 0.169 |
| GGP-5-F | 7.00% | $n_e$ [589 nm, 20° C.]: | 1.675 |
| CPG-2-F | 7.00% | Δε [1 kHz, 20° C.]: | 12.2 |
| CPG-3-F | 7.00% | $\varepsilon_{\parallel}$ [1 kHz, 20° C.]: | 16.9 |
| CPG-5-F | 5.00% | | |
| CPU-5-F | 10.00% | | |
| PGU-3-F | 4.00% | | |
| PGU-5-F | 7.00% | | |
| CCGU-3-F | 8.00% | | |
| CGPC-3-3 | 3.00% | | |
| CGPC-5-3 | 3.00% | | |
| CGPC-5-5 | 3.00% | | |
| CPGU-3-OT | 5.00% | | |
| CP-5-N | 15.00% | | |
| Σ 100.00% | | | |

A cholesteric mixture C-12 is prepared by adding the chiral dopant R-5011 available from Merck KGaA, Darmstadt, Germany to the base mixture B-12 such that a pitch of 2 μm is obtained.

The mixture exhibits a long shelf life at −20° C. as well as at even lower temperatures when placed in cells. The following Table shows the determined shelf life values.

| | |
|---|---|
| shelf life (bulk, −20° C.) | >46 days |
| shelf life (bulk, −30° C.) | 8 days |
| shelf life (bulk, −40° C.) | 8 days |
| shelf life (6 μm TN cell, −30° C.) | >46 days |
| shelf life (6 μm TN cell, −40° C.) | >46 days |

The mixture shows favourable electro-optical performance and stability.

Example 13

A liquid-crystal base mixture B-13 is prepared and characterized with respect to its general physical properties, having the composition and properties as indicated in the following table.

| | | | |
|---|---|---|---|
| PGIGI-3-F | 7.00% | Clearing point: | 99.9° C. |
| GGP-3-F | 8.00% | Δn [589 nm, 20° C.]: | 0.179 |
| GGP-5-F | 7.00% | $n_e$ [589 nm, 20° C.]: | 1.681 |
| CPG-3-F | 7.00% | Δε [1 kHz, 20° C.]: | 13.9 |
| CPG-5-F | 5.00% | $\varepsilon_\parallel$ [1 kHz, 20° C.]: | 18.7 |
| CPU-5-F | 10.00% | | |
| PGU-2-F | 6.00% | | |
| PGU-3-F | 6.00% | | |
| PGU-5-F | 7.00% | | |
| CCGU-3-F | 8.00% | | |
| CGPC-3-3 | 3.00% | | |
| CGPC-5-3 | 3.00% | | |
| CGPC-5-5 | 3.00% | | |
| CPGU-3-OT | 5.00% | | |
| CP-5-N | 15.00% | | |
| Σ 100.00% | | | |

A cholesteric mixture C-13 is prepared by adding the chiral dopant R-5011 available from Merck KGaA, Darmstadt, Germany to the base mixture B-13 such that a pitch of 2 μm is obtained.

The mixture exhibits a long shelf life at −20° C. as well as at even lower temperatures when placed in cells. The following Table shows the determined shelf life values.

| | |
|---|---|
| shelf life (bulk, −20° C.) | >41 days |
| shelf life (bulk, −30° C.) | 7 days |
| shelf life (bulk, −40° C.) | 3 days |
| shelf life (6 μm TN cell, −30° C.) | >40 days |
| shelf life (6 μm TN cell, −40° C.) | 16 days |

The mixture shows favourable electro-optical performance and stability.

Example 14

A liquid-crystal base mixture B-14 is prepared and characterized with respect to its general physical properties, having the composition and properties as indicated in the following table.

| | | | |
|---|---|---|---|
| PGIGI-3-F | 6.00% | Clearing point: | 101.0° C. |
| GGP-3-F | 7.00% | Δn [589 nm, 20° C.]: | 0.174 |
| GGP-5-F | 8.00% | $n_e$ [589 nm, 20° C.]: | 1.684 |
| CPG-2-F | 9.00% | Δε [1 kHz, 20° C.]: | 12.6 |
| CPG-3-F | 8.00% | $\varepsilon_\parallel$ [1 kHz, 20° C.]: | 17.4 |
| CPG-5-F | 8.00% | | |
| PGU-2-F | 7.00% | | |
| PGU-3-F | 7.00% | | |
| PGU-5-F | 7.00% | | |
| CCGU-3-F | 8.00% | | |
| CGPC-3-3 | 4.00% | | |
| CGPC-5-3 | 4.00% | | |
| CGPC-5-5 | 4.00% | | |
| CP-5-N | 13.00% | | |
| Σ 100.00% | | | |

A cholesteric mixture C-14 is prepared by adding the chiral dopant R-5011 available from Merck KGaA, Darmstadt, Germany to the base mixture B-14 such that a pitch of 2 μm is obtained.

The mixture exhibits a long shelf life at −20° C. and −30° C. as well as at even lower temperatures when placed in cells. The following Table shows the determined shelf life values.

| | |
|---|---|
| shelf life (bulk, −20° C.) | >26 days |
| shelf life (bulk, −30° C.) | 23 days |
| shelf life (bulk, −40° C.) | 12 days |
| shelf life (6 μm TN cell, −30° C.) | >26 days |
| shelf life (6 μm TN cell, −40° C.) | >26 days |

The mixture shows favourable electro-optical performance and stability.

Example 15

A cholesteric mixture C-15 is prepared by mixing 97.01% of mixture B-1 as described in Example 1 above with 0.42% of chiral dopant R-5011 available from Merck KGaA, Darmstadt, Germany, 1.25% of compound of formula RM-A

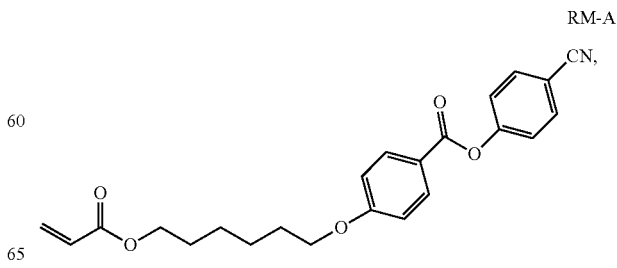

RM-A 0.62% of compound of formula RM-B

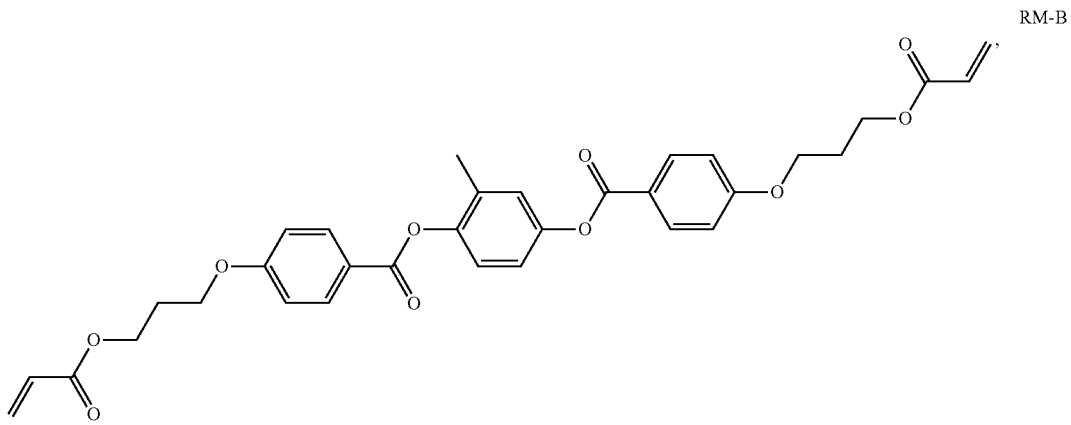 [SMILES: C=CC(=O)OCCCOc1ccc(C(=O)Oc2ccc(OC(=O)c3ccc(OCCCOC(=O)C=C)cc3)c(C)c2)cc1]

0.62% of compound of formula RM-C

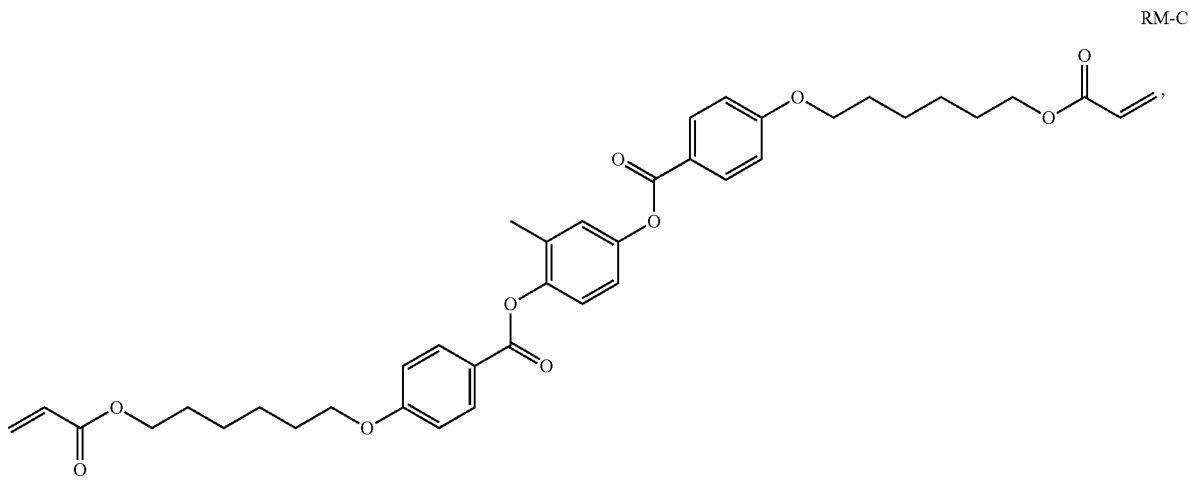 [SMILES: C=CC(=O)OCCCCCCOc1ccc(C(=O)Oc2ccc(OC(=O)c3ccc(OCCCCCCOC(=O)C=C)cc3)c(C)c2)cc1]

and 0.08% of the photoinitiator Irgacure© 651 (abbreviated as IRG-651 in the following)

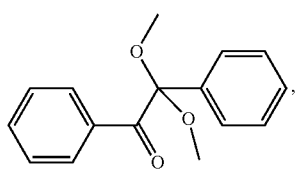 [SMILES: COC(OC)(C(=O)c1ccccc1)c1ccccc1]

available from Ciba, Switzerland.

The obtained pitch of mixture C-15 is 1.84 µm.

The mixture C-15 is filled into a test cell having glass substrates with ITO electrodes as well as polyimide alignment layers (AL-1054 from Japan Synthetic Rubber, planar, TN), wherein the cell gap is 25 µm.

Subsequently polymerisation is carried out by irradiating the test cell with UV light (UVACUBE 2000, Hönle, 9 mW/cm² light intensity) for 10 minutes while a square-wave voltage (70V, 60 Hz) is applied.

After the polymerisation the haze is determined. In the scattering (hazy) state a haze value of 97.9% is obtained. In the clear state a haze value of 5.4% is obtained.

Example 16

A cholesteric mixture C-16 is prepared by mixing 98.28% of mixture B-1 as described in Example 1 with 0.42% of chiral dopant R-5011 available from Merck KGaA, Darmstadt, Germany, 0.63% of compound of formula RM-D

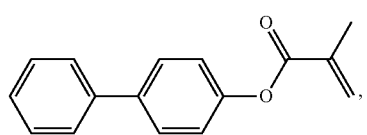

0.63% of compound of formula RM-E

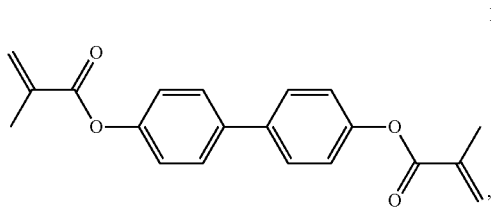

RM-E and 0.04% of IRG-651.

The obtained pitch of mixture C-16 is 1.84 µm.

The mixture C-16 is filled into a test cell having glass substrates with ITO electrodes as well as polyimide alignment layers (AL-1054 from Japan Synthetic Rubber, planar, TN), wherein the cell gap is 25 µm.

Subsequently polymerisation is carried out by irradiating the test cell with UV light (UVACUBE 2000, Hönle, 9 mW/cm$^2$ light intensity) for 10 minutes while a square-wave voltage (70V, 60 Hz) is applied.

After the polymerisation the haze is determined. In the scattering (hazy) state a haze value of 98% is obtained. In the clear state a haze value of 4% is obtained.

Example 17

A cholesteric mixture C-17 is prepared by mixing 98.28% of mixture B-12 as described in Example 12 with 0.42% of chiral dopant R-5011 available from Merck KGaA, Darmstadt, Germany, 0.63% of compound of formula RM-D as shown in Example 16 above, 0.63% of compound of formula RM-E as shown in Example 16 above and 0.04% of IRG-651.

The obtained pitch of mixture C-17 is 1.84 µm.

The mixture C-17 is filled into a test cell having glass substrates with ITO electrodes as well as polyimide alignment layers (AL-1054 from Japan Synthetic Rubber, planar, TN), wherein the cell gap is 25 µm.

Subsequently polymerisation is carried out by irradiating the test cell with UV light (UVACUBE 2000, Hönle, 9 mW/cm$^2$ light intensity) for 10 minutes while a square-wave voltage (70V, 60 Hz) is applied.

After the polymerisation the haze is determined. In the scattering (hazy) state a haze value of 94.4% is obtained. In the clear state a haze value of 2.3% is obtained.

Example 18

A cholesteric mixture C-18 is prepared by mixing 98.28% of mixture B-4 as described in Example 4 with 0.42% of chiral dopant R-5011 available from Merck KGaA, Darmstadt, Germany, 0.63% of compound of formula RM-D as shown in Example 16 above, 0.63% of compound of formula RM-E as shown in Example 16 above and 0.04% of IRG-651.

The obtained pitch of mixture C-18 is 1.84 µm.

The mixture C-18 is filled into a test cell having glass substrates with ITO electrodes as well as polyimide alignment layers (AL-1054 from Japan Synthetic Rubber, planar, TN), wherein the cell gap is 25 µm.

Subsequently polymerisation is carried out by irradiating the test cell with UV light (UVACUBE 2000, Hönle, 9 mW/cm$^2$ light intensity) for 10 minutes while a square-wave voltage (70V, 60 Hz) is applied.

After the polymerisation the haze is determined. In the scattering (hazy) state a haze value of 95.7% is obtained. In the clear state a haze value of 2.6% is obtained.

Example 19

A cholesteric mixture C-19 is prepared by mixing 98.28% of mixture B-14 as described in Example 14 with 0.42% of chiral dopant R-5011 available from Merck KGaA, Darmstadt, Germany, 0.63% of compound of formula RM-D as shown in Example 16 above, 0.63% of compound of formula RM-E as shown in Example 16 above and 0.04% of IRG-651.

The obtained pitch of mixture C-19 is 1.84 µm.

The mixture C-19 is filled into a test cell having glass substrates with ITO electrodes as well as polyimide alignment layers (AL-1054 from Japan Synthetic Rubber, planar, TN), wherein the cell gap is 25 µm.

Subsequently polymerisation is carried out by irradiating the test cell with UV light (UVACUBE 2000, Hönle, 9 mW/cm$^2$ light intensity) for 10 minutes while a square-wave voltage (70V, 60 Hz) is applied.

After the polymerisation the haze is determined. In the scattering (hazy) state a haze value of 96.7% is obtained. In the clear state a haze value of 3.3% is obtained.

Example 20

A cholesteric mixture C-20 is prepared by mixing 98.28% of mixture B-13 as described in Example 13 with 0.42% of chiral dopant R-5011 available from Merck KGaA, Darmstadt, Germany, 0.63% of compound of formula RM-D as shown in Example 16 above, 0.63% of compound of formula RM-E as shown in Example 16 above and 0.04% of IRG-651.

The obtained pitch of mixture C-20 is 1.84 µm.

The mixture C-20 is filled into a test cell having glass substrates with ITO electrodes as well as polyimide alignment layers (AL-1054 from Japan Synthetic Rubber, planar, TN), wherein the cell gap is 25 µm.

Subsequently polymerisation is carried out by irradiating the test cell with UV light (UVACUBE 2000, Hönle, 9 mW/cm$^2$ light intensity) for 10 minutes while a square-wave voltage (70V, 60 Hz) is applied.

After the polymerisation the haze is determined. In the scattering (hazy) state a haze value of 96.7% is obtained. In the clear state a haze value of 2.5% is obtained.

Example 21

A cholesteric mixture C-21 is prepared by mixing 91.12% of mixture B-1 as described in Example 1 above with 6.49% of chiral dopant CB 15 available from Merck KGaA, Darmstadt, Germany, 2.37% of ethyleneglycol dimethacrylate and 0.02% of IRG-651.

The mixture C-21 is filled into a test cell having glass substrates with ITO electrodes as well as polyimide alignment layers (AL-1054 from Japan Synthetic Rubber, planar, TN), wherein the cell gap is 25 µm.

Subsequently polymerisation is carried out by irradiating the test cell with UV light (UVACUBE 2000, Hönle, 9 mW/cm$^2$ light intensity) for 10 minutes while a square-wave voltage (70V, 60 Hz) is applied.

After the polymerisation the haze is determined. In the scattering (hazy) state a haze value of 95.1% is obtained. In the clear state a haze value of 4.3% is obtained.

Example 22

A cholesteric mixture C-22 is prepared by mixing 98.61% of mixture B-4 as described in Example 4 above with 0.64% of chiral dopant R-5011 available from Merck KGaA, Darmstadt, Germany, and 0.75% of compound of formula RM-F

RM-F

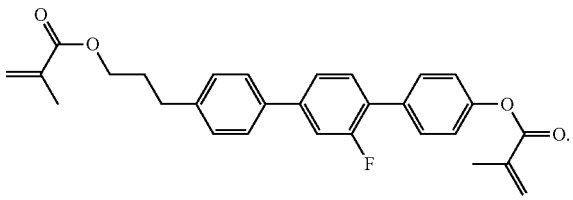

No photoinitiator is added. The obtained pitch of mixture C-22 is 1.1 μm.

The mixture C-22 is filled into a test cell having glass substrates with ITO electrodes as well as polyimide alignment layers (AL-1054 from Japan Synthetic Rubber, planar, TN), wherein the cell gap is 15 μm.

Subsequently polymerisation is carried out by irradiating the test cell with UV light (UVACUBE 2000, Hönle, 9 mW/cm² light intensity, 340 nm cut-off filter) for 10 minutes while a square-wave voltage (70V, 60 Hz) is applied.

After the polymerisation the haze is determined. In the scattering (hazy) state a haze value of 95% is obtained. In the clear state a haze value of 2.1% is obtained.

Example 23

A cholesteric mixture C-23 is prepared by mixing 98.68% of mixture B-4 as described in Example 4 above with 0.57% of chiral dopant R-5011 available from Merck KGaA, Darmstadt, Germany, and 0.75% of compound of formula RM-F as shown in Example 22 above.

No photoinitiator is added. The obtained pitch of mixture C-23 is 1.24 μm.

The mixture C-23 is filled into a test cell having glass substrates with ITO electrodes as well as polyimide alignment layers (AL-1054 from Japan Synthetic Rubber, planar, TN), wherein the cell gap is 18 μm.

Subsequently polymerisation is carried out by irradiating the test cell with UV light (UVACUBE 2000, Hönle, 9 mW/cm² light intensity, 340 nm cut-off filter) for 10 minutes while a square-wave voltage (70V, 60 Hz) is applied.

After the polymerisation the haze is determined. In the scattering (hazy) state a haze value of 97% is obtained. In the clear state a haze value of 3.5% is obtained.

Example 24

A liquid-crystal base mixture B-24 is prepared and characterized with respect to its general physical properties, having the composition as indicated in the following table.

| | |
|---|---|
| CCGU-3-F | 8.00% |
| BCH-5F.F.F | 10.00% |
| PGU-5-F | 7.00% |
| PGIGI-3-F | 10.00% |
| BCH-2F.F | 6.00% |
| BCH-7F.F.F | 10.00% |
| BCH-3F.F | 7.00% |
| CBC-53F | 3.00% |
| BCH-5F.F | 5.00% |
| CBC-55F | 3.00% |
| BCH-32 | 4.00% |
| PCH-5 | 15.00% |
| PGU-3-F | 4.00% |
| CPGU-3-OT | 5.00% |
| CBC-33F | 3.00% |
| Σ | 100.00% |

A cholesteric mixture C-24 is prepared by mixing 98.61% of mixture B-24 with 0.64% of chiral dopant R-5011 available from Merck KGaA, Darmstadt, Germany, and 0.75% of compound of formula RM-F as shown in Example 22 above.

The mixture C-24 is filled into a test cell having glass substrates with ITO electrodes as well as polyimide alignment layers (AL-1054 from Japan Synthetic Rubber, planar, TN), wherein the cell gap is 20 μm.

Subsequently polymerisation is carried out by irradiating the test cell with UV light (UVACUBE 2000, Hönle, 9 mW/cm² light intensity, 340 nm cut-off filter) for 10 minutes while a square-wave voltage (70V, 60 Hz) is applied.

After the polymerisation the haze is determined.

Example 25

A liquid-crystal base mixture B-25 is prepared and characterized with respect to its general physical properties, having the composition as indicated in the following table.

| | | | |
|---|---|---|---|
| PGIGI-3-F | 10.00% | Clearing point: | 105.0° C. |
| BCH-2F.F | 6.00% | Δn [589 nm, 20° C.]: | 0.159 |
| BCH-3F.F | 7.00% | | |
| BCH-5F.F | 5.00% | | |
| BCH-5F.F.F | 10.00% | | |
| BCH-7F.F.F | 10.00% | | |
| PGU-3-F | 4.00% | | |
| PGU-5-F | 7.00% | | |
| CCGU-3-F | 8.00% | | |
| BCH-32 | 4.00% | | |
| CBC-33F | 3.00% | | |
| CBC-53F | 3.00% | | |
| CBC-55F | 3.00% | | |
| CPGU-3-OT | 5.00% | | |
| PCH-7 | 15.00% | | |
| Σ | 100.00% | | |

The mixture exhibits a long shelf life at −20° C. and −30° C. as well as at even lower temperatures when placed in cells. The following Table shows the determined shelf life values.

| | |
|---|---|
| shelf life (bulk, −20° C.) | >5500 h |
| shelf life (bulk, −30° C.) | >5500 h |
| shelf life (bulk, −40° C.) | >500 h |
| shelf life (6 μm TN cell, −20° C.) | >5500 h |
| shelf life (6 μm TN cell, −30° C.) | >5500 h |
| shelf life (6 μm TN cell, −40° C.) | >5500 h |

A cholesteric mixture C-25 is prepared by mixing 98.884% of mixture B-25 with 0.366% of chiral dopant R-5011 available from Merck KGaA, Darmstadt, Germany, and 0.75% of compound of formula RM-F as shown in Example 22 above.

The mixture C-25 is filled into a test cell having glass substrates with ITO electrodes as well as polyimide alignment layers (AL-1054 from Japan Synthetic Rubber, planar, TN), wherein the cell gap is 22.5 µm.

Subsequently polymerisation is carried out by irradiating the test cell with UV light (UVACUBE 2000, Hönle, 9 mW/cm² light intensity, 340 nm cut-off filter) for 10 minutes while a square-wave voltage (70V, 60 Hz) is applied.

After the polymerisation the haze is determined. In the scattering (hazy) state a haze value of 94.9% is obtained. In the clear state a haze value of 6.7% is obtained.

A test cell of 25 mm×30 mm is fully switched at 31.5 V.

Example 26

A liquid-crystal base mixture B-26 is prepared and characterized with respect to its general physical properties, having the composition as indicated in the following table.

| PGIGI-3-F | 10.00% | Clearing Point: | 107.5° C. |
|---|---|---|---|
| BCH-2F.F | 4.00% | | |
| BCH-3F.F | 5.00% | | |
| BCH-5F.F | 7.00% | | |
| BCH-5F.F.F | 11.00% | | |
| BCH-7F.F.F | 10.00% | | |
| PGU-3-F | 4.00% | | |
| PGU-5-F | 7.00% | | |
| DPGU-4-F | 4.00% | | |
| CCGU-3-F | 8.00% | | |
| BCH-32 | 3.00% | | |
| CBC-33F | 3.00% | | |
| CBC-53F | 3.00% | | |
| CBC-55F | 2.00% | | |
| CPGU-3-OT | 5.00% | | |
| PCH-7 | 14.00% | | |
| Σ | 100.00% | | |

A cholesteric mixture C-26 is prepared by mixing 98.884% of mixture B-26 with 0.366% of chiral dopant R-5011 available from Merck KGaA, Darmstadt, Germany, and 0.75% of compound of formula RM-F as shown in Example 22 above.

The mixture C-26 is filled into a test cell having glass substrates with ITO electrodes as well as polyimide alignment layers (AL-1054 from Japan Synthetic Rubber, planar, TN), wherein the cell gap is 22.5 µm.

Subsequently polymerisation is carried out by irradiating the test cell with UV light (UVACUBE 2000, Hönle, 9 mW/cm² light intensity, 340 nm cut-off filter) for 10 minutes while a square-wave voltage (70V, 60 Hz) is applied.

After the polymerisation the haze is determined.

A test cell of 25 mm×30 mm is fully switched at 30.0 V.

Example 27

A cholesteric mixture C-27 is prepared by mixing 98.89% of mixture B-4 with 0.36% of chiral dopant R-5011 available from Merck KGaA, Darmstadt, Germany, and 0.75% of compound of formula RM-F as shown in Example 22 above.

The mixture C-27 is filled into a test cell having glass substrates with ITO electrodes as well as polyimide alignment layers (AL-1054 from Japan Synthetic Rubber, planar, TN), wherein the cell gap is 22.5 µm.

Subsequently polymerisation is carried out by irradiating the test cell with UV light (UVACUBE 2000, Hönle, 9 mW/cm² light intensity, 340 nm cut-off filter) for 10 minutes while a square-wave voltage (70V, 60 Hz) is applied.

After the polymerisation the haze is determined. In the scattering (hazy) state a haze value of 95.4% is obtained. In the clear state a haze value of 5.5% is obtained.

A test cell of 25 mm×30 mm is fully switched at 29.0 V.

Example 28

A cholesteric mixture C-28 is prepared by mixing 98.92% of mixture B-4 with 0.33% of chiral dopant R-5011 available from Merck KGaA, Darmstadt, Germany, and 0.75% of compound of formula RM-F as shown in Example 22 above.

The mixture C-28 is filled into a test cell having glass substrates with ITO electrodes as well as polyimide alignment layers (AL-1054 from Japan Synthetic Rubber, planar, TN), wherein the cell gap is 22.5 µm.

Subsequently polymerisation is carried out by irradiating the test cell with UV light (UVACUBE 2000, Hönle, 9 mW/cm² light intensity, 340 nm cut-off filter) for 10 minutes while a square-wave voltage (70V, 60 Hz) is applied.

After the polymerisation the haze is determined. In the scattering (hazy) state a haze value of 95.0% is obtained. In the clear state a haze value of 5.2% is obtained.

A test cell of 25 mm×30 mm is fully switched at 26.0 V.

Example 29

A cholesteric mixture C-29 is prepared by mixing 98.95% of mixture B-4 with 0.30% of chiral dopant R-5011 available from Merck KGaA, Darmstadt, Germany, and 0.75% of compound of formula RM-F as shown in Example 22 above.

The mixture C-29 is filled into a test cell having glass substrates with ITO electrodes as well as polyimide alignment layers (AL-1054 from Japan Synthetic Rubber, planar, TN), wherein the cell gap is 22.5 µm.

Subsequently polymerisation is carried out by irradiating the test cell with UV light (UVACUBE 2000, Hönle, 9 mW/cm² light intensity, 340 nm cut-off filter) for 10 minutes while a square-wave voltage (70V, 60 Hz) is applied.

After the polymerisation the haze is determined. In the scattering (hazy) state a haze value of 94.4% is obtained. In the clear state a haze value of 5.5% is obtained.

A test cell of 25 mm×30 mm is fully switched at 24.2 V.

The invention claimed is:

1. A window element, comprising a switching element, which switching element comprises a switching layer, which switching layer comprises a liquid-crystalline medium, wherein the switching layer is arranged between two substrates, and wherein the switching element is electrically switchable and operable in an optically transparent state and a scattering state, wherein the liquid-crystalline medium comprises
one or more mesogenic compounds of formula I

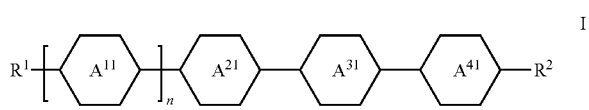

wherein
$R^1$ and $R^2$ denote, independently of one another, F, Cl, $CF_3$, $OCF_3$, a straight-chain alkyl or alkoxy having 1 to 15 carbon atoms, a branched alkyl or alkoxy having 3 to 15 carbon atoms, a straight-chain alkenyl having 2 to 15 carbon atoms, or a branched alkenyl having 3 to 15 carbon atoms, which is unsubstituted, monosubstituted by CN or $CF_3$ or mono- or polysubstituted by halogen and wherein one or more $CH_2$ groups may be, in each case independently of one another, replaced by —O—, —S—, —CO—, —COO—, —OCO—, —OCOO— or —C≡C— in such a manner that oxygen atoms are not linked directly to one another,

denotes

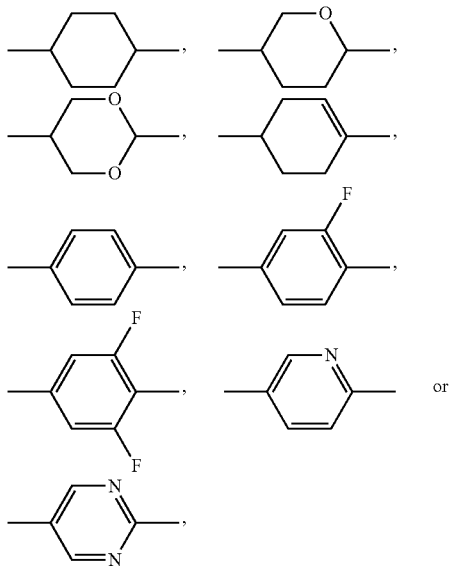

n denotes 0 or 1, and

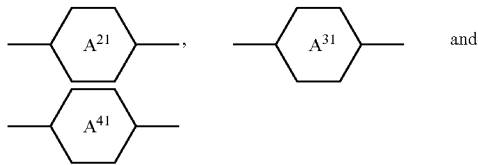 and

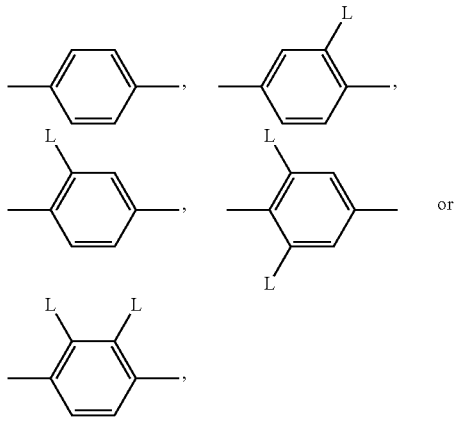

denote, independently of one another, wherein L is on each occurrence, identically or differently, halogen selected from the group consisting of F, Cl and Br, and one or more chiral compounds, wherein the one or more compounds of formula I are contained in the medium in an amount, based on the overall contents of the medium, of at least 15% by weight, and wherein the medium exhibits a clearing point of 98° C. or more.

2. The window element according to claim 1, wherein the medium exhibits a pitch of 0.55 μm or more.

3. The window element according to claim 1, in which the medium exhibits an optical anisotropy Δn, determined at 20° C. and 589 nm, of 0.13 or more.

4. The window element according to claim 1, in which the medium further comprises one or more mesogenic compounds of formulae II and/or III

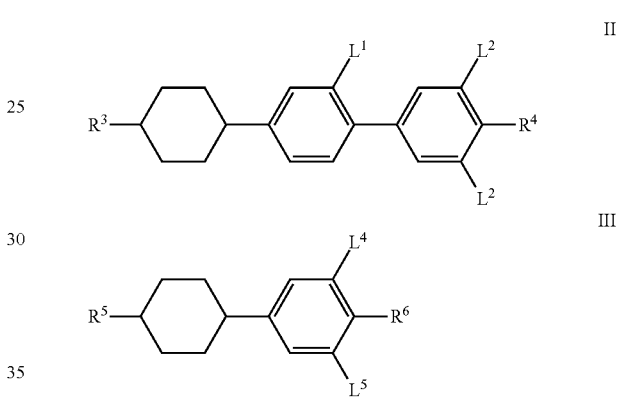

wherein $R^3$, $R^4$, $R^5$ and $R^6$ denote, independently of one another, F, $CF_3$, $OCF_3$, CN, a straight-chain alkyl or alkoxy having 1 to 15 carbon atoms, a branched alkyl or alkoxy having 3 to 15 carbon atoms, a straight-chain alkenyl having 2 to 15 carbon atoms or a branched alkenyl having 3 to 15 carbon atoms, which is unsubstituted, monosubstituted by CN or $CF_3$ or mono- or polysubstituted by halogen and wherein one or more $CH_2$ groups may be, in each case independently of one another, replaced by —O—, —S—, —CO—, —COO—, —OCO—, —OCOO— or —C≡C— in such a manner that oxygen atoms are not linked directly to one another, and $L^1$, $L^2$, $L^3$, $L^4$ and $L^5$ denote, independently of one another, H or F.

5. The window element according to claim 1, wherein in the one or more mesogenic compounds of formula I L is F and $R^1$ and $R^2$ are not Cl.

6. The window element according to claim 1, wherein the one or more chiral compounds in the medium have an absolute value of the helical twisting power of 5 $\mu m^{-1}$ or more.

7. The window element according to claim 1, wherein the medium further comprises one or more polymerisable compounds.

8. The window element according to claim 7, wherein the one or more polymerisable compounds are contained in the medium in an amount, based on the overall contents of the medium, of 10% by weight or less.

9. The window element according to claim 7, wherein one or more of the one or more polymerisable compounds comprise one, two or more acrylate and/or methacrylate groups.

10. The window element according to claim 7, wherein one or more of the one or more polymerisable compounds are polymerisable mesogenic compounds.

11. The window element according to claim 1, wherein the medium further comprises a polymeric component.

12. The window element according to claim 11, wherein the polymeric component is contained in the medium in an amount, based on the overall contents of the medium, of 10% by weight or less.

13. A method for preparing the window element of claim 1, therein a switching layer or a switching element, comprising
   (a) providing the medium comprising the one or more mesogenic compounds of formula I and the one or more chiral compounds and which medium further comprises one more polymerisable compounds as a layer, and
   (b) polymerising the one or more polymerisable compounds of said medium.

14. The window element according to claim 11, wherein the polymeric component is obtained by polymerising one or more polymerisable compounds.

15. A cholesteric liquid crystal scattering device, comprising the window element according to claim 1.

16. An automobile, comprising the window element according to claim 1.

17. An architectural building, comprising the window element according to claim 1.

18. A privacy window, comprising the window element according to claim 1.

* * * * *